United States Patent
Ofuji et al.

(10) Patent No.: US 12,140,716 B2
(45) Date of Patent: Nov. 12, 2024

(54) APPARATUS AND SYSTEM

(71) Applicant: CANON KABUSHIKI KAISHA, Tokyo (JP)

(72) Inventors: Masato Ofuji, Gunma (JP); Jun Kawanabe, Saitama (JP); Kentaro Fujiyoshi, Tokyo (JP); Minoru Watanabe, Kanagawa (JP); Kai Suzuki, Kanagawa (JP); Hideyuki Okada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 17/090,791

(22) Filed: Nov. 5, 2020

(65) Prior Publication Data
US 2021/0141105 A1 May 13, 2021

(30) Foreign Application Priority Data

Nov. 12, 2019 (JP) ................. 2019-204878
Nov. 12, 2019 (JP) ................. 2019-204879
Nov. 12, 2019 (JP) ................. 2019-204880

(51) Int. Cl.
*G01T 1/24* (2006.01)
*H04N 5/32* (2023.01)
*H04N 25/75* (2023.01)

(52) U.S. Cl.
CPC .............. *G01T 1/247* (2013.01); *G01T 1/241* (2013.01); *H04N 5/32* (2013.01); *H04N 25/75* (2023.01)

(58) Field of Classification Search
CPC ....... G01T 1/247; G01T 1/241; H04N 5/3577; H04N 5/3698; H04N 5/374; H04N 5/378; H04N 5/32; G01N 23/04; G01N 23/041
See application file for complete search history.

(56) References Cited

U.S. PATENT DOCUMENTS

| | | | |
|---|---|---|---|
| 6,232,607 B1 | 5/2001 | Huang | |
| 8,674,313 B2 | 3/2014 | Cao | |
| 8,884,238 B2* | 11/2014 | Roos | ............... H01L 27/14641 |
| | | | 250/370.08 |
| 2005/0279943 A1* | 12/2005 | Kobayashi | ............... H04N 5/32 |
| | | | 348/E5.035 |

(Continued)

FOREIGN PATENT DOCUMENTS

| | | |
|---|---|---|
| CN | 103356210 A | 10/2013 |
| CN | 104023184 A | 9/2014 |

(Continued)

*Primary Examiner* — Christine S. Kim
(74) *Attorney, Agent, or Firm* — Canon U.S.A., Inc. IP Division

(57) ABSTRACT

An apparatus comprises a plurality of pixels each including a conversion element and a switch, a driving circuit configured to control the switches via drive lines, a bias power supply unit configured to supply a bias potential to the conversion element via a bias line, column signal lines to which signals are output from the plurality of pixels, and a detection unit. The plurality of pixels include a first pixel and a second pixel, which are adjacent to each other in the row direction and are connected to a common column signal line. The switch of the first pixel and the switch of the second pixel are connected to drive lines different from each other. The detection unit determines presence/absence of radiation irradiation based on a current flowing to the bias line.

45 Claims, 35 Drawing Sheets

(56) References Cited

U.S. PATENT DOCUMENTS

| | | |
|---|---|---|
| 2013/0240745 A1 | 9/2013 | Roos |
| 2014/0241506 A1 | 8/2014 | Iwashita |
| 2015/0346361 A1 | 12/2015 | Watanabe |
| 2018/0341030 A1* | 11/2018 | Kikuchi .................. G01T 1/208 |

FOREIGN PATENT DOCUMENTS

| | | | |
|---|---|---|---|
| CN | 109920807 A | | 6/2019 |
| CN | 110392927 A | | 10/2019 |
| EP | 2773103 A2 | | 9/2014 |
| JP | 2010-268171 A | | 11/2010 |
| JP | 2012-120650 A | | 6/2012 |
| JP | 2013-219408 A | | 10/2013 |
| JP | 2013205136 A | | 10/2013 |
| JP | 2014-168203 A | | 9/2014 |
| JP | 2016003966 A | * | 1/2016 |
| JP | 2019091969 A | | 6/2019 |
| WO | 97/42661 A1 | | 11/1997 |
| WO | 2018/169009 A1 | | 9/2018 |

\* cited by examiner

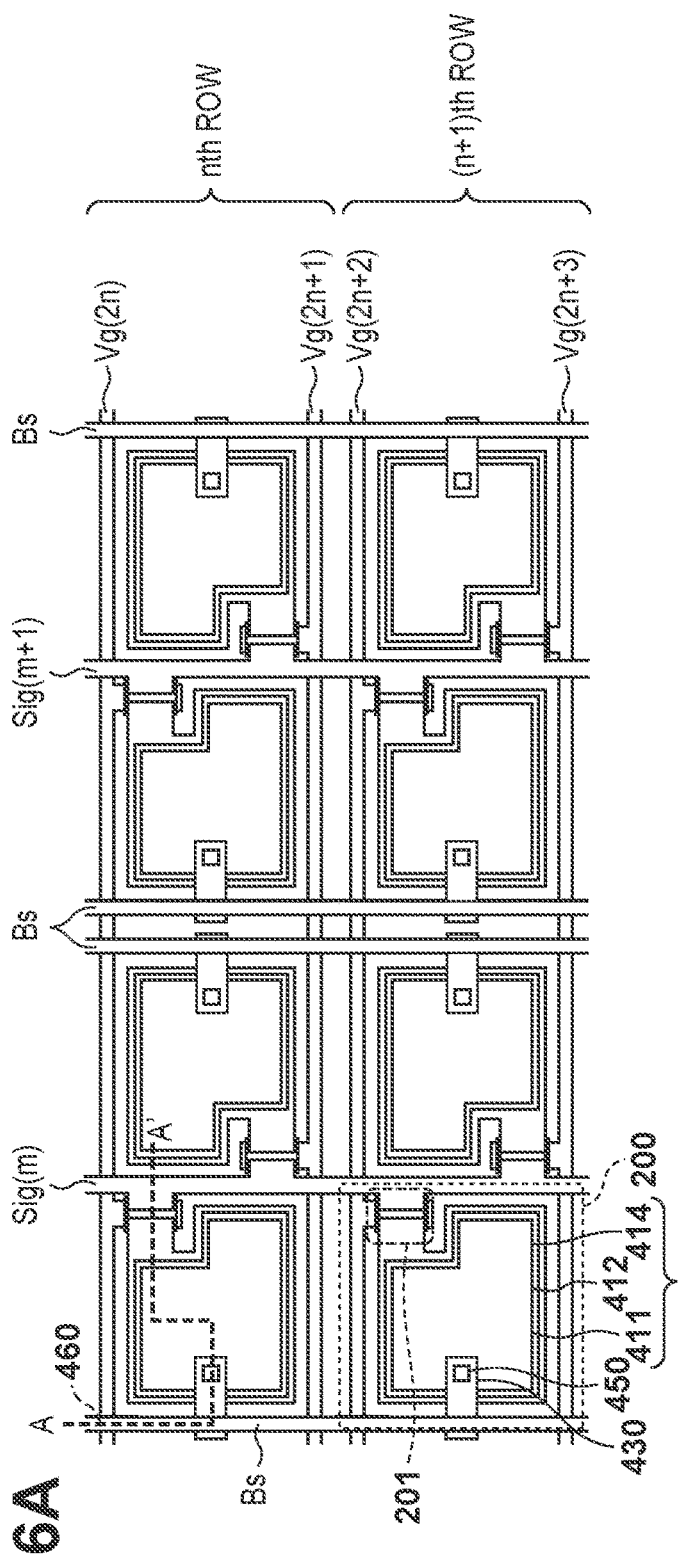
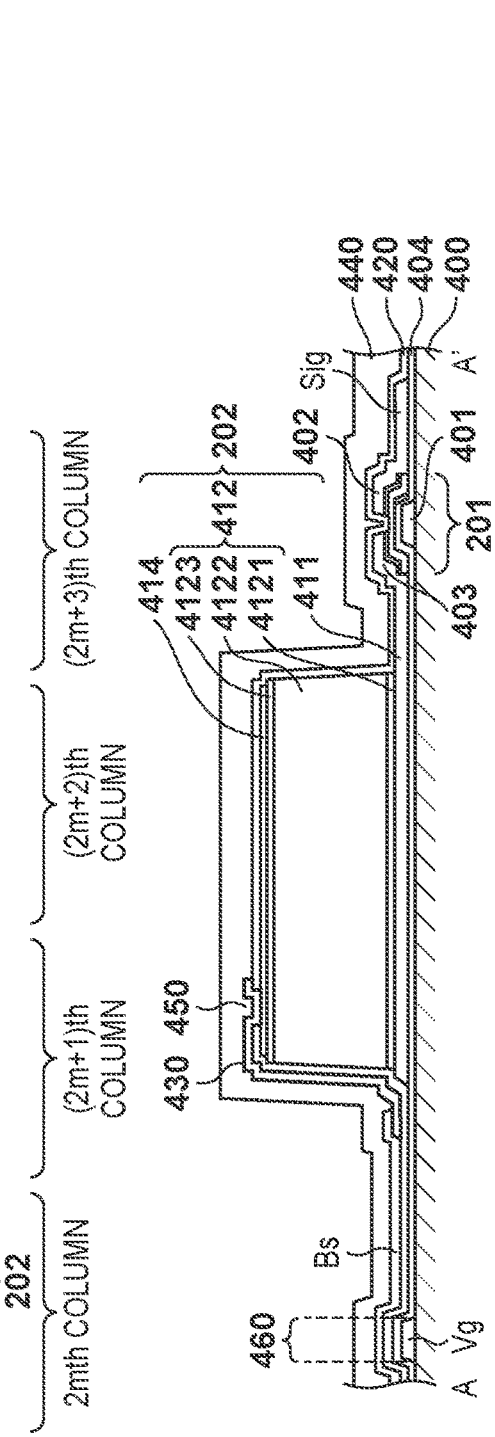
FIG. 6A
FIG. 6B

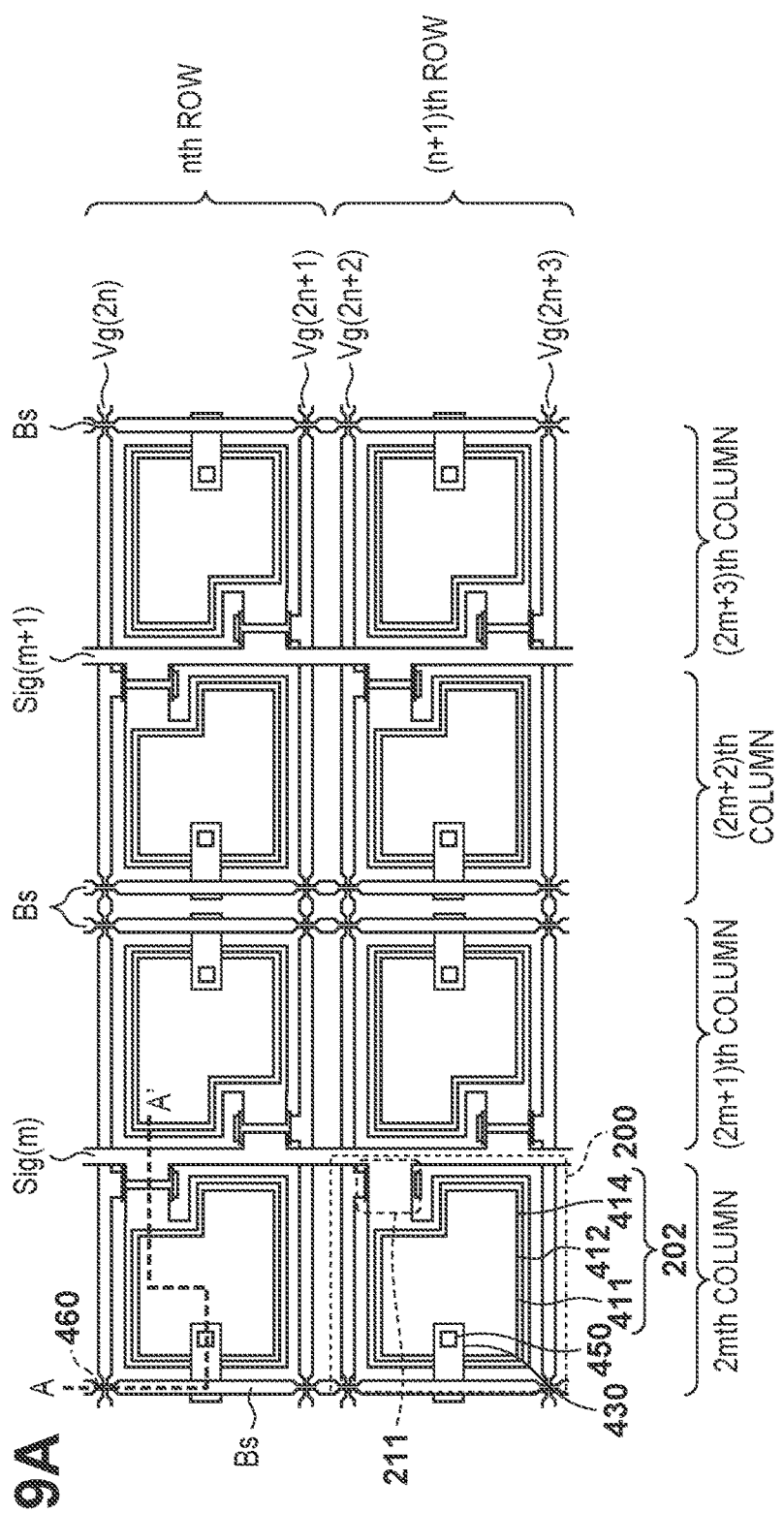
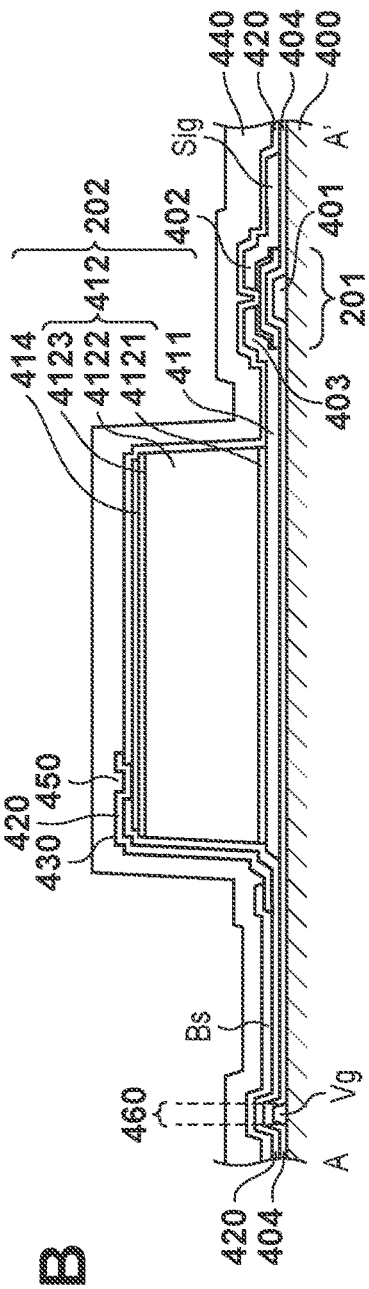
FIG. 9A
FIG. 9B

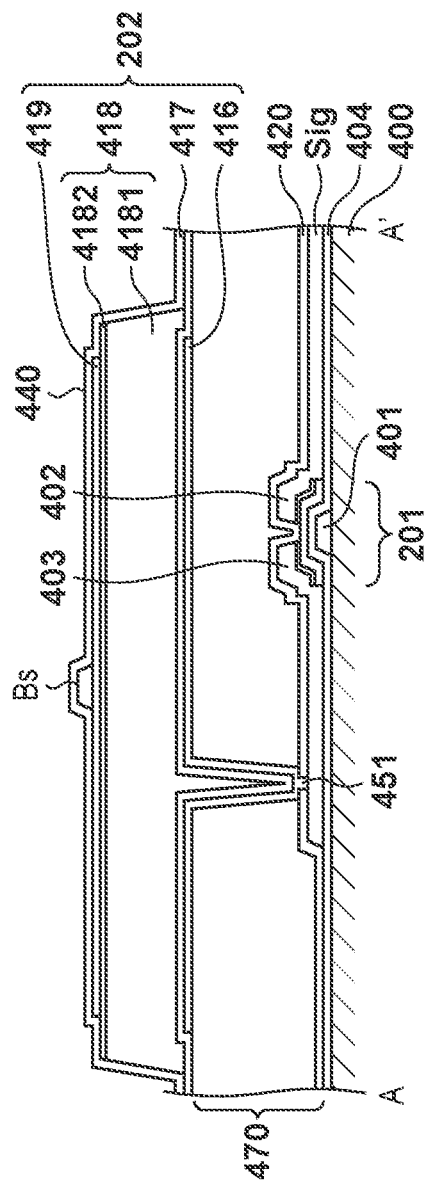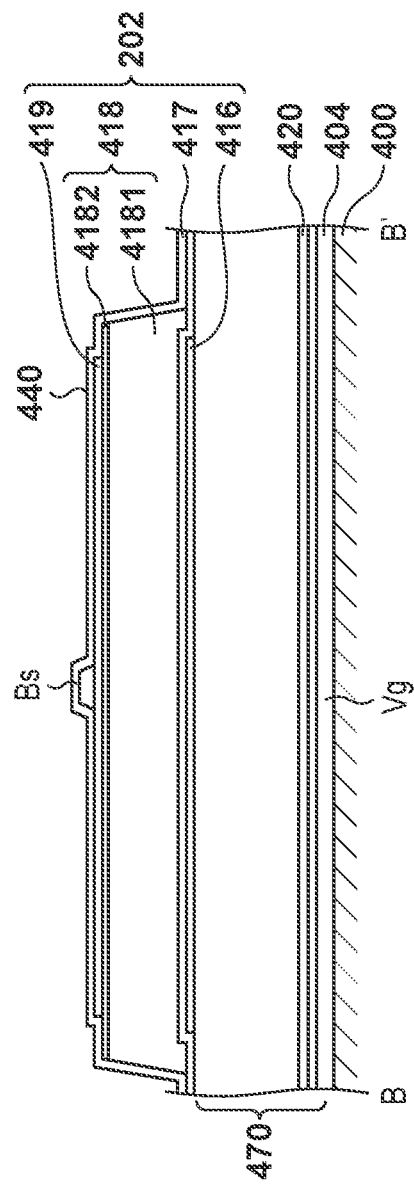

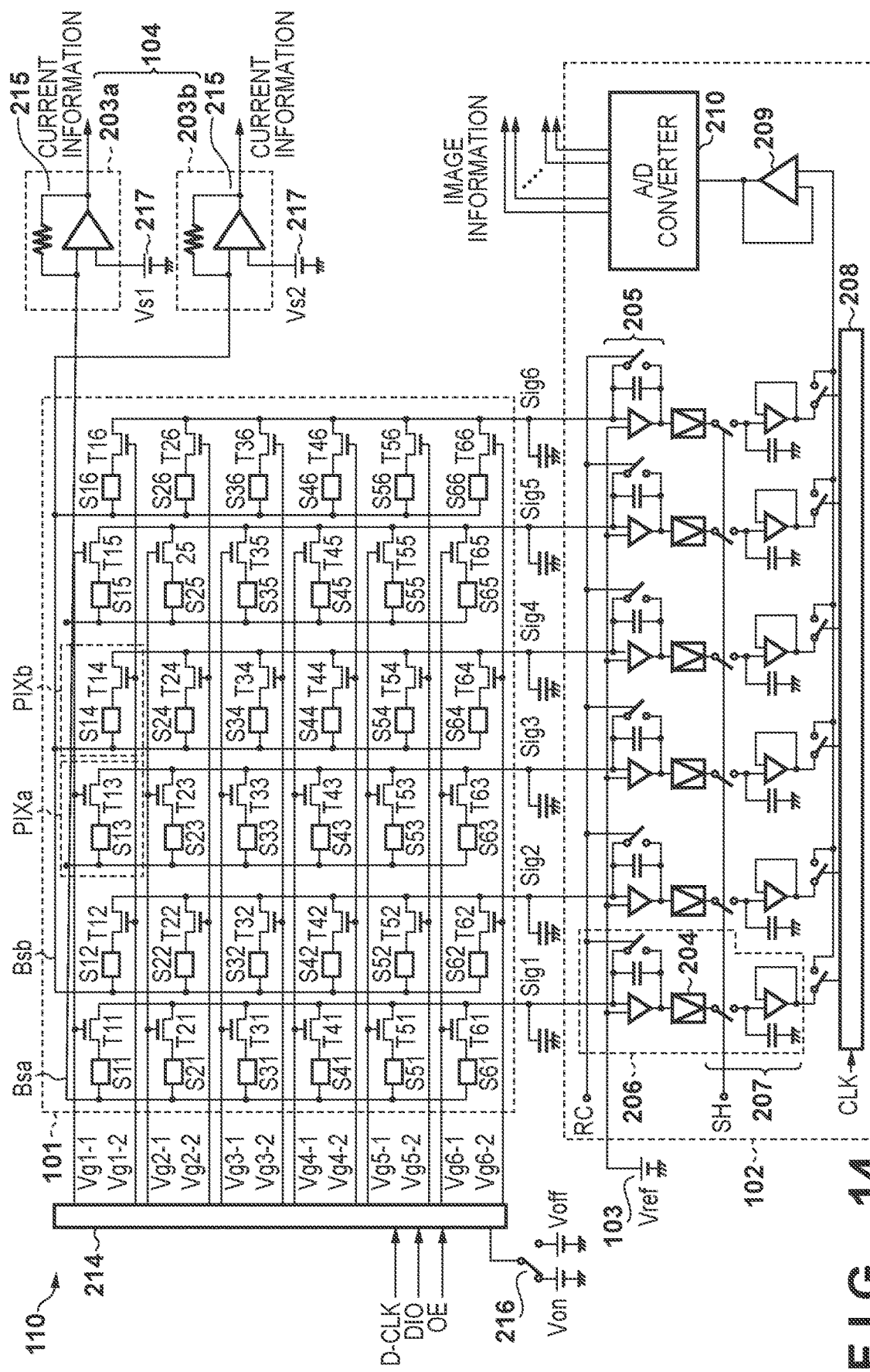
F I G. 14

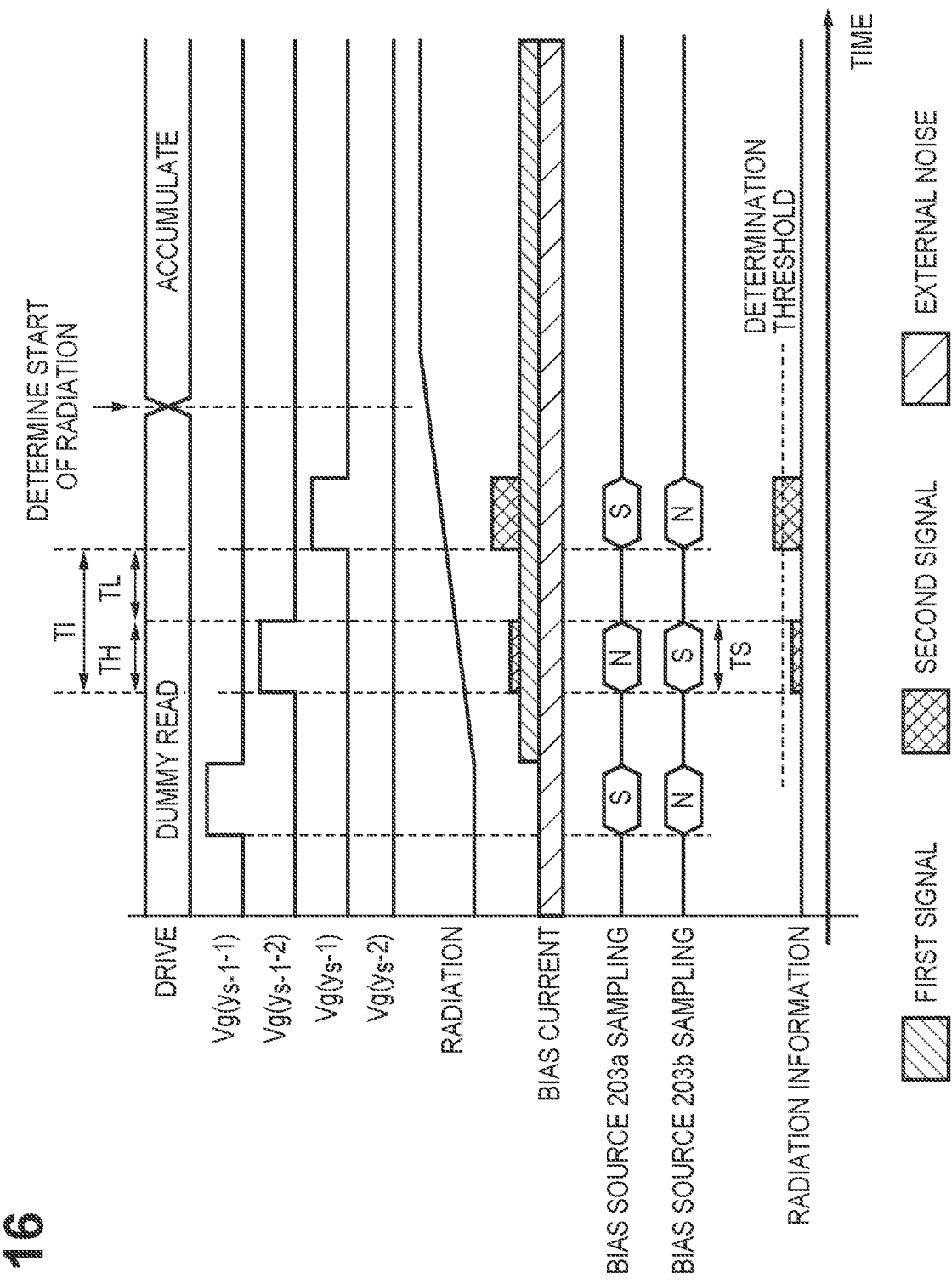

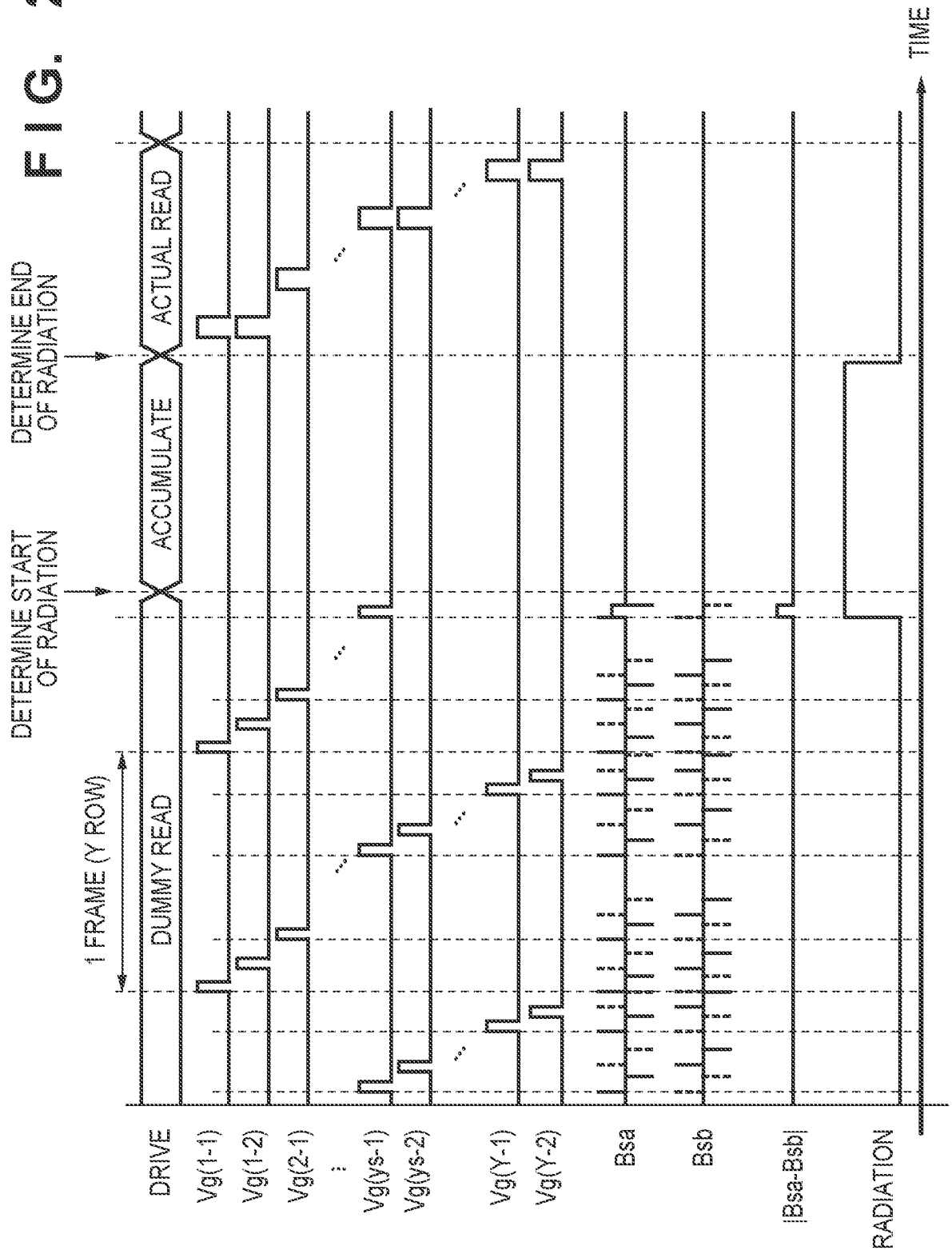

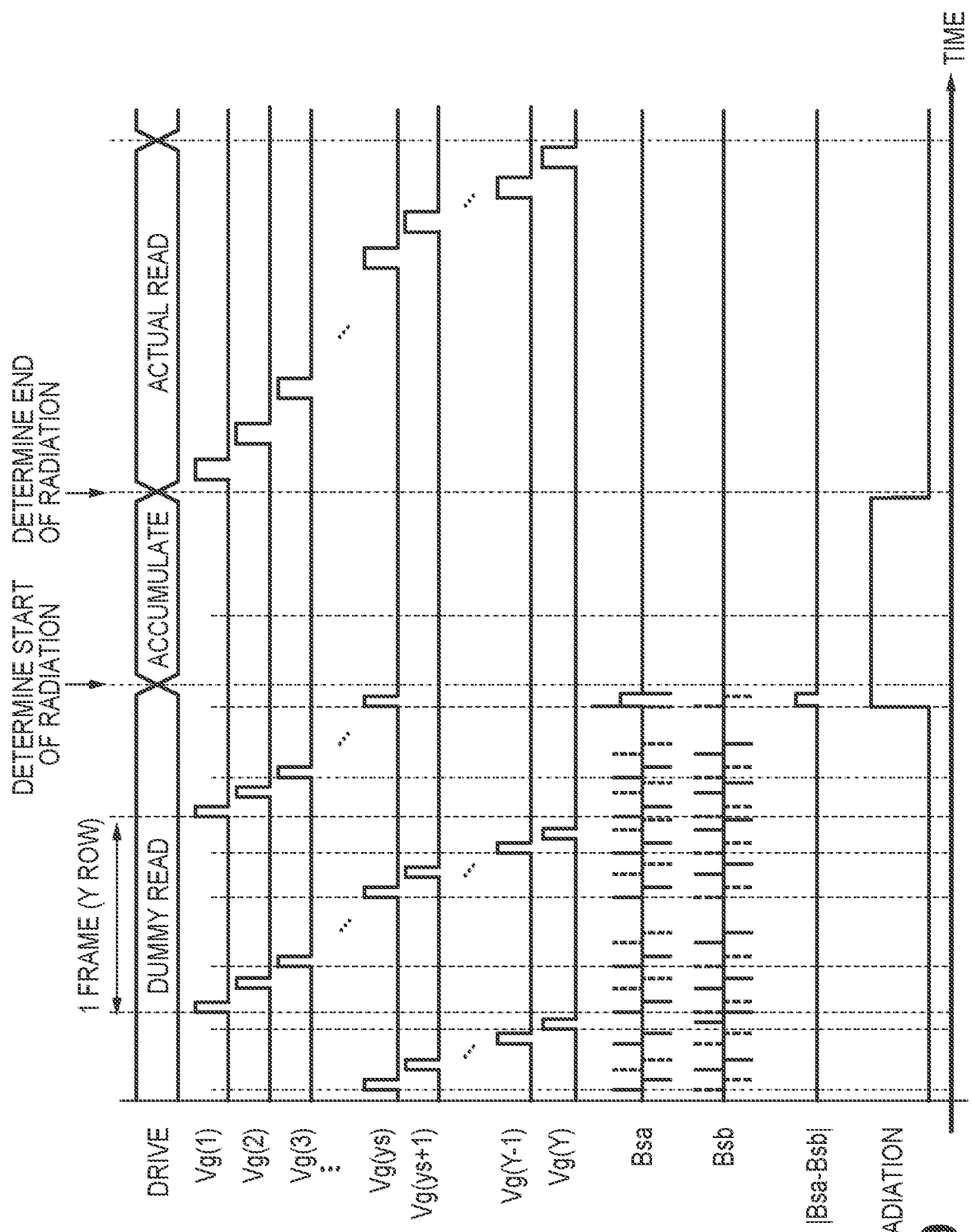
F I G. 29

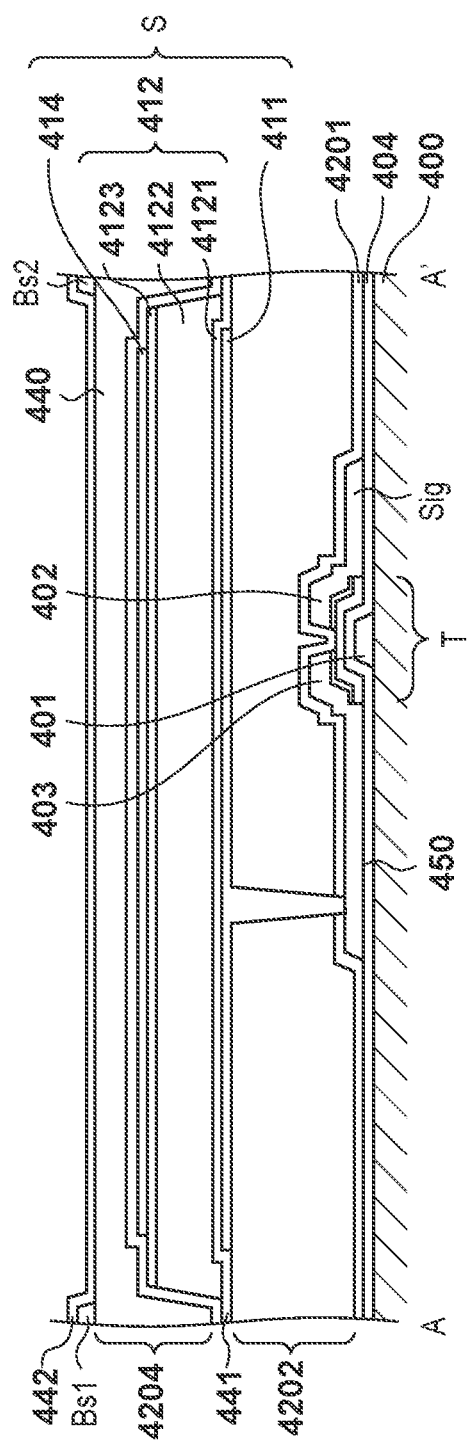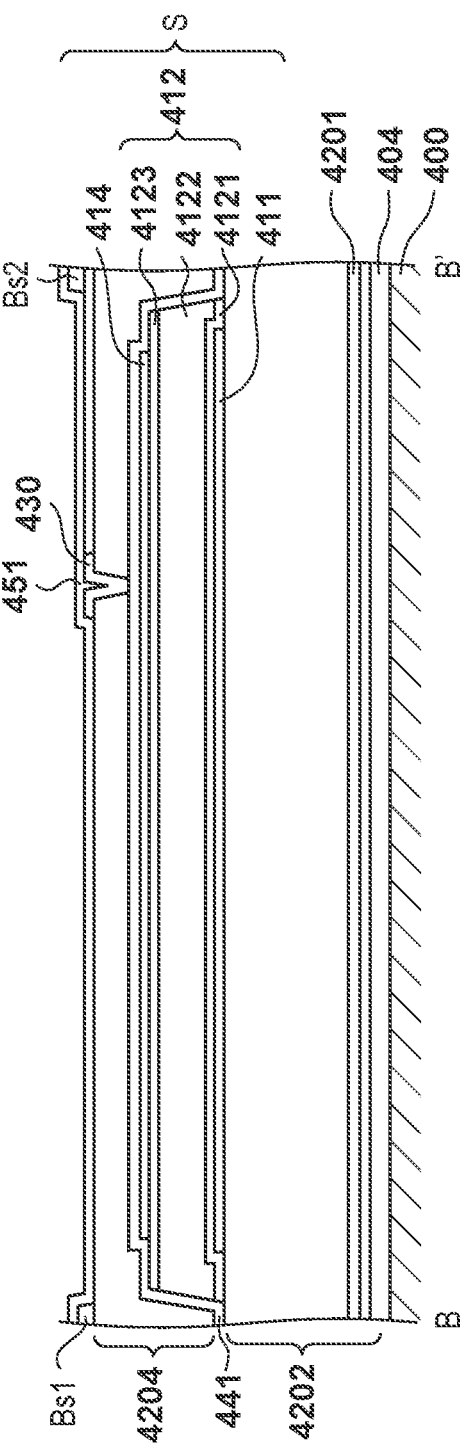

APPARATUS AND SYSTEM

BACKGROUND OF THE DISCLOSURE

Field of the Disclosure

The aspect of the embodiments relates to an apparatus and a system.

Description of the Related Art

A radiation imaging apparatus using a flat panel detector (FPD) in which a driving circuit and a read circuit, which are used to drive pixels and read signals, are connected to a sensor substrate on which pixels each including a photoelectric conversion element, a switch element, and the like are arranged in a two-dimensional matrix, is widely used. U.S. Pat. No. 8,674,313 describes arranging, on the back surface of a sensor substrate, a dose sensor configured to detect the presence/absence of radiation irradiation in order to synchronize a radiation generation apparatus with a radiation imaging apparatus.

In the arrangement of U.S. Pat. No. 8,674,313, since the dose sensor is arranged only in a partial region of the back surface of the sensor substrate, information concerning radiation irradiation cannot be obtained from a region where the dose sensor is not arranged.

SUMMARY OF THE DISCLOSURE

According to some embodiments, an apparatus comprising: a pixel unit in which a plurality of pixels each including a conversion element configured to convert radiation into charges, and a switch element are arranged in a matrix; a driving circuit configured to control the switch elements via a plurality of drive lines extending in a row direction; a bias power supply unit configured to supply a bias potential to the conversion element via a bias line; a plurality of column signal lines to which signals are output from the plurality of pixels via the switch elements; and a detection unit, wherein the plurality of pixels include a first pixel and a second pixel, which are adjacent to each other in the row direction and are connected to a common column signal line in the plurality of column signal lines, the switch element of the first pixel and the switch element of the second pixel are connected to drive lines different from each other in the plurality of drive lines, and the detection unit determines presence/absence of radiation irradiation based on a current flowing to the bias line, is provided.

According to some other embodiments, an apparatus comprising: a plurality of pixel groups and a plurality of bias power supply units in which one pixel group and one bias power supply unit are arranged in correspondence with each other, a driving circuit, and a detection unit, wherein each of the plurality of pixel groups is formed by a pixel including a conversion element configured to convert radiation into charges, and a switch element configured to connect the conversion element to a column signal line, each of the plurality of bias power supply units supplies a bias potential to the conversion element of the pixel via a bias line electrically independent for each bias power supply unit, the driving circuit controls the switch element of the pixel, and the detection unit acquires a first signal value representing a current flowing to the bias line connected to a pixel group including the pixel whose switch element is turned on by the driving circuit in the plurality of pixel groups, and a second signal value representing a current flowing to the bias line connected to a pixel group in which the switch element is in an OFF state in the plurality of pixel groups such that sampling timings at least partially overlap, and determines presence/absence of radiation irradiation based on the first signal value and the second signal value, is provided.

According to still other embodiments, an apparatus comprising: a first pixel group and a second pixel group each formed by a pixel including a conversion element configured to convert radiation into charges, and a switch element configured to connect the conversion element to a column signal line, a first bias power supply unit configured to supply a bias potential to the conversion element of the pixel included in the first pixel group via a first bias line; a second bias power supply unit configured to supply a bias potential to the conversion element of the pixel included in the second pixel group via a second bias line different from the first bias line; a driving circuit configured to drive the switch element; and a detection unit, wherein the driving circuit turns on the switch element of the pixel included in the first pixel group and the switch element of the pixel included in the second pixel group at different timings, the detection unit detects presence/absence of radiation irradiation based on a first signal value representing a current flowing to the first bias line and a second signal value representing a current flowing to the second bias line.

Further features of the disclosure will become apparent from the following description of exemplary embodiments (with reference to the attached drawings).

BRIEF DESCRIPTION OF THE DRAWINGS

FIG. 6A is a plan view showing an example of the arrangement of pixels of the radiation imaging apparatus shown in FIG. 2;

FIG. 6B is a sectional view showing an example of the arrangement of a pixel of the radiation imaging apparatus shown in FIG. 2;

FIG. 9A is a plan view showing an example of the arrangement of pixels of the radiation imaging apparatus shown in FIG. 2;

FIG. 9B is a sectional view showing an example of the arrangement of a pixel of the radiation imaging apparatus shown in FIG. 2;

FIGS. 11B and 11C are sectional views showing an example of the arrangement of a pixel of the radiation imaging apparatus shown in FIG. 2;

FIG. 14 is a circuit diagram showing an example of the arrangement of the radiation imaging apparatus shown in FIG. 1;

FIG. 16 is a detailed timing chart of the drive timing of the radiation imaging apparatus shown in FIG. 14 in detecting radiation;

FIG. 22 is a timing chart for explaining the operation of the radiation imaging apparatus shown in FIG. 21;

FIG. 29 is a timing chart for explaining the operation of the radiation imaging apparatus shown in FIG. 28;

FIGS. 30B and 30C are sectional views showing an example of the arrangement of a pixel of the radiation imaging apparatus shown in FIG. 28.

DESCRIPTION OF THE EMBODIMENTS

Figure 1:
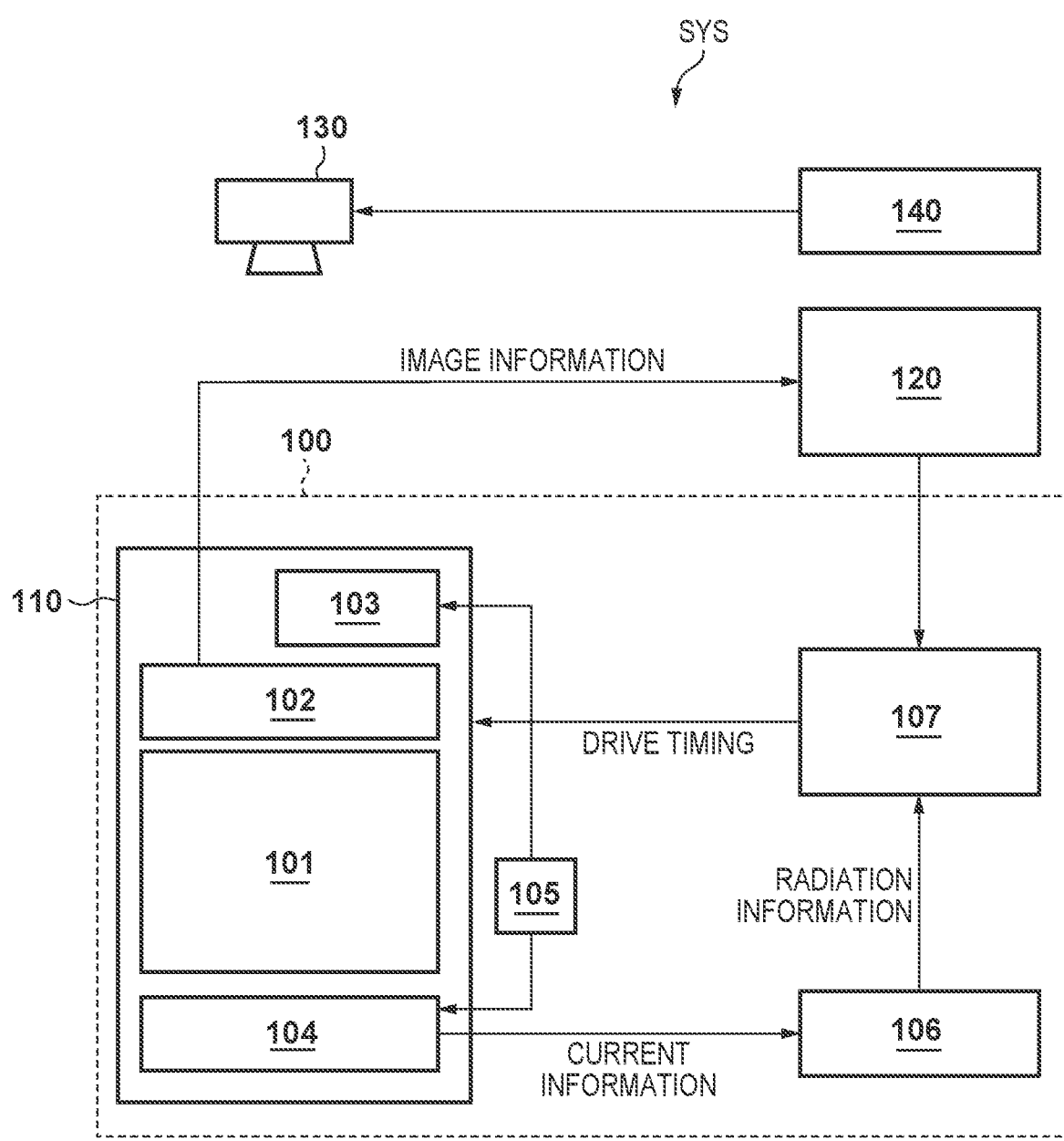
FIG. 1 is a block diagram showing an example of the arrangement of a radiation imaging system using a radiation imaging apparatus according to the aspect of the embodiments.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

Radiation according to the aspect of the embodiments can include not only α-rays, β-rays, and γ-rays that are beams generated by particles (including photons) emitted by radioactive decay but also beams having equal or more energy, for example, X-rays, particle rays, and cosmic rays.

A radiation imaging apparatus according to the embodiment will be described with reference to FIGS. 1 to 31. FIG. 1 is a block diagram showing an example of the arrangement of a radiation imaging system SYS using a radiation imaging apparatus 100 according to this embodiment. The radiation imaging system SYS according to this embodiment is configured to include the radiation imaging apparatus 100, a control computer 120, a radiation generation apparatus 130, and a radiation control apparatus 140.

The radiation generation apparatus 130 applies radiation to the radiation imaging apparatus 100 under the control of the radiation control apparatus 140. The control computer 120 can control the entire radiation imaging system SYS. Also, the control computer 120 acquires a radiation image generated by radiation with which the radiation generation apparatus 130 irradiates the radiation imaging apparatus 100 via an object.

The radiation imaging apparatus 100 includes an imaging unit 110 including a pixel unit 101, a read circuit 102, a reference power supply 103, and a bias power supply unit 104, a power supply unit 105, a detection unit 106, and a control unit 107. In the pixel unit 101, a plurality of pixels configured to detect radiation are arranged in a two-dimensional array. The read circuit 102 reads out charge information from the pixel unit 101. The reference power supply 103 supplies a reference voltage to the read circuit 102. The bias power supply unit 104 supplies a bias potential to the conversion elements of the pixels arranged in the pixel unit 101. The power supply unit 105 supplies power to power supplies including the reference power supply 103 and the bias power supply unit 104. The detection unit 106 acquires current information from the bias power supply unit 104. More specifically, the detection unit 106 acquires, from the bias power supply unit 104, the information of a current flowing to a bias line configured to supply the bias potential to the pixels of the pixel unit 101. The detection unit 106 calculates the current information output from the bias power supply unit, and outputs radiation information including a time fluctuation in the intensity of radiation that enters the pixel unit 101. As the detection unit 106, a digital signal processing circuit such as an FPGA, a DSP, or a processor can be used. Alternatively, the detection unit 106 may be formed using an analog circuit such as a sample hold circuit or an operational amplifier. In the arrangement shown in FIG. 1, the detection unit 106 is arranged in the radiation imaging apparatus 100. However, the control computer 120 may have the function of the detection unit 106. In this case, it can be said that the radiation imaging apparatus according to this embodiment includes the radiation imaging apparatus 100 shown in FIG. 1 and a portion that functions as the detection unit 106 in the control computer 120. The imaging unit 110 will be described later with reference to FIG. 2. The control unit 107 controls the entire radiation imaging apparatus 100, including drive of the radiation imaging apparatus 100, and the like. The control unit 107 controls the imaging unit 110 by a driving method transmitted from the control computer 120 in accordance with user settings and the like. The driving method of the imaging unit 110 may be changed using radiation information output from the detection unit 106.

Figure 2:
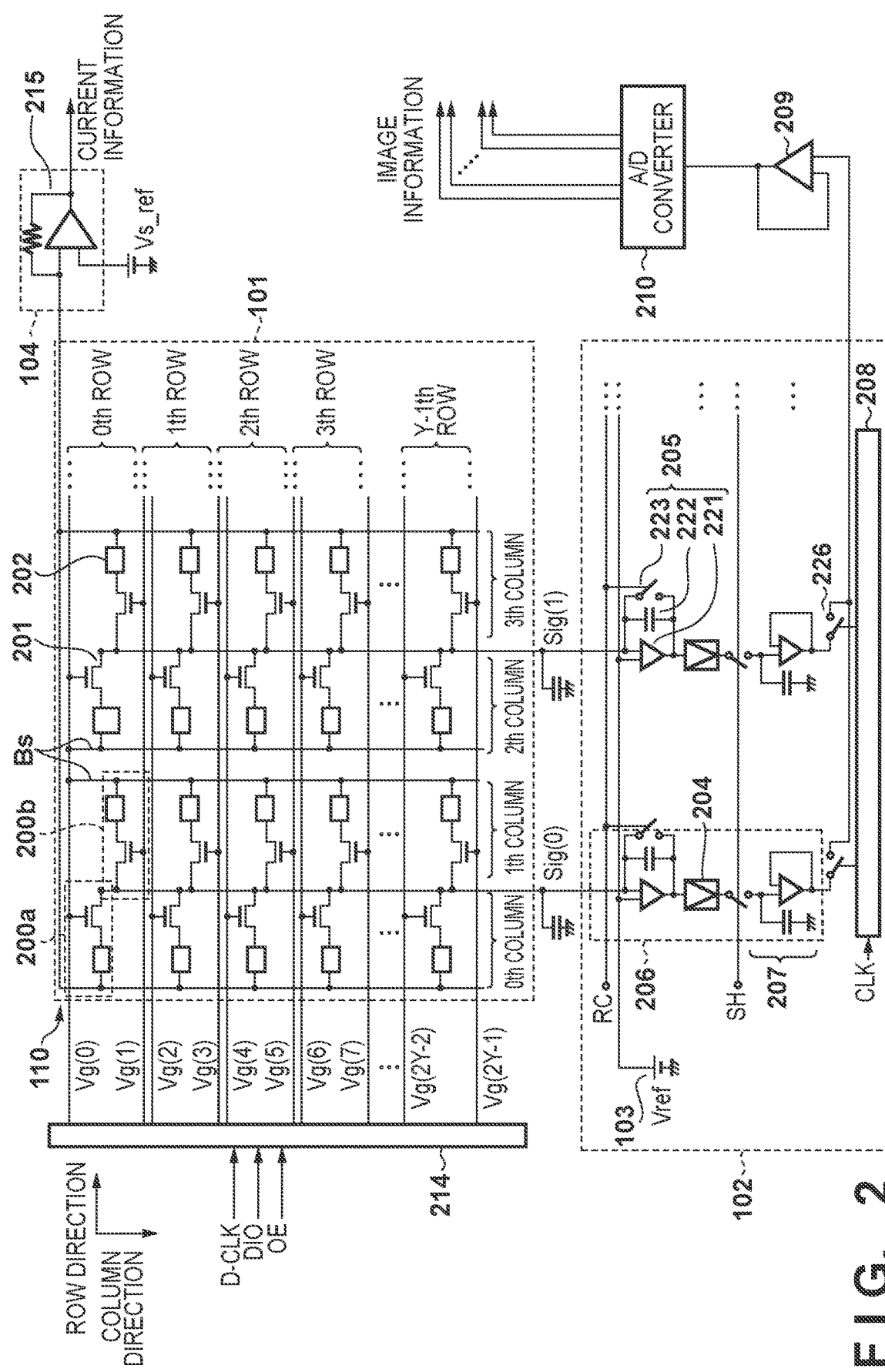
FIG. 2 is a circuit diagram showing an example of the arrangement of the radiation imaging apparatus shown in FIG. 1.

FIG. 2 is an equivalent circuit diagram showing an example of the arrangement of the imaging unit 110 of the radiation imaging apparatus 100 shown in FIG. 1. The imaging unit 110 includes the pixel unit 101, a driving circuit 214, the bias power supply unit 104, the read circuit 102, an output buffer amplifier 209, and an analog/digital (A/D) converter 210. The pixel unit 101 is a sensor in which a plurality of pixels 200 configured to detect radiation are arranged in a two-dimensional matrix, and outputs image information according to incident radiation. FIG. 2 shows some pixels of the pixels 200 arranged in the pixel unit 101 to simplify the explanation. However, the pixel unit 101 of the actual radiation imaging apparatus 100 can include more pixels, and, for example, the radiation imaging apparatus 100 of 17 inches can include the pixels 200 of about 2800 rows×2800 columns.

The pixel unit 101 is a two-dimensional detector including the plurality of pixels 200 arranged in a matrix. The pixel 200 includes a conversion element 202 that converts radiation into charges, and a switch element 201 that connects the conversion element 202 to a column signal line Sig and outputs an electrical signal corresponding to the charges. The conversion element 202 converts radiation of irradiation into charges. If the conversion element 202 is an indirect type conversion element including a photoelectric conversion element that converts light into charges, the pixel unit 101 further includes, for example, a wavelength conversion body such as a scintillator that converts radiation into light. A direct type conversion element directly converts radiation into charges. In this embodiment, the pixel unit 101 includes, on the radiation incidence side of the photoelectric conversion element, a wavelength conversion body that converts radiation into light in a wavelength band sensible by the photoelectric conversion element, and the conversion element 202 is an indirect type conversion element that detects the light converted by the wavelength conversion body. As the photoelectric conversion element, for example, a PIN photodiode using amorphous silicon as a main material is used. The switch element 201 can use a transistor including a control electrode and two main electrodes. For example, a thin film transistor (TFT) may be used as the switch element 201.

In each conversion element 202, one electrode is electrically connected to one of the two main electrodes of the switch element 201, and the other electrode is electrically connected to the bias power supply unit 104 via a bias line Bs common to the pixels 200. In the 0th row on the uppermost side shown in FIG. 2, the control electrodes of the switch elements 201 of the pixels 200 on the even-numbered columns (the 0th, second, fourth, . . . columns) are electrically connected to a drive line Vg(0) extending in the row direction. Additionally, in the 0th row, the control electrodes of the switch elements 201 of the pixels 200 on the odd-numbered columns (the first, third, fifth, . . . columns) are electrically connected to a drive line Vg(1). Similarly, in the kth row, the control electrodes of the switch elements 201 of the pixels 200 on the odd-numbered columns are electrically connected to a drive line Vg(2k), and the control electrodes of the switch elements 201 of the pixels 200 on the even-numbered columns are electrically connected to a drive line Vg(2k+1). In addition, two pixels 200 that are adjacent in the row direction are connected to a common column signal line of the plurality of column signal lines Sig. For example, the plurality of pixels 200 are adjacent to each other in the row direction, and include a pixel 200a and a pixel 200b, which are connected to a common column signal line Sig(0) in the plurality of column signal lines Sig. Here, the switch element 201 of the pixel 200a and the switch element 201 of the pixel 200b are connected to the drive lines Vg(0) and Vg(1) different from each other in the plurality of drive lines Vg, respectively. That is, in each of the switch elements 201 of the pixels 200 on the 2kth column and the (2k+1)th column (k=0, 1, 2, . . . ), one main electrode is connected to the conversion element 202, and the other main electrode is electrically connected to a common column signal line Sig(k).

Two drive lines Vg provided for each row of the pixels 200 are connected, in each row, to the control electrodes of the switch elements 201 to drive the switch elements 201 in the pixel group of the even-numbered column or the pixel group of the odd-numbered column. The driving circuit 214 is, for example, a shift register, and supplies drive signals to the switch elements 201 via the drive lines Vg, thereby controlling the conduction states of the switch elements 201. When the driving circuit 214 is controlled to set the drive signal of the drive line Vg(2k) to a conduction voltage and the drive signal of the drive line Vg(2k+1) to a non-conduction voltage, signals accumulated in the pixels 200 on the even-numbered columns are output to the column signal line Sig(k). When the drive signal of the drive line Vg(2k) is set to the non-conduction voltage, and the drive signal of the drive line Vg(2k+1) is set to the conduction voltage, signals accumulated in the pixels 200 on the odd-numbered columns are output to the column signal line Sig(k).

In the read circuit 102, an amplification circuit 206 that amplifies an electrical signal output from the pixel 200 to the signal line Sig is provided for each signal line Sig. The amplification circuit 206 includes an integration amplifier 205, a variable gain amplifier 204, and a sample hold circuit 207. The integration amplifier 205 amplifies the electrical signal output from the pixel 200 to the signal line Sig. The variable gain amplifier 204 amplifies the electrical signal output from the integration amplifier 205 by a variable gain. The sample hold circuit 207 samples and holds the electrical signal amplified by the variable gain amplifier 204. The integration amplifier 205 includes an operational amplifier 221 that amplifies the electrical signal output from the pixel 200 to the signal line Sig and outputs the signal, an integral capacitance 222, and a reset switch 223. The integration amplifier 205 can change the gain (amplification factor) by changing the value of the integral capacitance 222.

The read circuit 102 further includes a switch 226 arranged in correspondence with each amplification circuit 206, and a multiplexer 208. The multiplexer 208 sequentially sets the switches 226 in a conduction state, thereby sequentially outputting electrical signals output from the amplification circuits 206 in parallel to the output buffer amplifier 209 as a serial signal. The output buffer amplifier 209 impedance-converts and outputs the electrical signal. The analog/digital (A/D) converter 210 converts the analog electrical signal output from the output buffer amplifier 209 into a digital electrical signal, and outputs it as image information to the control computer 120 shown in FIG. 1.

According to control signals D-CLK, OE, and DIO output from the control unit 107, the driving circuit 214 outputs drive signals including a conduction voltage for setting the switch element 201 in a conduction state and a non-conduction voltage for setting the switch element 201 in a non-conduction state to the drive lines Vg. Thus, the driving circuit 214 controls the conduction state/non-conduction state of the switch elements 201 and drives the pixel unit 101.

The power supply unit 105 shown in FIG. 1 transforms power from a battery or outside in accordance with each power supply such as the reference power supply 103 or the bias power supply unit 104, and supplies the power. The reference power supply 103 supplies a reference potential Vref to the noninverting input terminal of the operational amplifier 221. The bias power supply unit 104 applies a bias potential Vs_ref to the conversion element 202 of each pixel 200 via the bias line Bs, and outputs, to the detection unit 106, current information including a time fluctuation in the amount of the current supplied to the bias line Bs. As an example of a circuit that outputs current information, the bias power supply unit 104 can include a current-voltage conversion circuit 215 including an operational amplifier, as shown in FIG. 2. However, the circuit that outputs current information is not limited to the arrangement of the current-voltage conversion circuit 215. For example, the bias power supply unit 104 may include a current-voltage conversion circuit using a shunt resistor. Alternatively, for example, an A/D conversion circuit that converts the output voltage of the current-voltage conversion circuit 215 into a digital value may be arranged between the bias power supply unit 104 and the detection unit 106, and current information may be output as a digital value to the detection unit 106. The bias power supply unit 104 may output, to the detection unit 106, an appropriate physical amount corresponding to a current supplied (flowing) to the bias line Bs. A detailed example of the arrangement of the current-voltage conversion circuit 215 will be described later with reference to FIG. 5.

Figure 3:
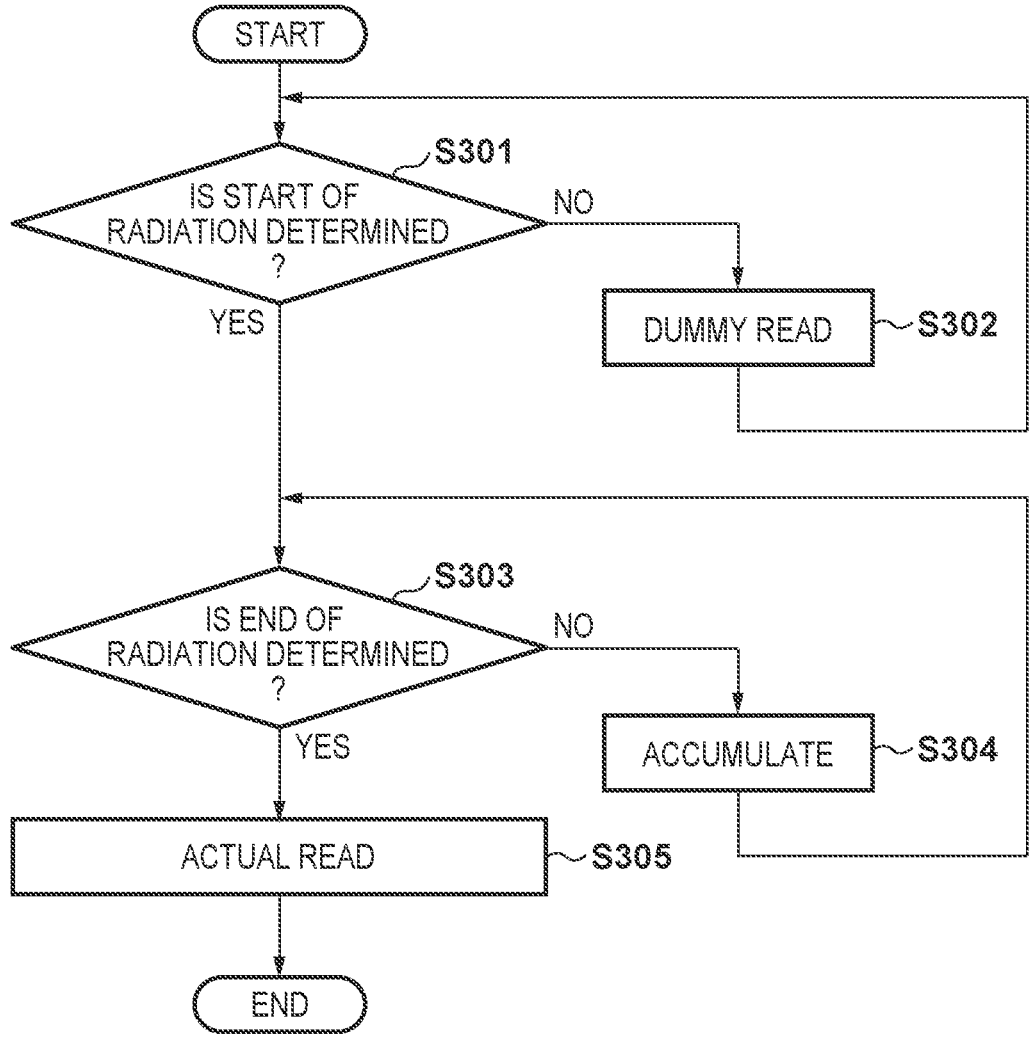
FIG. 3 is a flowchart for explaining the operation of the radiation imaging apparatus shown in FIG. 2.

FIG. 3 is a flowchart showing an example of the operation of the radiation imaging apparatus 100 according to this embodiment. As described above, the constituent elements of the radiation imaging apparatus 100 are controlled by the control unit 107. When a user performs setting of imaging conditions for radiation images, and the like, first, in step S301, the detection unit 106 acquires radiation information from the information of a current flowing to the bias line Bs, which is acquired from the bias power supply unit 104, and determines whether radiation irradiation started. More specifically, the detection unit 106 determines the presence/absence of radiation irradiation based on the current flowing to the bias line Bs. As the determination of the start of radiation irradiation, the detection unit 106 may use a method of acquiring the amount of charges accumulated in the conversion elements 202 of the pixels 200 from the radiation information, and if the intensity of radiation obtained from the amount of charges exceeds a predetermined threshold, determining that radiation irradiation is started. If the detection unit 106 determines that radiation irradiation is not started (NO in step S301), the radiation imaging apparatus 100 advances to step S302, and the control unit 107 causes the driving circuit 214 to perform reset driving (to be sometimes referred to as dummy read hereinafter) of removing the charges accumulated in the conversion elements 202 of the pixels 200 by a dark current. The dummy read is performed sequentially from the top row (0th row) to the final row ((Y−1)th row), and returns to the top row when reaching the final row.

If the detection unit 106 determines that radiation irradiation is started (YES in step S301), the radiation imaging apparatus 100 advances to step S303, and the control unit 107 determines whether the radiation irradiation ended. As the determination of the end of radiation irradiation, the control unit 107 may use a method of determining that the radiation irradiation has ended when a predetermined time has elapsed from the determination of the start of radiation irradiation. Alternatively, the control unit 107 may acquire the amount of charges accumulated in the conversion elements 202 of the pixels 200 from the radiation information acquired by the detection unit 106, and if the intensity of radiation obtained from the amount of charges falls below a predetermined threshold, determine that the radiation irradiation has ended. If the end of radiation irradiation is not determined (NO in step S303), in step S304, the driving circuit 214 in the radiation imaging apparatus 100 performs driving (to be sometimes referred to as accumulation hereinafter) of setting the switch elements 201 of the pixels 200 configured to acquire a radiation image in the non-conduction state and accumulating a signal converted from radiation. If the end of radiation irradiation is determined (YES in step S303), the radiation imaging apparatus 100 advances to step S305, and the driving circuit 214 and the read circuit 102 perform driving (to be sometimes referred to as actual read hereinafter) of reading out charges generated in the conversion elements 202 of the pixels 200. The actual read can be performed sequentially from the top row (0th row) of the pixels 200 arranged in the pixel unit 101 to the final row ((Y−1)th row). When the actual read reaches the final row, the series of imaging operations ends.

Figure 4:
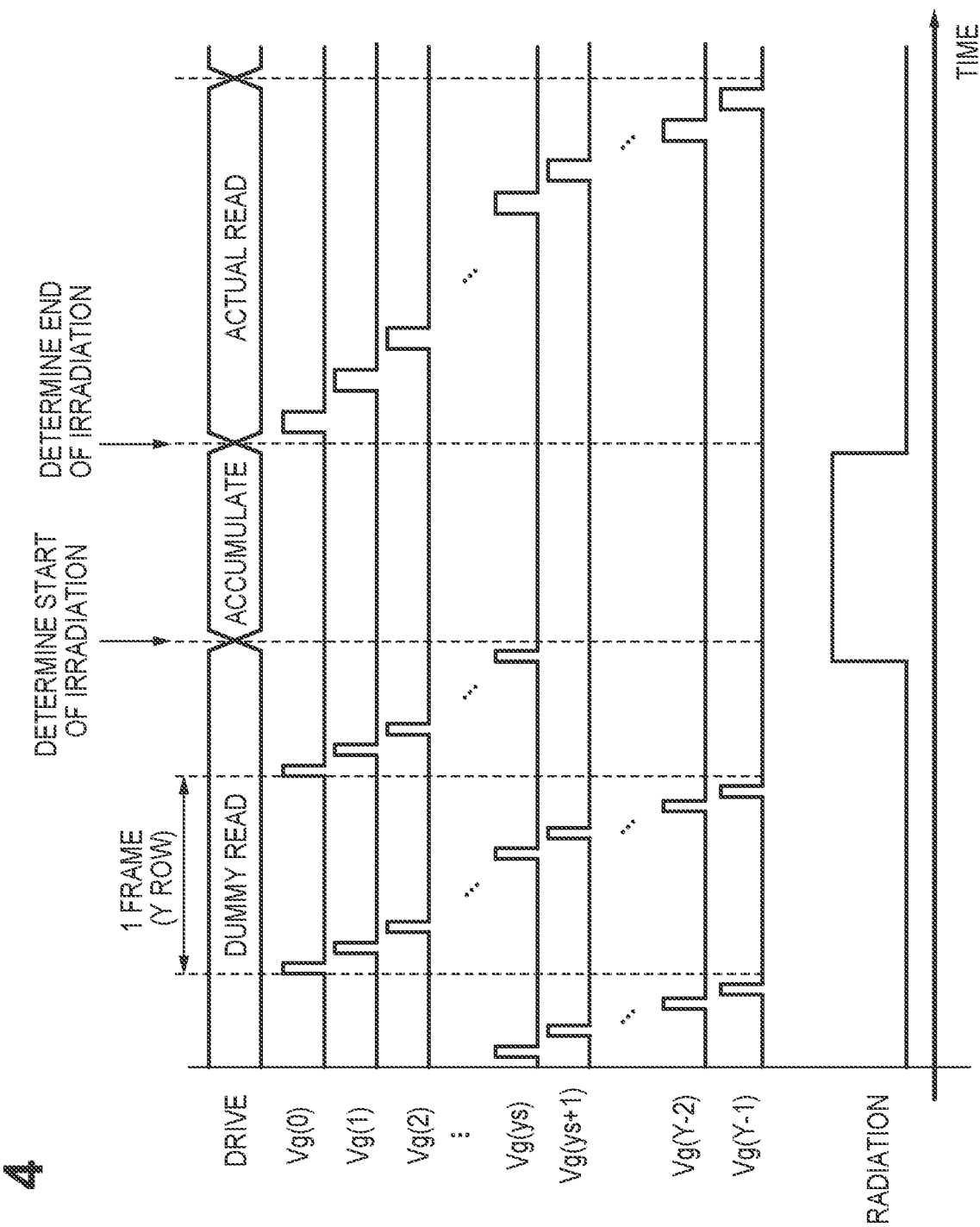
FIG. 4 is a timing chart for explaining the operation of the radiation imaging apparatus shown in FIG. 2.

FIG. 4 is a schematic view of the drive timing of the radiation imaging apparatus 100. The control unit 107 causes the driving circuit 214 to repetitively execute the driving (dummy read) of setting the switch elements 201 in the conduction state sequentially from the top row (0th row) to the final row ((Y−1)th row) of the pixel unit 101 until radiation irradiation is started. If the dummy read reaches the final row ((Y−1)th row) until radiation irradiation is started, the process returns to the top row (0th row) to repeat the dummy read.

If the detection unit 106 detects (determines) the start of radiation irradiation, the control unit 107 transitions to driving (accumulation) of setting, via the driving circuit 214, the switch elements 201 on the rows to which all the pixels 200 configured to acquire a radiation image are connected in the non-conduction state. Details of the determination of the presence/absence of radiation irradiation will be described later. The accumulation continues until it is determined that the radiation irradiation has ended. If the radiation irradiation has ended, the control unit 107 controls the driving circuit 214 and the read circuit 102 to perform actual read of setting the switch elements 201 in the conduction state sequentially from the top row (0th row) to the final row ((Y−1)th row) and reading signals from the pixels 200.

Figure 5:
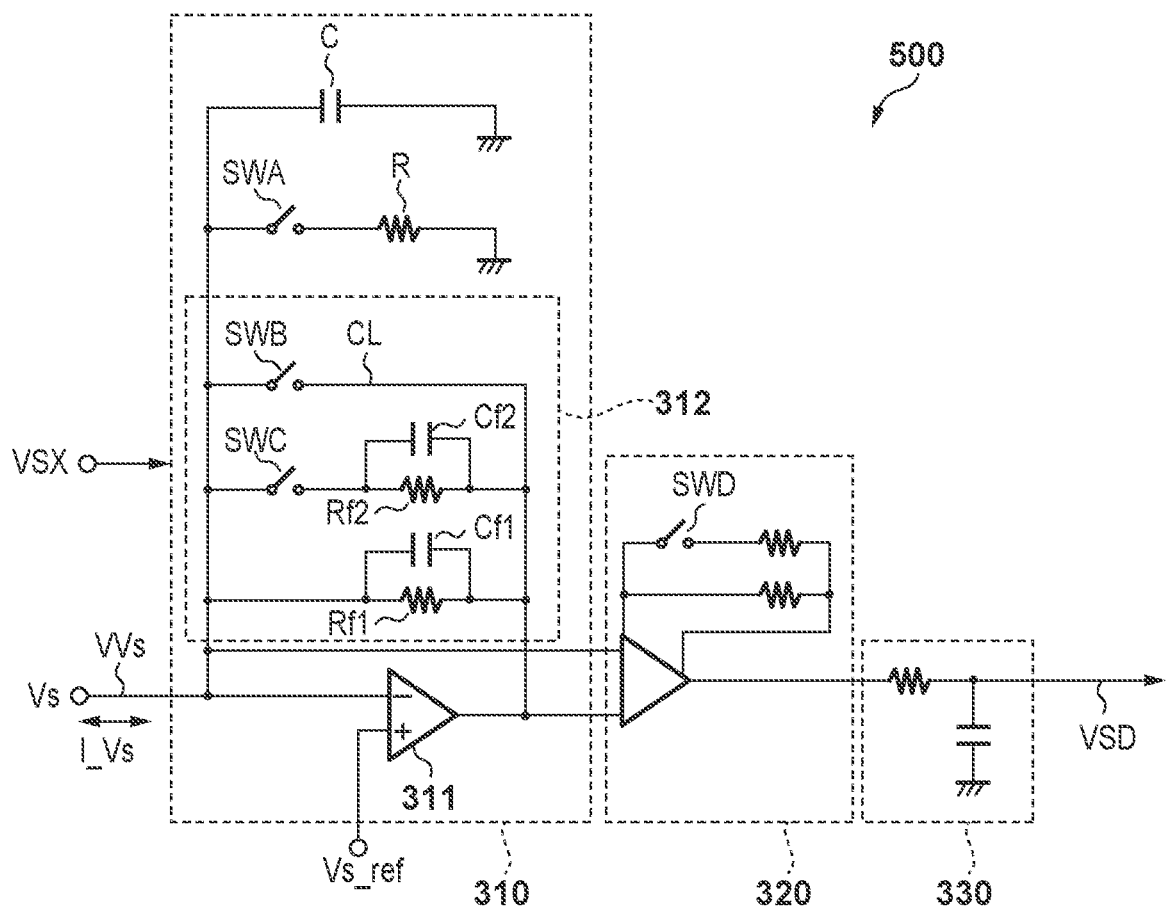
FIG. 5 is a circuit diagram showing an example of the arrangement of the current-voltage conversion circuit of the radiation imaging apparatus shown in FIG. 2.

FIG. 5 is an equivalent circuit diagram showing an example of the arrangement of a detection circuit 500 applicable as the current-voltage conversion circuit 215. The detection circuit 500 detects a current flowing to the bias line Bs, and provides a bias current signal VSD representing the current flowing to the bias line Bs to the detection unit 106.

The detection circuit 500 can include, for example, a current-voltage conversion amplifier 310, a voltage amplifier 320, and a filter circuit 330. The current-voltage conversion amplifier 310 converts the current flowing to the bias line Bs into a voltage. The voltage amplifier 320 amplifies a signal (voltage signal) output from the current-voltage conversion amplifier 310. The voltage amplifier 320 can be formed by, for example, an instrumentation amplifier or the like. The filter circuit 330 is a filter that limits the band of the signal output from the voltage amplifier 320, and can be, for example, a low-pass filter. Current information that has passed through the low-pass filter is supplied to the detection unit 106.

The current-voltage conversion amplifier 310 not only detects the current flowing to the bias line Bs but also supplies, to the bias line Bs, a potential according to the reference bias potential Vs_ref supplied from the power supply unit 105 to the bias power supply unit 104. As the current-voltage conversion amplifier 310, a transimpedance amplifier or the like can be used. The current-voltage conversion amplifier 310 includes, for example, an operational amplifier 311, and a feedback path 312 arranged between the inverting input terminal and the output terminal of the operational amplifier 311. The reference bias potential Vs_ref is applied to the noninverting input terminal of the operational amplifier 311. The current-voltage conversion amplifier 310 includes the feedback path 312, thereby functioning to generate, in the inverting input terminal, a potential according to the reference bias potential Vs_ref applied to the noninverting input terminal of the operational amplifier 311. More specifically, the current-voltage conversion amplifier 310 functions to generate, in the inverting input terminal, almost the same potential as the reference bias potential Vs_ref supplied to the noninverting input terminal of the operational amplifier 311.

As shown in FIG. 5, a plurality of paths may be arranged in the feedback path 312, and the path to be enabled may appropriately be switched by switches SWA, SWB, and SWC. The control unit 107 may supply a control signal VSX to the detection circuit 500, thereby selecting a path to be enabled from the plurality of paths provided in the feedback path 312 and controlling the impedance (to be referred to as a feedback impedance hereinafter) of the feedback path 312 of the current-voltage conversion amplifier 310. For example, the feedback impedance may be controlled in the following way in accordance with the driving state of the radiation imaging apparatus 100.

During dummy read driving, to quickly detect the start of radiation irradiation to the pixel unit 101, the current flowing to the bias line Bs is to be detected with a high sensitivity. Hence, during dummy read driving, the feedback impedance (the gain of the current-voltage conversion amplifier 310) may be made large. On the other hand, during actual read driving, when transferring charges accumulated in the conversion elements 202 to the signal line Sig, if the feedback impedance is large, current supply from the bias line Bs to the conversion elements 202 delays. In particular, if strong radiation partially enters the pixel unit 101, an artifact (crosstalk) readily occurs in an image due to the delay of current supply from the bias line Bs to the conversion elements 202. Hence, the feedback impedance may be made small during actual read driving.

Figure 31:
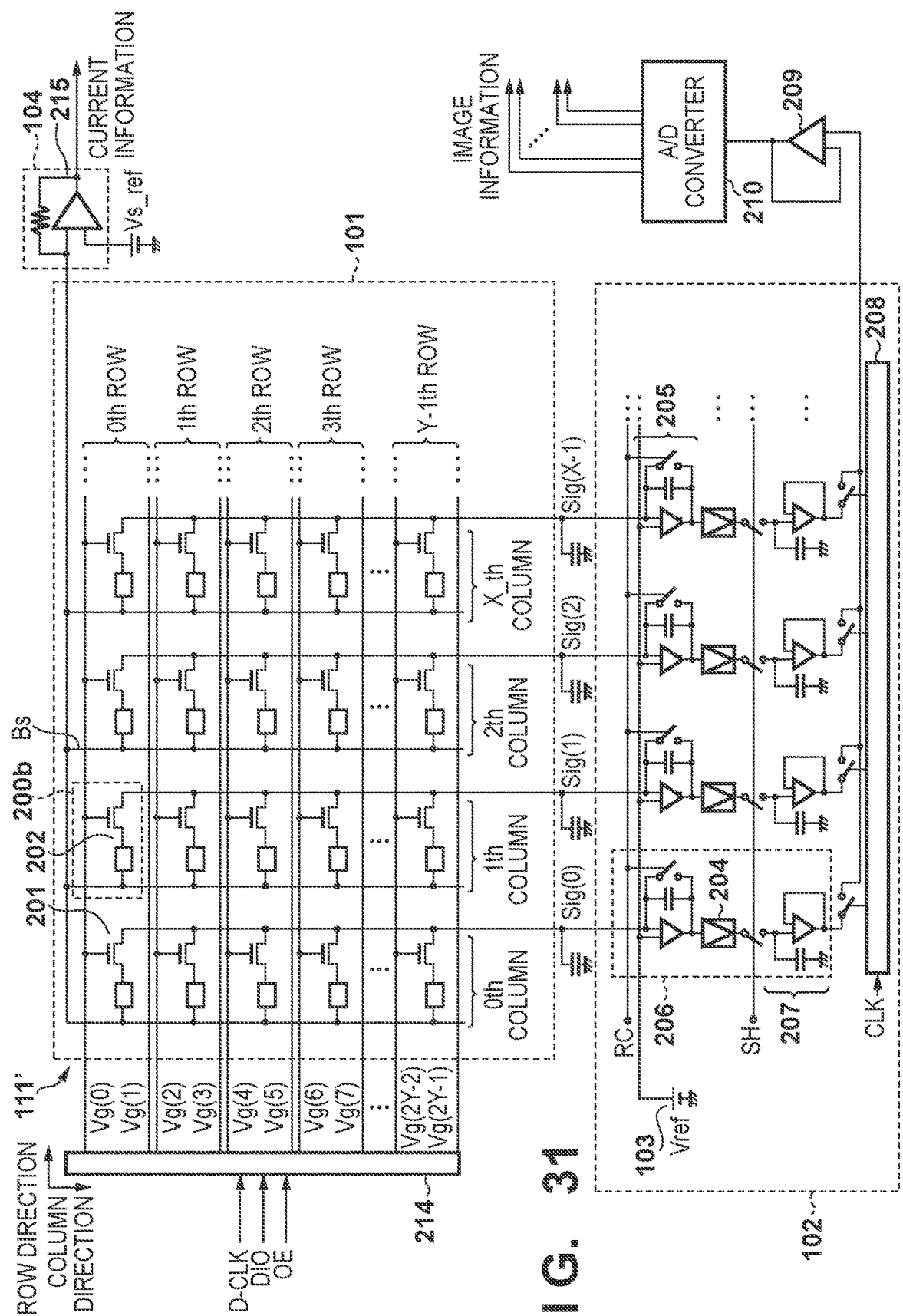
FIG. 31 is a circuit diagram showing an example of the arrangement of a radiation imaging apparatus according to a comparative example.

When the current-voltage conversion circuit 215 including the above-described detection circuit 500 and the finite feedback impedance is combined with the imaging unit 110 according to this embodiment, the following effects can be obtained. When the imaging unit 110 according to this embodiment is compared with, for example, an imaging unit 111 according to a comparative example as shown in FIG. 31, the number of switch elements 201 set in the conduction state when the voltage of one drive line Vg is set to the conduction voltage during actual read driving is ½. Hence, the total amount of a current that the current-voltage conversion circuit 215 should supply from the bias line Bs to the conversion elements 202 is also almost ½. That is, if the feedback impedance of the current-voltage conversion circuit 215 does not change, the crosstalk generation amount is almost halved as compared to the imaging unit 111 of the comparative example. Additionally, when the imaging unit 110 according to this embodiment is used, even if the feedback impedance of the current-voltage conversion circuit 215 is increased to almost twice, the allowable crosstalk amount remains the same as in the imaging unit 111 of the comparative example. Hence, alternatives for the circuit design of the current-voltage conversion circuit 215 increase.

FIG. 6A is a plan view showing an example of the arrangement of eight pixels 200 near (the nth row and 2mth column) of the pixel unit 101. In the arrangement shown in FIG. 6A, the conversion elements 202 arranged on an even-numbered column and the conversion elements 202 arranged on an odd-numbered column are arranged at point-symmetrical positions across the common signal line Sig. In addition, the switch elements 201 arranged on an even-numbered column and the switch elements 201 arranged on an odd-numbered column are arranged at point-symmetrical positions across the common signal line Sig. However, the arrangement is not limited to this. For example, the conversion elements 202 arranged on an even-numbered column and the conversion elements 202 arranged on an odd-numbered column may be arranged at line-symmetrical positions across the common signal line Sig. Similarly, the switch elements 201 arranged on an even-numbered column and the switch elements 201 arranged on an odd-numbered column may be arranged at line-symmetrical positions across the common signal line Sig.

FIG. 6B is a sectional view taken along a line A-A' in FIG. 6A. In the arrangement shown in FIG. 6B, a substrate 400 is an insulating substrate of glass, plastic, or the like. The switch element 201 is formed on the substrate 400, and includes a control electrode 401, a main electrode 402, a main electrode 403, and an insulating layer 404. The control electrode 401 and the drive line Vg, and the main electrode 402 and the signal line Sig can integrally be formed by common conductive films. The insulating layer 404 functions as the gate insulating film of the switch element 201. The switch element 201 may include a light-shielding layer (not shown) on the switch element 201. The conversion element 202 includes a PIN photodiode that is a photoelectric conversion element, and the PIN photodiode is formed by stacking an electrode 411, a semiconductor layer 412, and an electrode 414 in this order. Of these, the semiconductor layer 412 is formed by stacking an impurity semiconductor layer 4121, an intrinsic semiconductor layer 4122, and an impurity semiconductor layer 4123 in this order. In this embodiment, the main electrode 403 of the switch element 201 and the electrode 411 of the conversion element 202 can integrally formed by a common conductive film. However, they may be made of different conductive materials.

The switch element 201 and the conversion element 202 are covered with a common insulating layer 420 except an opening portion 450 provided in a part on the electrode 414. The bias line Bs is provided on the insulating layer 420. A conductive layer 430 electrically connects the bias line Bs and the electrode 414 via the opening portion 450. The bias line Bs can be formed by, for example, a metal film, and the conductive layer 430 can be formed by, for example, a transparent conductive film of ITO or the like. A protection layer 440 covers the whole components described above. The insulating layer 404, the insulating layer 420, and the protection layer 440 can be made of an inorganic insulating material such as silicon nitride. Furthermore, a scintillator (not shown) that converts radiation into light with a wavelength detectable by the PIN photodiode functioning as the conversion element 202 is provided on the protection layer 440.

An integrated circuit (IC) chip used in the read circuit 102 is expensive because the analog amplifier, the analog/digital (A/D) converter, and the like are integrated at a high density, and its cost accounts a large percentage of the member cost of the radiation imaging apparatus 100. In the arrangement of U.S. Pat. No. 8,674,313, since a dose sensor configured to detect radiation irradiation, and a dose feedback output unit are arranged in addition to a sensor substrate, a driving circuit, and a read circuit, the member cost can rise. In this embodiment, the pixels 200 arranged on two columns that are adjacent to each other share the column signal line Sig that outputs a signal. Since this can halve the number of amplification circuits 206 in the read circuit 102, the member cost of the IC chips and the like used in the amplification circuits 206 can be reduced. Furthermore, the detection unit 106 determines the presence/absence of radiation irradiation based on a current flowing to the bias line Bs configured to supply a bias potential to the conversion element 202 of each pixel 200 configured to obtain a radiation image. As compared to a case in which a dose sensor or the like configured to detect radiation irradiation is provided in addition to the radiation imaging apparatus 100, the presence/absence of radiation irradiation can be determined without increasing the member cost. In addition, since the bias lines Bs are arranged throughout the pixel unit 101, the presence/absence of radiation irradiation can be determined irrespective of the region of the pixel unit 101 irradiated with radiation.

Figure 7A:
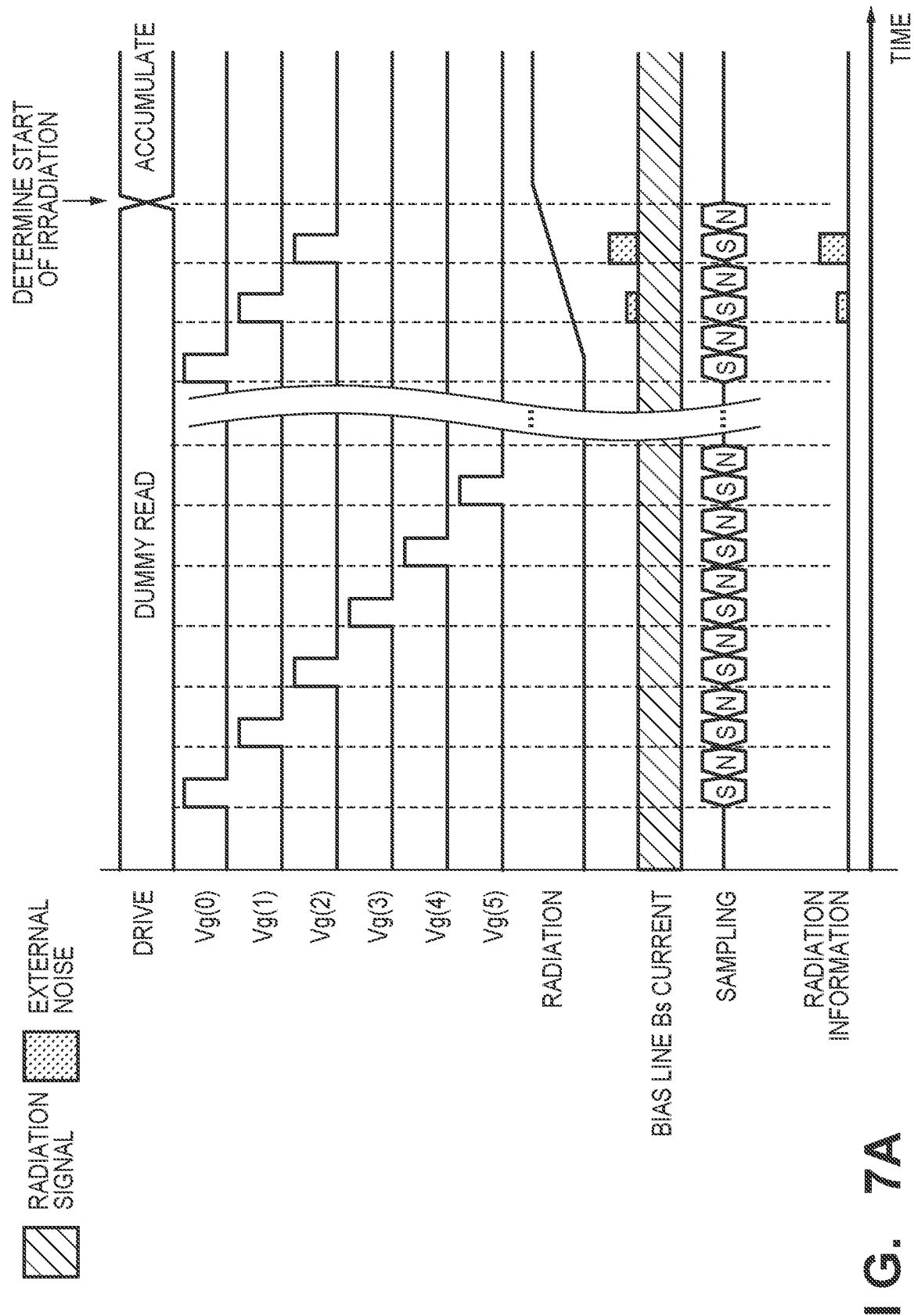
FIGS. 7A and 7B are timing charts for explaining a correlated double sampling driving operation of the radiation imaging apparatus shown in FIG. 2.

FIG. 7A shows a timing chart in a case in which correlated double sampling (CDS) driving is performed when the start of radiation irradiation is determined in the detection unit 106. The detection unit 106 may determine the presence/absence of radiation irradiation based on a signal value representing a current flowing to the bias line Bs when the driving circuit 214 sets the switch element 201 of one of plurality of pixels 200 in the conduction state. However, when CDS is performed, the presence/absence of radiation irradiation can be determined more accurately. To acquire the information of a current flowing to the bias line Bs, a current flowing to the bias line Bs when the switch element 201 of one of the pixels 200 arranged in the pixel unit 101 is set in the conduction state is sampled as a signal value S. In addition, a current flowing to the bias line Bs when the switch element 201 of the pixel 200 arranged in the pixel unit 101 is in the non-conduction state is sampled as a signal value N. The detection unit 106 determines the presence/absence of radiation irradiation based on the signal value S and the signal value N. For example, the detection unit 106 can accurately determine the presence/absence of radiation irradiation by removing a noise component using the difference between the signal values S and N that continue.

Figure 7B:
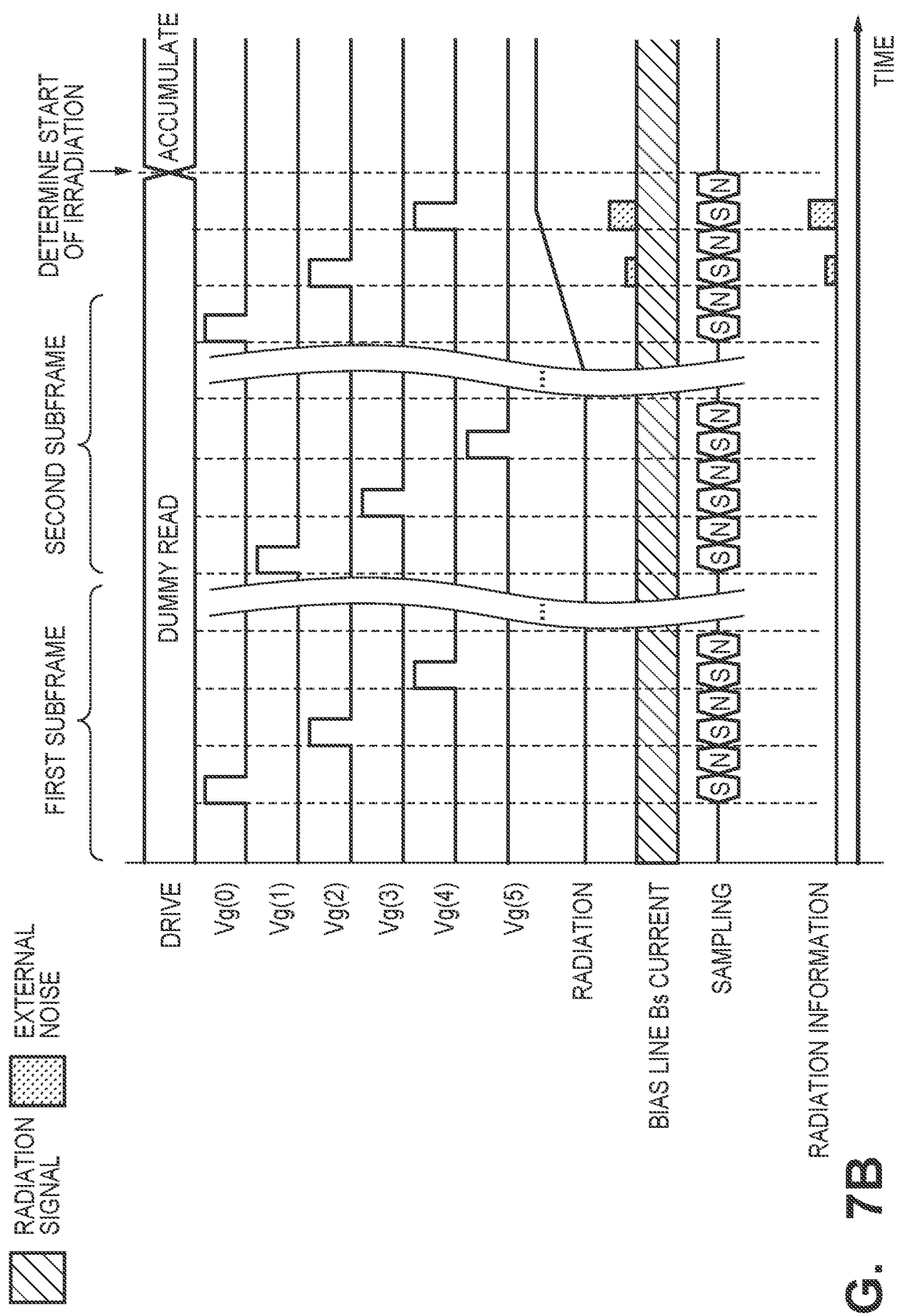

FIG. 7B is a timing chart of a modification of FIG. 7A. In the arrangement shown in FIG. 7A, a case in which dummy read is performed sequentially from the top row (0th row) to the final row ((Y−1)th row) has been described. On the other hand, in the arrangement shown in FIG. 7B, a first subframe in which the drive lines Vg(0), Vg(2), Vg(4), . . . are sequentially set to the conduction voltage, and the switch elements 201 of the pixels 200 on the even-numbered columns are sequentially set in the conduction state, and a second subframe in which the drive lines Vg(1), Vg(3), Vg(5), . . . are sequentially set to the conduction voltage, and the switch elements 201 of the pixels 200 on the odd-numbered columns are sequentially set in the conduction state are repeated. Even by this driving, when the noise component is removed by performing CDS using the signal value S and the signal value N, the presence/absence of radiation irradiation can accurately be detected, as in FIG. 7A.

In addition, the operation shown in FIG. 7B can suppress the occurrence probability of a detection error of the determination of the start of radiation irradiation (a phenomenon that the start of irradiation is determined even if radiation irradiation is absent). In general, a delay (time lag) exists from the start of radiation irradiation to the determination of the start of irradiation. For this reason, some of the signal charges of the pixels 200 near a row Ys shown in FIG. 4, where the start of radiation irradiation is determined, may flow to the read circuit 102 during the dummy read period, and an artifact (loss) may occur in the image information output by actual read. This loss can be removed by performing image correction by the control computer 120 shown in FIG. 1 or the like. However, in a case in which, for example, radiation irradiation is performed at a high dose rate, the loss amount may increase, and it may be impossible to completely remove the loss because correction fails. To avoid this phenomenon, a determination threshold Th1 for the start of radiation irradiation described above is set relatively low (a high sensitivity to radiation irradiation). In this case, the occurrence frequency of a detection error caused by external noise increases. That is, the certainty of loss removal and suppress of the occurrence frequency of a detection error have a trade-off relationship. On the other hand, when the imaging unit 110 including the equivalent circuit shown in FIG. 2 is driven using the timing chart of FIG. 7B, for example, even if some of the signal charges of the pixels 200 near the row Ys on the even-numbered columns are lost during the first subframe period, the loss of the pixels 200 on the even-numbered columns can be corrected using the signal charges of the pixels 200 of the odd-numbered columns That is, it is possible to set the determination threshold Th1 relatively high (a low sensitivity to radiation irradiation) and suppress a detection error.

During dummy read driving, instead of setting the potentials of the drive lines Vg to the conduction potential one by one (driving the pixels on a half of a row are at once), a plurality of drive lines Vg may be set to the conduction potential at once. As compared to a case in which the potentials of the drive lines Vg are set to the conduction potential one by one, the number of pixels 200 driven at once increases, and the amount of the current flowing to the bias line Bs increases. It is therefore possible to raise the sensitivity of the determination of the start of radiation irradiation.

For example, when setting two drive lines Vg to the conduction potential at once, two continuous drive lines (for example, the drive lines Vg(0) and the drive line Vg(1), the drive lines Vg(2) and the drive line Vg(3), . . . ) may be simultaneously sequentially set to the conduction voltage. Alternatively, two continuous even-numbered drive lines (for example, the drive lines Vg(0) and the drive line Vg(2), the drive lines Vg(4) and the drive line Vg(6), . . . ) may be simultaneously sequentially set to the conduction voltage, and the driving reaches the final row. Next, two continuous odd-numbered drive lines (for example, the drive lines Vg(1) and the drive line Vg(3), the drive lines Vg(5) and the drive line Vg(7), . . . ) may be simultaneously sequentially set to the conduction voltage. In addition, when setting four drive lines Vg to the conduction potential at once, four continuous drive lines (for example, the drive lines Vg(0) to the drive line Vg(3), the drive lines Vg(4) to the drive line Vg(7), . . . ) may be simultaneously sequentially set to the conduction voltage. Alternatively, four continuous even-numbered drive lines (for example, the drive lines Vg(0), (2), (4), and (6), . . . ) may be simultaneously sequentially set to the conduction voltage, and the driving reaches the final row. Next, four continuous odd-numbered drive lines (for example, the drive lines Vg(1), (3), (5), and (7), . . . ) may be simultaneously sequentially set to the conduction voltage.

Figure 8:
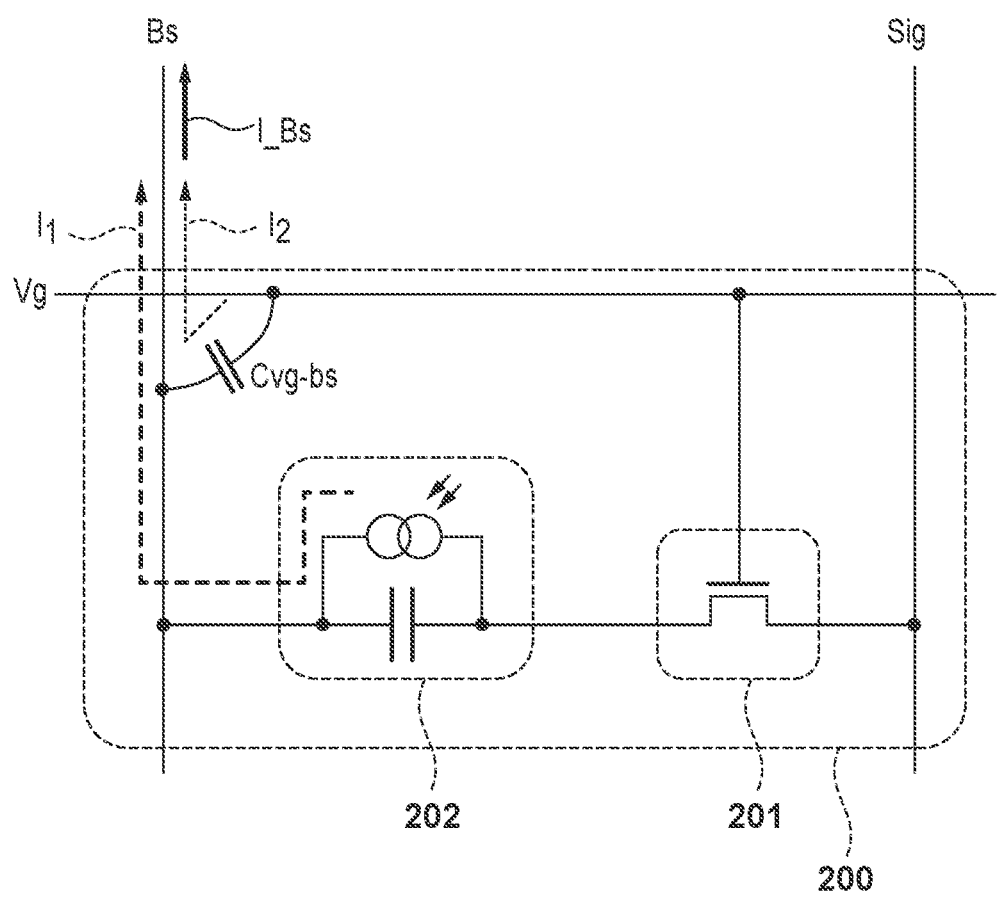
FIG. 8 is a view for explaining a current flowing to a bias line of the radiation imaging apparatus shown in FIG. 2.

During dummy read driving, when the interwire capacitance between the drive line Vg and the bias line Bs is reduced in each pixel 200 arranged in the pixel unit 101, the determination of the start of radiation irradiation can be performed with a higher sensitivity. FIG. 8 is a view for explaining a current I_Bs flowing to the bias line Bs in the pixel 200. A description will be made assuming that the capacity of the conversion element 202 is Cs, and the drive line Vg and the bias line Bs have an interwire capacitance Cvg-bs. A non-conduction voltage applied to the drive line Vg is defined as Voff, and a conduction voltage is defined as Von. If the potential of the drive line Vg is switched from Voff to Von, the current I_Bs flowing to the bias line Bs includes following components I1 and I2.

Component I1: a current formed when charges generated by conversion from radiation by the conversion element 202 flow into the bias power supply unit 104 via the bias line Bs.

Component I2: a current that is caused by capacitive coupling between the drive line Vg and the bias line Bs and is proportional to Cvg-bs×(Von−Voff).

The component I1 is generated when the radiation imaging apparatus 100 is irradiated with radiation. The component I2 is generated when switching the potential of the drive line Vg from Voff to Von (or from Von to Voff) independently of the presence/absence of radiation irradiation. In the radiation imaging apparatus 100, to detect the presence/absence of radiation irradiation with a high sensitivity, the SN ratio of the current flowing to the bias line Bs (the ratio of the component I1 to the component I2) is to be raised. That is, it is effective to reduce the interwire capacitance Cvg-bs.

In addition, during actual read driving, to reduce crosstalk, it is effective to reduce the interwire capacitance Cvg-bs in the pixel 200. This is because when the interwire capacitance Cvg-bs is reduced, the RC time constant of the bias line Bs becomes small, and current supply from the bias line Bs to the conversion element 202 is quickly performed.

FIG. 9A is a plan view of the pixels 200 considering reduction of the interwire capacitance Cvg-bs. FIG. 9B is a sectional view taken along a line A-A' in FIG. 9A. In this embodiment, the line widths of the drive line Vg and the bias line Bs are made narrower in an intersection portion 460 between the drive line Vg and the bias line Bs. As shown in FIG. 9A, in this embodiment, the line widths of both the drive line Vg and the bias line Bs are narrower near the intersection portion 460. However, the aspect of the embodiments is not limited to this. In an orthographic projection to the pixel unit 101, at least one of the width of the drive line Vg and the width of the bias line Bs narrower in the portion (intersection portion 460) are made where the drive line Vg and the bias line Bs cross than in the remaining portions. This can reduce the interwire capacitance Cvg-bs as compared to the arrangement shown in FIG. 6A.

Even in the radiation imaging apparatus 100 including the pixels 200 having the arrangement shown in FIGS. 9A and 9B, it is possible to determine the presence/absence of radiation irradiation without increasing the member cost and irrespective of the region of the pixel unit 101 irradiated with radiation. Also, with the arrangement shown in FIGS. 9A and 9B, the detection sensitivity of the determination of the presence/absence of radiation irradiation during dummy read driving improves as compared to the arrangement shown in FIGS. 6A and 6B, and crosstalk during actual read driving decreases.

Figure 10:
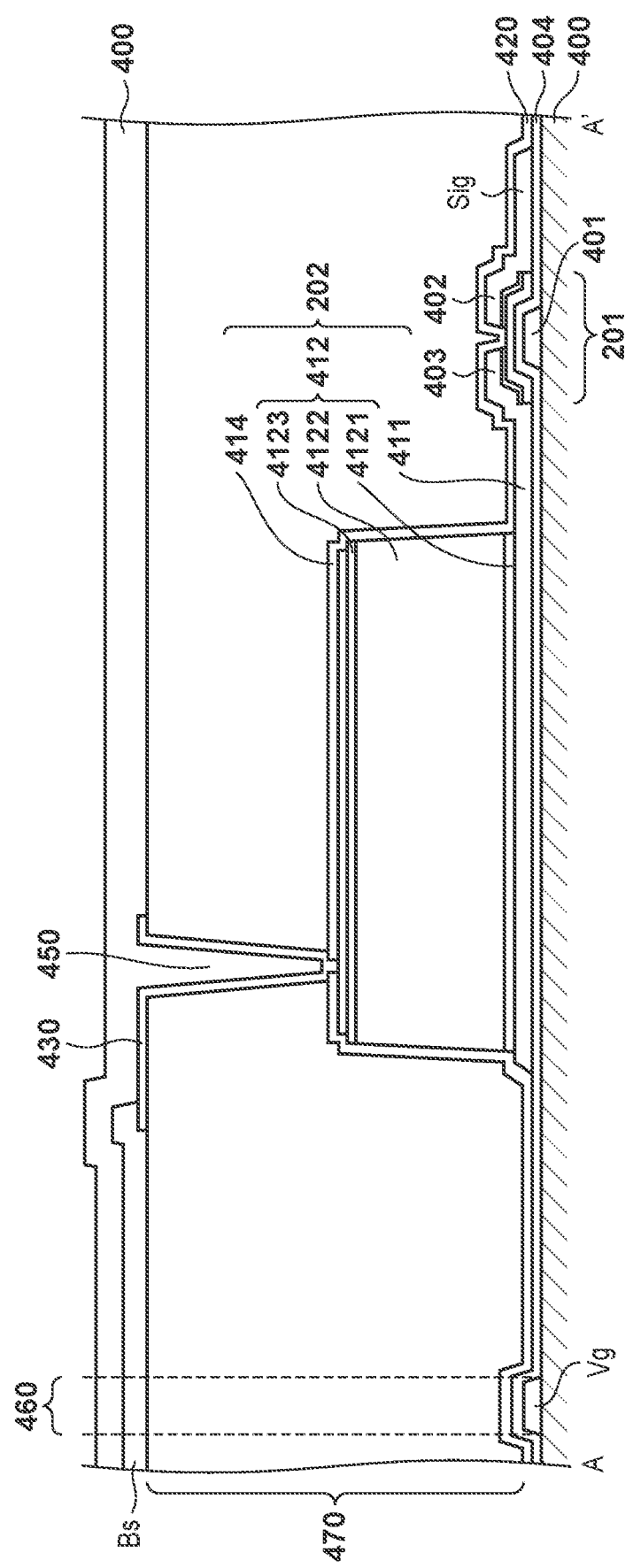
FIG. 10 is a sectional view showing an example of the arrangement of a pixel of the radiation imaging apparatus shown in FIG. 2.

Another method of reducing interwire capacitance Cvg-bs will be described next with reference to FIG. 10. FIG. 10 is a sectional view of the pixel 200 taken along a line A-A' in FIG. 6A. In the pixel 200 shown in FIG. 10, a planarization layer 470 is inserted between the drive line Vg and the bias line Bs, thereby making the drive line Vg and the bias line Bs apart in the height direction, as compared to the arrangement shown in FIG. 6B. This reduces the interwire capacitance Cvg-bs.

In the arrangement shown in FIG. 10, the planarization layer 470 configured to suppress the step difference formed by the conversion element 202 and the switch element 201 arranged on the substrate 400 is arranged to cover the conversion element 202 and the switch element 201. The drive line Vg is arranged on the side of the substrate 400 with respect to the planarization layer 470, and the bias line Bs is arranged on a side apart from the substrate 400 with respect to the planarization layer 470. The structure of the switch element 201 can be similar to that in the arrangement shown in FIG. 6B. In the arrangement shown in FIG. 10, the planarization layer 470 is inserted on the upper side of the conversion element 202 (between the insulating layer 420 and the conductive layer 430). However, the aspect of the embodiments is not limited to this. When the planarization layer 470 is arranged in an arbitrary portion between the drive line Vg and the bias line Bs, the effect of reducing the interwire capacitance Cvg-bs can be obtained.

For the planarization layer 470, a material of a low specific dielectric constant (for example, $\varepsilon/\varepsilon_0=2$ to 5), such as photosensitive acryl or polyimide, may be used. The film thickness can be relatively thick to 1 to 5 μm. Hence, this is effective in reducing the capacitive coupling in the intersection portion 460 where the drive line Vg and the bias line Bs cross. The opening portion 450 is provided in the insulating layer 420 and the planarization layer 470, and the conductive layer 430 electrically connects the bias line Bs and the electrode 414 via the opening portion 450.

Even in the radiation imaging apparatus 100 including the pixels 200 having the arrangement shown in FIG. 10, it is possible to determine the presence/absence of radiation irradiation without increasing the member cost and irrespective of the region of the pixel unit 101 irradiated with radiation. Also, with the arrangement shown in FIG. 10, the interwire capacitance Cvg-bs is reduced, the detection sensitivity of the determination of the presence/absence of radiation irradiation during dummy read driving improves as compared to the arrangement shown in FIGS. 6A and 6B, and crosstalk during actual read driving decreases.

Figure 11A:
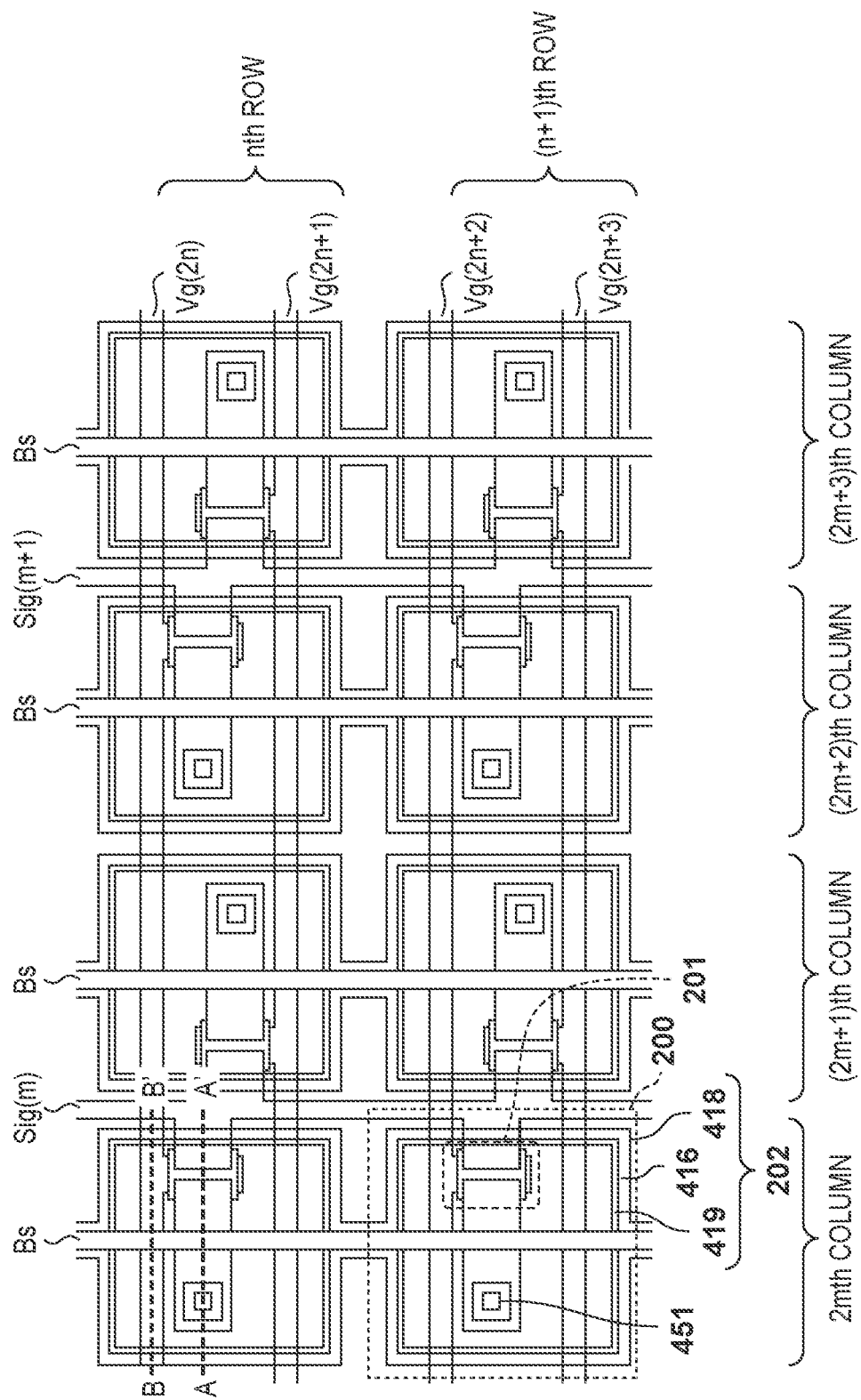
FIG. 11A is a plan view showing an example of the arrangement of pixels of the radiation imaging apparatus shown in FIG. 2.

Still another method of reducing interwire capacitance Cvg-bs will be described next with reference to FIGS. 11A to 11C. FIG. 11A is a plan view showing an example of the arrangement of the eight pixels 200 near (the nth row and 2mth column) of the pixel unit 101. FIGS. 11B and 11C are sectional views taken along a line A-A' and a line B-B' in FIG. 11A, respectively. In the arrangement shown in FIGS. 11A to 11C, the planarization layer 470 is inserted between the switch element 201 and the conversion element 202.

In the arrangement shown in FIGS. 11A to 11C, the planarization layer 470 configured to suppress the step difference formed by the switch element 201 arranged on the substrate 400 is arranged to cover the switch element 201. The drive line Vg is arranged on the side of the substrate 400 with respect to the planarization layer 470, and the conversion element 202 and the bias line Bs are arranged on a side apart from the substrate 400 with respect to the planarization layer 470. The structure of the switch element 201 is almost the same as in the arrangement shown in FIG. 6B. However, the switch element 201 is covered with the insulating layer 420 and the planarization layer 470 except an opening portion 451 provided in a part on the main electrode 403. The insulating layer 420 can be made of an inorganic insulating film such as silicon nitride, and the planarization layer 470 can be made of photosensitive acryl or polyimide. An electrode 416 of a photodiode that is the conversion element 202 is formed on the planarization layer 470. The electrode 416 is formed by a conductive film different from the main electrode 403 of the switch element 201, and, for example, a transparent conductive film of ITO or the like can be used. The electrode 416 and the main electrode 403 are electrically connected via a conductor formed in the opening portion 451. In this embodiment, the photodiode that is the conversion element 202 is a MIS photodiode, and is formed by stacking the electrode 416, an insulating layer 417, a semiconductor layer 418, and an electrode 419 in this order. Of these, the semiconductor layer 418 is formed by stacking an intrinsic semiconductor layer 4181 and an impurity semiconductor layer 4182 in this order. The bias line Bs is provided on the electrode 419 to extend in the column direction, and the electrode 419 and the bias line Bs are electrically connected. The protection layer 440 covers the whole components.

In the arrangement shown in FIGS. 11A to 11C, the planarization layer 470 is arranged between the switch element 201 and the conversion element 202. Hence, in an orthographic projection to the pixel unit 101, at least parts of the conversion element 202 and the switch element 201 can be arranged to overlap each other in each of the plurality of pixels 200. As a result, the pixel opening ratio (the ratio of the light-receiving area of the photodiode to the layout area of the pixels) can be increased. Also, as shown in FIG. 11A, in the orthographic projection to the pixel unit 101, the bias line Bs may be arranged to overlap the conversion element 202 of each of the plurality of pixels 200. Since the bias line Bs is electrostatically shielded from the drive line Vg by the lower electrode (the electrode 416 in FIG. 11B) of the conversion element 202, the interwire capacitance Cvg-bs can further be reduced.

Even in the radiation imaging apparatus 100 including the pixels 200 having the arrangement shown in FIGS. 11A to 11C, it is possible to determine the presence/absence of radiation irradiation without increasing the member cost and irrespective of the region of the pixel unit 101 irradiated with radiation. Also, with the arrangement shown in FIGS. 11A to 11C, since the bias line Bs is electrostatically shielded from the drive line Vg by the lower electrode of the conversion element 202, the interwire capacitance Cvg-bs can be reduced. As a result, the detection sensitivity of the determination of the presence/absence of radiation irradiation during dummy read driving improves as compared to the arrangement shown in FIGS. 6A and 6B, and crosstalk during actual read driving decreases.

Figure 12:
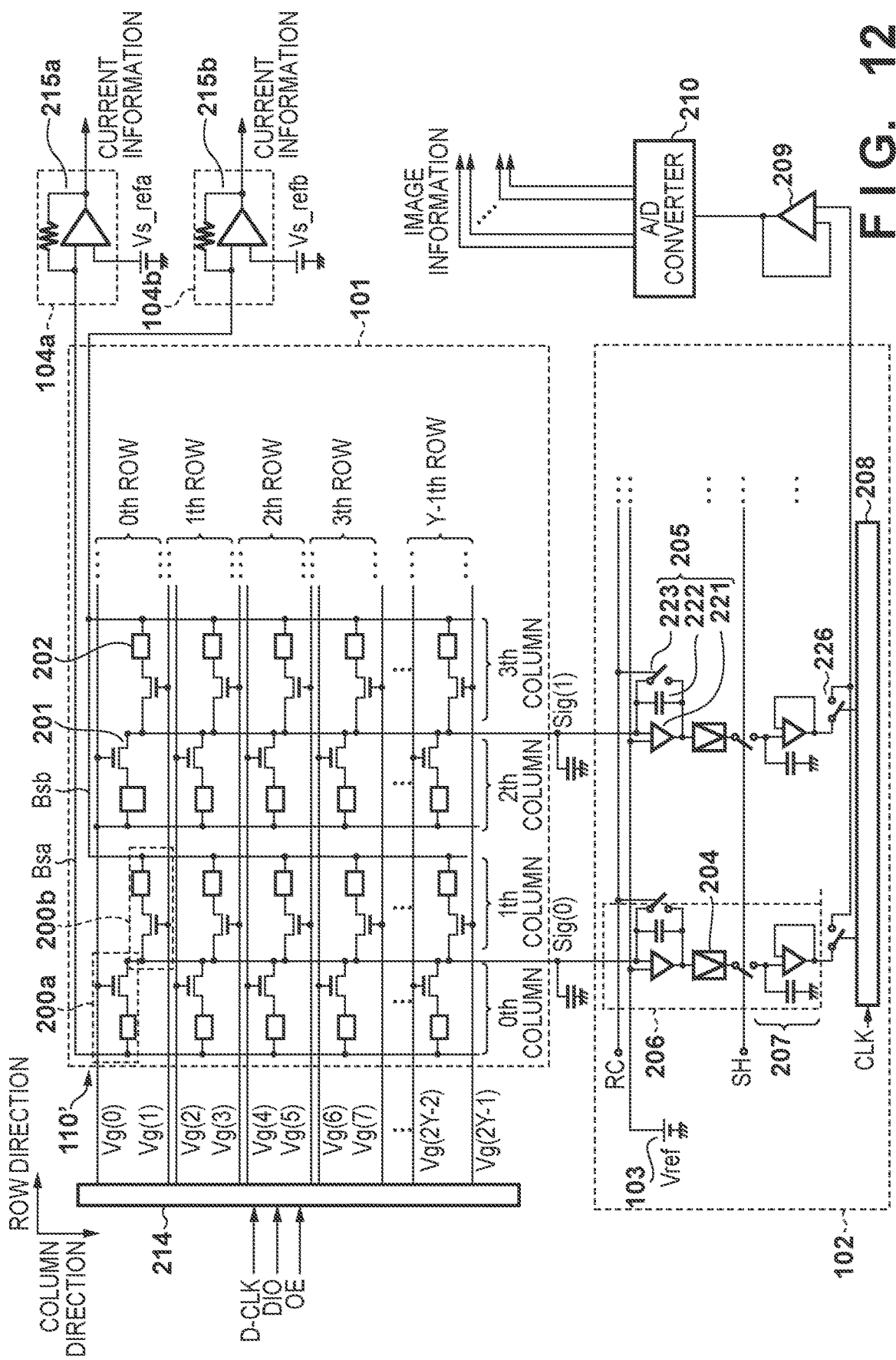
FIG. 12 is a circuit diagram showing an example of the arrangement of the radiation imaging apparatus shown in FIG. 1.

FIG. 12 is an equivalent circuit diagram showing an example of the arrangement of imaging unit 110' as a modification of the imaging unit 110 shown in FIG. 2. In the imaging unit 110', the bias power supply unit 104 includes a bias power supply unit 104a and a bias power supply unit 104b. In addition, the bias line Bs includes a bias line Bsa connected to the bias power supply unit 104a, and a bias line Bsb connected to the bias power supply unit 104b and is electrically independent of the bias line Bsa. In the conversion element 202 of each of the pixels 200 (for example, the pixels 200a) on the even-numbered columns, one electrode is electrically connected to one of the two main electrodes of the switch element 201, and the other electrode is electrically connected to the bias power supply unit 104a via the bias line Bsa. Similarly, in the conversion element 202 of each of the pixels 200 (for example, the pixels 200b) on the odd-numbered columns, one electrode is electrically connected to one of the two main electrodes of the switch element 201, and the other electrode is electrically connected to the bias power supply unit 104b via the bias line Bsb. The bias power supply unit 104a applies a bias potential Vs_refa to the conversion element 202 of the pixel 200 via the bias line Bsa, and also outputs, to the detection unit 106, current information including a time fluctuation in the current amount supplied to the bias line Bsa. Similarly, the bias power supply unit 104b applies a bias potential Vs_refb to the conversion element 202 of the pixel 200 via the bias line Bsb, and also outputs, to the detection unit 106, current information including a time fluctuation in the current amount supplied to the bias line Bsb. The bias power supply unit 104a and the bias power supply unit 104b can operate independently without correlation with each other. For example, the power supply unit 105 may be configured to include two voltage output buffers independent of each other, and the reference power supplies Vs_refa and Vs_refb output from these may be input to the bias power supply units 104a and 104b, respectively. Alternatively, the power supply unit 105 may be configured to include two DC/DC converters independent of each other, and the reference power supplies Vs_refa and Vs_refb from voltage output buffers connected to these may be input to the bias power supply units 104a and 104b, respectively. The DC/DC converters can be configured to have, for example, the same oscillation frequency and different phases. The bias potential Vs_refa and the bias potential Vs_refb can individually be set. The bias potential Vs_refa supplied by the bias power supply unit 104a and the bias potential Vs_refb supplied by the bias power supply unit 104b may be potentials different from each other. As the structure of the pixel 200, any of the arrangements shown in FIGS. 6A, 6B, 9A, 9B, 10, and 11A to 11C can be used.

Figure 13A:
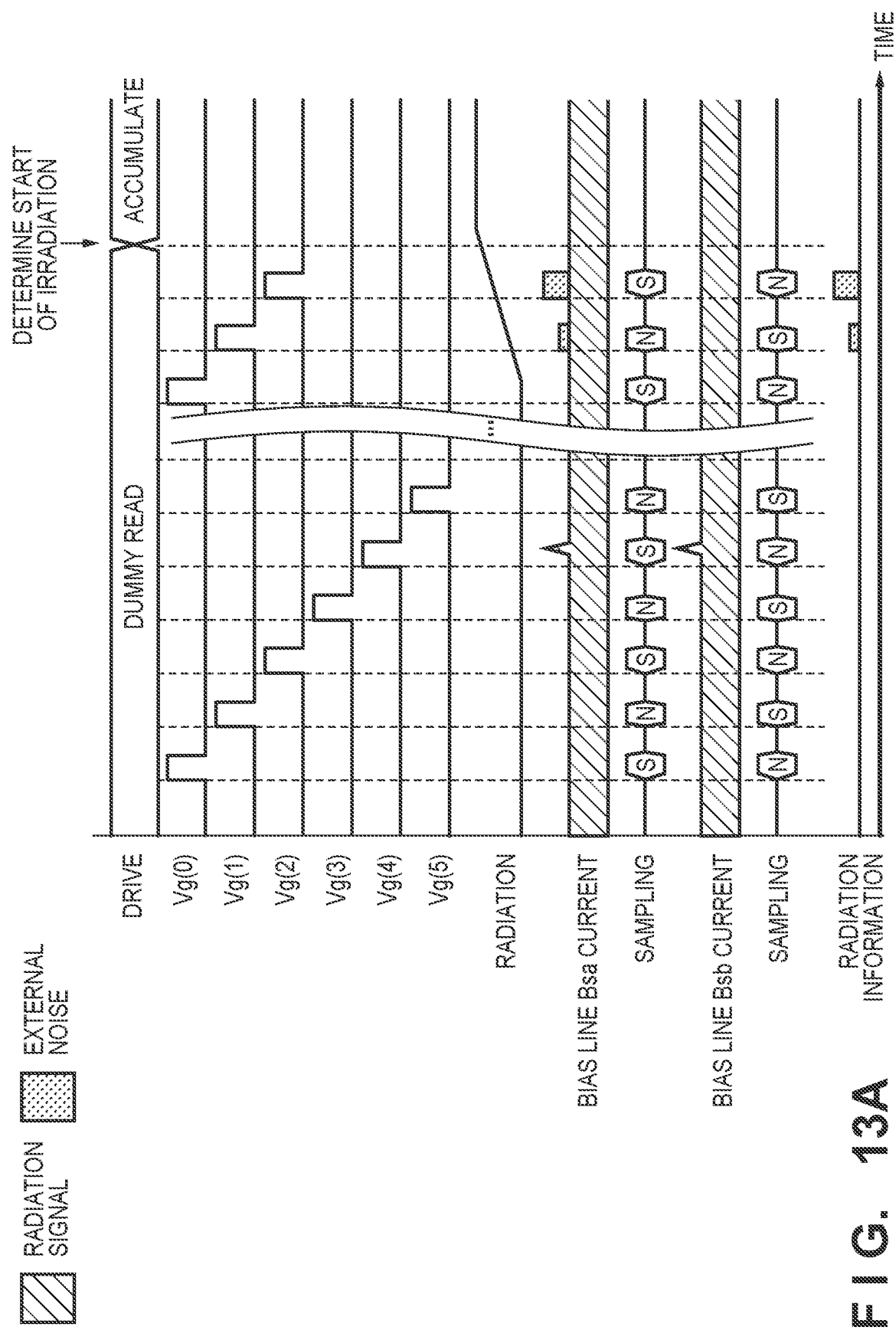
FIGS. 13A and 13B are timing charts for explaining the correlated double sampling driving operation of the radiation imaging apparatus shown in FIG. 12.

FIG. 13A shows a timing chart in a case in which the detection unit 106 performs CDS driving in the radiation imaging apparatus 100 including the imaging unit 110' shown in FIG. 12. Here, currents flowing to the bias line Bsa connected to the bias power supply unit 104a and the bias line Bsb connected to the bias power supply unit 104b can individually be sampled.

When the drive line Vg(0) is set to the conduction voltage, and the remaining drive lines Vg are set to the non-conduction voltage, the switch elements 201 of the pixels 200 on the 0th row and the odd-numbered columns are electrically conducted with the column signal line Sig. At this time, if radiation is emitted, the component I1 of the current based on charges converted from the above-described radiation flows into the current of the bias power supply unit 104a via the bias line Bsa. On the other hand, since the switch elements 201 of the pixels 200 connected to the bias power supply unit 104b via the bias line Bsb are not conducted, the component I1 does not flow in. The detection unit acquires the signal value S representing the current flowing to the bias line Bsa when the switch element 201 of one of the pixels 200 whose conversion elements 202 are connected to the bias power supply unit 104a is in the conduction state, and the signal value N representing the current flowing to the bias line Bsb when the switch elements 201 of the pixels 200 whose conversion elements 202 are connected to the bias power supply unit 104b are in the non-conduction state such that the sampling timings at least partially overlap. The detection unit 106 may simultaneously sample the signal value S and the signal value N. The detection unit 106 can remove the noise component and determine the presence/absence of radiation irradiation based on the sampled signal values S and N, for example, by calculating the difference between the signal value S and the signal value N.

Figure 13B:
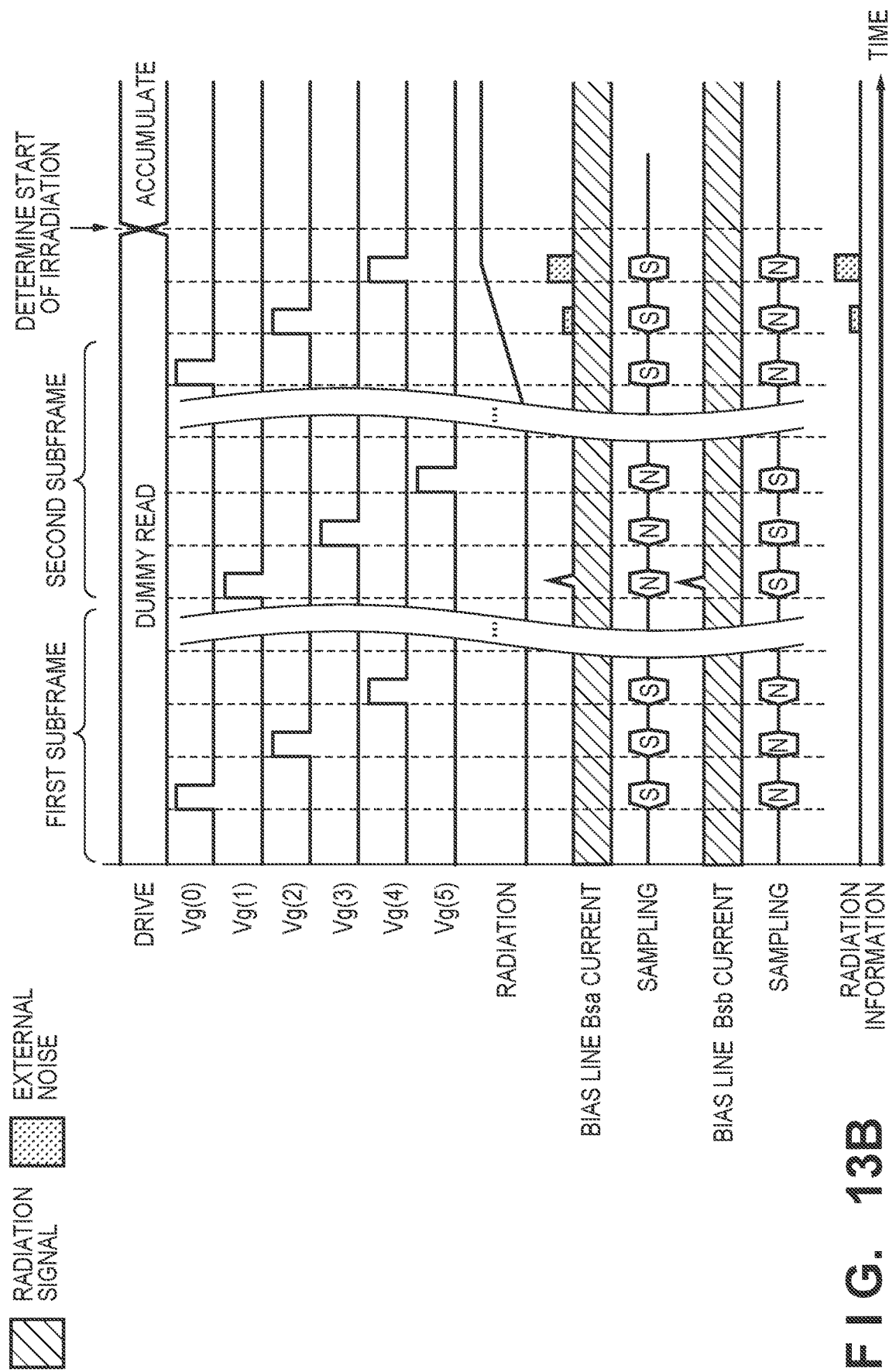

For example, a case in which external noise is input during a time in which the drive line Vg(4) is set to the conduction voltage, as shown in FIG. 13A, will be considered. This can be considered as a case in which, for example, an object moves, and an impact is applied to the radiation imaging apparatus 100. In this case, if the signal value S is acquired by setting the drive line Vg(4) to the conduction voltage, and the signal value N is then acquired by setting the drive line Vg(5) to the conduction voltage, the detection unit 106 may erroneously determine that radiation irradiation is started when the difference between the signal value S and the signal value N is calculated. On the other hand, when the detection unit 106 simultaneously samples the signal value S and the signal value N, as shown in FIG. 13A, the external noise component can be removed more accurately as compared to driving shown in FIGS. 7A and 7B. This can further improve the accuracy of the determination of the presence/absence of radiation irradiation. Additionally, as shown in FIG. 13B, the first subframe in which the switch elements 201 of the pixels 200 on the even-numbered columns are sequentially set in the conduction state and the second subframe in which the switch elements 201 of the pixels 200 on the odd-numbered columns are sequentially set in the conduction state may alternately repeated, as in FIG. 7B described above.

Even in the radiation imaging apparatus 100 including the imaging unit 110' having the arrangement shown in FIG. 12, it is possible to determine the presence/absence of radiation irradiation without increasing the member cost and irrespective of the region of the pixel unit 101 irradiated with radiation. Furthermore, when the currents flowing to the bias lines Bs of the two systems are simultaneously sampled, the presence/absence of radiation irradiation can be determined more accurately than the above-described imaging unit 110.

In some cases, a current flows to the bias line Bs due to not radiation irradiation but, for example, an impact applied to the radiation imaging apparatus 100. If the current flowing due to noise is large, it may erroneously be detected that the apparatus is irradiated with radiation even if the apparatus is not irradiated with radiation. Japanese Patent Laid-Open No. 2014-168203 shows that the influence of noise can be reduced by detecting the presence/absence of radiation irradiation based on a valid value and a noise value. However, it may be impossible to cope with noise including a high frequency component generated when, for example, an impact is applied to the radiation imaging apparatus.

FIG. 14 is an equivalent circuit diagram showing an example of the arrangement of the imaging unit 110 of the radiation imaging apparatus 100. The imaging unit 110 shown in FIG. 14 is a modification of the imaging unit 110 shown in FIG. 2 described above, which is configured to suppress a radiation detection error caused by, for example, an impact applied to the radiation imaging apparatus 100. FIG. 14 shows the pixel unit 101 including pixels PIX of 6 rows×6 columns to simplify the explanation. However, the pixel unit 101 of the actual radiation imaging apparatus 100 can include more pixels, and, for example, the radiation imaging apparatus 100 of 17 inches can include the pixels PIX of about 2800 rows×2800 columns. Here, the pixel PIX corresponds to the pixel 200 shown in FIG. 2 and the like described above.

The pixel unit 101 is a two-dimensional detector including the plurality of pixels PIX arranged in a matrix. The pixel PIX includes a conversion element S (S11 to S66) that converts radiation into charges, and a switch element T (T11 to T66) that connects the conversion element S to the column signal line Sig and outputs an electrical signal corresponding to the charges. Here, the conversion element S and the switch element T correspond to the conversion element 202 and the switch element 201 shown in FIG. 2 and the like described above, respectively. In this embodiment, the conversion element S is an indirect type conversion element including a photoelectric conversion element, and a wavelength conversion body arranged on the radiation incidence side of the photoelectric conversion element and configured to convert radiation into light in a wavelength band sensible by the photoelectric conversion element. As the photoelectric conversion element that converts light into charges, a MIS photodiode arranged on an insulating substrate such as a glass substrate and made using a semiconductor material such as amorphous silicon as a main material may be used. Alternatively, as the photoelectric conversion element, not only the MIS photodiode but also, for example, a PIN photodiode may be used. As the conversion element S, a direct type conversion element that directly converts radiation into charges may be used. As the switch element T, a transistor including a control terminal and two main terminals may be used. In this embodiment, a thin film transistor (TFT) is used as the switch element T.

One electrode of the conversion element S is electrically connected to one main terminal of the two main terminals of the switch element T, and the other electrode of the conversion element S is electrically connected to a bias power supply unit 203 of the bias power supply unit 104 via the bias line Bs. The plurality of switch elements T arranged in the row direction (the lateral direction of the drawing), for example, the switch elements T11, T13, and T15 have the control terminals commonly electrically connected to a drive line Vg1-1 of the first row, and a drive signal for controlling the conduction state of the switch elements T is supplied from the driving circuit 214 via the drive line Vg. The driving circuit 214 controls the switch elements T of the pixels PIX via the plurality of drive lines Vg arranged along the row direction. In each of the plurality of switch elements T arranged along the column direction (the vertical direction of the drawing), for example, the switch elements T11 to T61, the other main terminal of the two main terminals is electrically connected to a column signal line Sig1 of the first column. During the conduction state, each switch element T outputs an electrical signal corresponding to the charges in the conversion element S to the read circuit 102 via the signal line. The column signal lines Sig1 to Sig6 can transmit electrical signals output from the plurality of pixels PIX to the read circuit 102 in parallel on a column basis.

In the read circuit 102, the amplification circuit 206 that amplifies electrical signals output from the pixel unit 101 in parallel is provided for each signal line. The amplification circuit 206 includes the integration amplifier 205 that amplifies an output electrical signal, the variable gain amplifier 204 that amplifies the electrical signal output from the integration amplifier 205, the sample hold circuit 207 that samples and holds the amplified electrical signal, and the buffer amplifier 209. The integration amplifier 205 includes an operational amplifier that amplifies the electrical signal read out from the pixel PIX and outputs the signal, an integral capacitance, and a reset switch. The integration amplifier 205 can change the amplification factor by changing the value of the integral capacitance. The electrical signal output from the pixel PIX is input to the inverting input terminal of the integration amplifier 205, the reference potential Vref is input from the reference power supply 103 to the noninverting input terminal, and the amplified electrical signal is output from the output terminal. In addition, the integral capacitance is arranged between the inverting input terminal and the output terminal of the operational amplifier. The sample hold circuit 207 is provided for each amplification circuit 206 and formed by a sampling switch and a sampling capacitor. The read circuit 102 also includes the multiplexer 208 that sequentially outputs electrical signals parallelly read out from the amplification circuit 206 and outputs the signals as an image signal of a serial signal. An image signal Vout that is an analog electrical signal output from the buffer amplifier 209 is converted into digital image data by the A/D converter 210 and output to the control computer 120 shown in FIG. 1.

The power supply unit 105 (not shown in FIG. 14) transforms power from a battery or outside for each power supply, and supplies the power to the reference power supply 103 of the amplification circuit, the bias power supply unit 104, and the like shown in FIG. 14. The reference power supply 103 supplies the reference voltage Vref to the noninverting input terminal of the operational amplifier. The bias power supply unit 203 of the bias power supply unit 104 commonly supplies a bias potential Vs to the other electrode of the two electrodes of the conversion element S via the bias line Bs. In addition, the bias power supply unit 203 of the bias power supply unit 104 outputs current information including a time fluctuation in the amount of a current flowing to the bias line Bs to the detection unit 106. In this embodiment, as a circuit that outputs current information, the bias power supply unit 203 includes the current-voltage conversion circuit 215 including an operational amplifier and a resistor. However, the circuit is not limited to this arrangement. For example, the bias power supply unit 203 may include a current-voltage conversion circuit using a shunt resistor. Alternatively, the bias power supply unit 203 may further include an A/D conversion circuit that converts the output voltage of the current-voltage conversion circuit into a digital value, and current information may be output as a digital value. The bias power supply unit 203 may output, to the detection unit 106, an appropriate physical amount corresponding to the current amount supplied (flowing) to the bias line Bs.

According to the control signals D-CLK, OE, and DIO input from the control unit 107 shown in FIG. 1, the driving circuit 214 outputs drive signals including a conduction voltage Vcom for setting the switch element T in a conduction (ON) state and a non-conduction voltage Vss for setting the switch element T in a non-conduction (OFF) state to the drive lines. Thus, the driving circuit 214 controls ON or OFF of the switch elements T and drives the pixel unit 101. The control signal D-CLK is the shift clock of a shift register used as the driving circuit 214. The control signal DIO is a pulse transferred by the shift register, and the control signal OE is a signal for controlling the output terminal of the shift register. By the above-described control signals, the necessary time and the scan direction of driving are set.

In addition, the control unit 107 supplies control signals RC, SH, and CLK to the read circuit 102, thereby controlling the operations of the constituent elements of the read circuit 102. Here, the control signal RC controls the operation of the reset switch of the integration amplifier 205. The control signal SH controls the operation of the sample hold circuit 207. The control signal CLK controls the operation of the multiplexer 208.

Figure 15A:
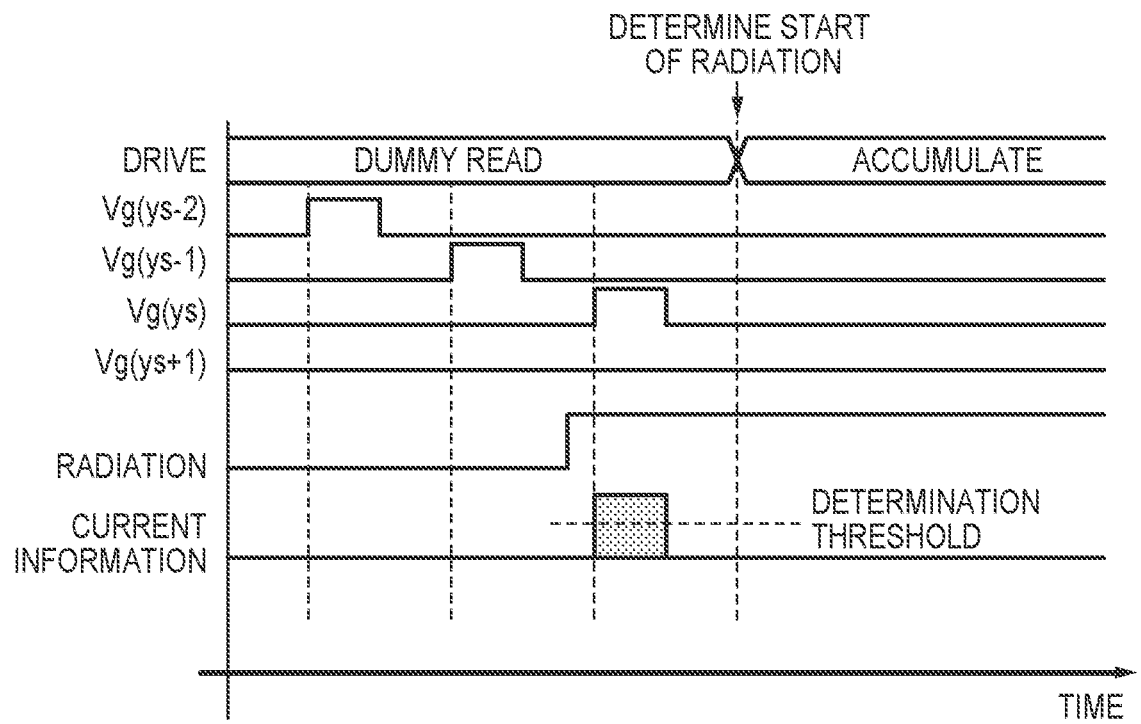
FIG. 15A is a schematic view of the drive timing of the radiation imaging apparatus shown in FIG. 14 in an example of detecting radiation.
Figure 15B:
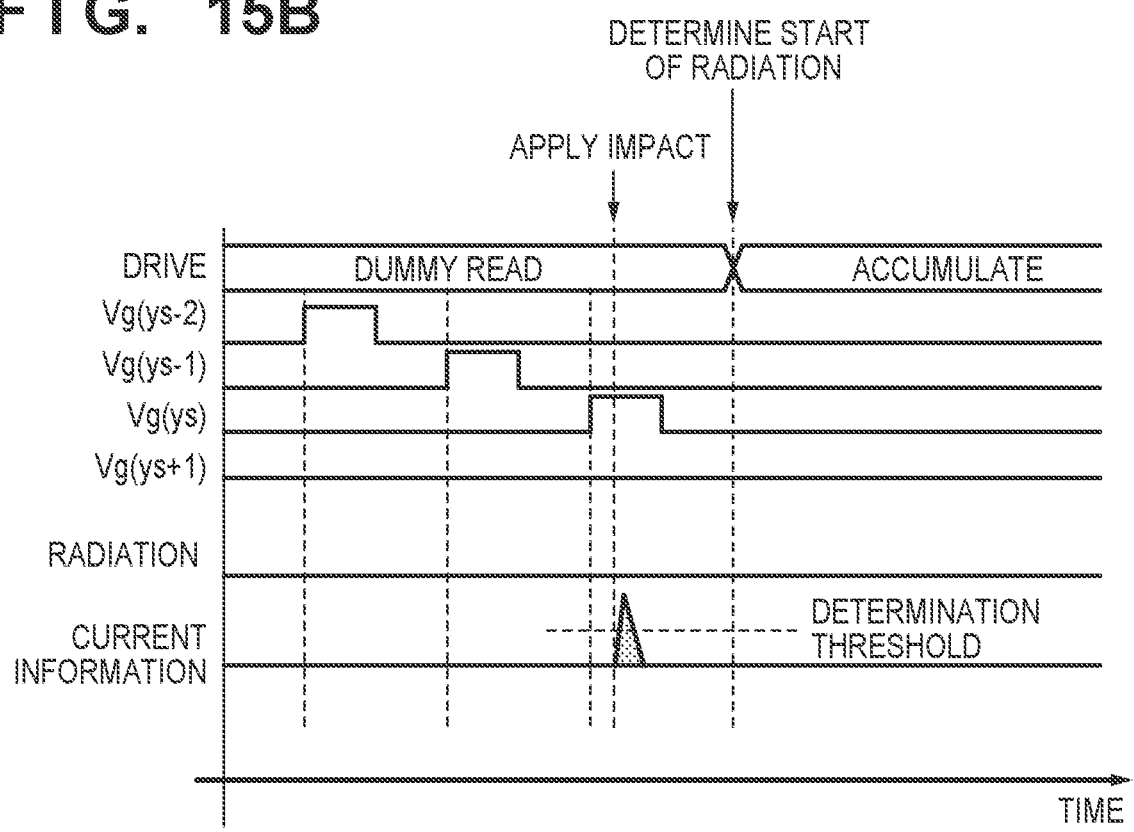
FIG. 15B is a drive timing chart of a comparative example.

FIG. 15A shows a drive timing when the start of radiation irradiation of the radiation imaging apparatus 100 according to this embodiment is detected. As a comparative example, FIG. 15B shows a drive timing in a case in which an operation error has occurred due to an impact or the like. A description will be made here by defining the row on which the start of radiation irradiation is determined as the row Ys in the radiation imaging apparatus 100.

FIG. 15A is an enlarged view near the row Ys shown in FIG. 4, which is the row on which the start of radiation irradiation is determined. FIG. 15A shows the information of a current output from the bias power supply unit 203, which is used by the detection unit 106 to output radiation information including a time fluctuation in the intensity of radiation that enters the pixel unit 101. The detection unit 106 acquires radiation information from the information of the current flowing to the bias line Bs, which is acquired from the bias power supply unit 203, and determines the start of radiation irradiation. In FIG. 15A, radiation irradiation is started during scan of a row Ys−1 and the row Ys, the information of the current flowing to the bias line Bs exceeds a determination threshold at the time of scan of the row Ys, and the detection unit 106 determines that radiation irradiation is started. According to the determination result, the control unit 107 shifts the pixel unit 101 to an accumulation operation for acquiring a radiation image.

On the other hand, FIG. 15B is an enlarged view near the row Ys shown in FIG. 4 when an impact is applied during scan of dummy read of the row Ys in the radiation imaging apparatus according to the comparative example. Generally, in the radiation imaging apparatus, weight reduction of the radiation imaging apparatus is used to improve portability and use convenience. For the housing of the radiation imaging apparatus, for example, a light material such as carbon tends to be selected from rather than conventionally used metals. This lowers the rigidity of the housing, and an impact or a pressure is readily transmitted to the internal circuit board. Similarly, for the circuit board as well, the size is reduced, and the density is increased. For example, there is a tendency to employ a compact ceramic capacitor with a large capacity or integrate a plurality of circuits on a small number of substrates. Hence, if an impact or a pressure is transmitted to the circuit board, the ceramic capacitor generates voltage noise by the piezoelectric effect. The noise is transmitted to various circuits by the interference between the circuits, and an operation error readily occurs. That is, the circuits of the radiation imaging apparatus are readily affected by the impact or pressure. For this reason, in the example shown in FIG. 15B, an impact is applied at the time of scan of dummy read of the row Ys, the information of the current flowing to the bias line Bs exceeds the determination threshold, and the detection unit 106 erroneously determines that radiation irradiation is started. According to the determination, the control unit 107 shifts the pixel unit 101 to the accumulation operation.

A detailed operation of the detection unit 106 according to this embodiment to determine the start of radiation irradiation will be described next with reference to FIG. 16. In this embodiment, the radiation imaging apparatus 100 can have the following features concerning the bias current flowing to the bias line Bs.

(1) During radiation irradiation, a current proportional to the radiation irradiation amount per unit time flows to the bias line Bs. This current is shown as a "first signal" in FIG. 16. Although the current can flow in a larger amount in a case in which the switch element T of the pixel PIX is in the ON (conduction) state than in a case in which the switch element T is in the OFF (non-conduction) state, FIG. 16 shows the current as constant for the sake of simplicity.

(2) When the switch element T of the pixel PIX irradiated with radiation is rendered conductive, a current proportional to the charge amount accumulated in the conversion element S of the pixel PIX until the switch element T is rendered conductive flows to the bias line Bs. This current is shown as a "second signal" in FIG. 16.

(3) When ON/OFF of the switch element T of the pixel PIX is switched, a current flows to the bias line Bs. This current can be called switching noise (not shown).

(4) When an impact or a magnetic field is applied to the radiation imaging apparatus 100, a current according to the frequency of applied noise can flow to the bias line Bs. This current is called external noise, and shown as "external noise" in FIG. 6. For example, due to the influence of an electromagnetic field generated from a commercial power supply, a current of about 50 to 60 Hz can flow to the bias line Bs. When an impact is input to the radiation imaging apparatus, a current of several Hz to several kHz can flow to the bias line Bs.

(5) Even if a magnetic field or an impact is not applied to the radiation imaging apparatus 100, a current flows to the bias line Bs due to an electromagnetic wave generated by the radiation imaging apparatus 100 itself, internal noise in the detection unit 106, or the like. This current is called system noise (not shown).

In the "bias current" shown in FIG. 16, the first signal, the second signal, and the external noise (and switching noise and system noise) are shown as constant across time. However, FIG. 16 conceptually shows at which timings these signals and noise appear, and these are not necessarily constant across time.

To detect radiation irradiation, more specifically, the start of radiation irradiation, the sample value of a signal derived from the current flowing to the bias line Bs as a detection signal may directly be used. However, a determination error may occur, as shown in FIG. 15B described above. To reduce the influence of external noise or the like caused by an impact or a magnetic field, in the radiation imaging apparatus 100 according to this embodiment, the detection unit 106 calculates radiation information and detects radiation irradiation using a method to be described below.

In this embodiment, as shown in FIG. 14, the bias power supply unit 104 is provided with the plurality of bias power supply units 203. In addition, the pixels PIX arranged in the pixel unit 101 form a plurality of pixel groups. More specifically, one pixel group and one bias power supply unit 203 are arranged in correspondence with each other, and each of the plurality of bias power supply units 203 supplies a bias potential to the conversion elements S of the pixels PIX via the bias line Bs that is electrically independent for each bias power supply unit 203. In the arrangement shown in FIG. 14, a bias power supply unit 203a supplies a bias potential to a pixel group including a pixel PIXa via the bias line Bsa, and a bias power supply unit 203b supplies a bias potential to a pixel group including a pixel PIXb via the bias line Bsb. The detection unit 106 acquires radiation information based on the signals of currents flowing to the bias line Bsa and the bias line Bsb, which are output from the bias power supply unit 203a and the bias power supply unit 203b, and detects radiation irradiation. For example, if the radiation information or the integrated value of the radiation information exceeds a predetermined threshold, the detection unit 106 determines that the apparatus is irradiated with radiation.

As shown in FIG. 16, the drive period of the driving circuit 214 is indicated by a time TI. That is, the radiation imaging apparatus 100 performs one reset operation (dummy read) at an interval of time TI. Of the time TI, a time (to be sometimes referred to as an ON time hereinafter) in which the driving circuit 214 supplies a drive signal of high level is represented by a time TH, and a time (to be sometimes referred to as an OFF time hereinafter) in which the driving circuit 214 supplies a drive signal of low level is represented by a time TL. In this embodiment, as an example, the control unit 107 controls the driving circuit 214 such that time TH=time TL. That is, at the start of one reset operation, the driving circuit 214 switches the drive signal of a certain drive line Vg from low level to high level, returns the drive signal on the drive line Vg to low level after the elapse of the time TH, and then starts the next reset operation after the elapse of the time TL with the same length as the time TH. For example, time TH=time TL=16 us may be set.

In addition, as shown in FIG. 16, the period in which the detection unit 106 samples the currents flowing from the bias power supply units 203a and 203b to the bias lines Bsa and Bsb is represented by a time TS. In this embodiment, time TH=time TS is set, and during the period in which the drive line Vg supplies the drive signal of high level to the switch element T of a certain pixel PIX, the detection unit 106 performs sampling of signal values representing the currents flowing from the bias power supply units 203a and 203b to the bias lines Bsa and Bsb. In the timing chart shown in FIG. 16, time TH=time TL=time TS=T1/2. However, the value is not limited to this, and the time TH and the time TL may be set to arbitrary times or ratio. In addition, the time TH and the time TS need not equal. The time TS may be set to a period shorter than the time TH, and the detection unit 106 may execute a plurality of sampling operations during the period of the time TH.

In this embodiment, the two bias power supply units 203a and 203b are arranged in the bias power supply unit 104, as described above. Hence, the detection unit 106 can simultaneously acquire the two signals of the currents output from the bias power supply unit 203a and the bias power supply unit 203b and flowing to the bias line Bsa and the bias line Bsb in one time TS. A signal value representing the current flowing to the bias line Bs connected to a pixel group including the pixels PIX whose switch elements T are turned on by the driving circuit 214 in the two pixel groups will be referred to as a valid value S here. In addition, a signal value representing the current flowing to the bias line Bs connected to a pixel group in which the switch elements T are in the OFF state in the two pixel groups will be referred to as a value N.

The detection unit 106 may sample the valid value S and the noise value N at the same timing, as shown in FIG. 16. Since the valid value S and the noise value N are acquired without any time lag, the above-described second signal is included in the valid value S for the switch element T in the conduction state for the valid value S and the noise value N. On the other hand, the first signal and the external noise are included in almost the same amount in the valid value S and the noise value N independently of the conduction state of the switch element T. Hence, the detection unit 106 can remove the external noise based on the valid value S and the noise value N, more specifically, based on the difference between the valid value S and the noise value N, and extract the second signal as the radiation information.

In the arrangement shown in FIG. 14, the pieces of information of currents output from the two bias power supply nits 203a and 203b are analog values obtained by converting the currents flowing to the bias lines Bsa and Bsb into voltages. Hence, the detection unit 106 is configured to calculate, based on a digital value obtained by analog/digital-converting the difference between the analog values of the valid value S and the noise value N, radiation information used to determine the presence/absence of radiation irradiation. However, the arrangement is not limited to this, and, for example, an A/D converter that A/D-converts the output of the current-voltage conversion circuit 215 arranged in each bias power supply unit 203 may be arranged between the bias power supply unit 203 and the detection unit 106. In this case, the detection unit 106 may calculate radiation information based on the difference between digital values obtained by A/D-converting the valid value S and the noise value N output from the bias power supply units 203a and 203b.

Here, two sample values acquired in the yth (y is an arbitrary natural number) reset operation (dummy read) are defined as a valid value S(y) and a noise value N(y), and radiation information used to detect a radiation signal is defined as X(y). The detection unit 106 may calculate the radiation information X(y) by an operation represented by $$X(y)=S(y)-N(y) \quad (1)$$

Equation (1) means difference processing between the current flowing to the bias line Bs connected to the pixel group including the pixels PIX whose switch elements T are turned on and the current flowing to the bias line Bs connected to the pixel group in which the switch elements T are in the OFF state. If the output characteristic changes between the pixels PIX, radiation information may be calculated using signal values obtained by weighting S(y) and N(y) in accordance with the variation between the pixels PIX, as in $$X(y)=a \times S(y)-b \times N(y) \quad (2)$$

Figure 17:
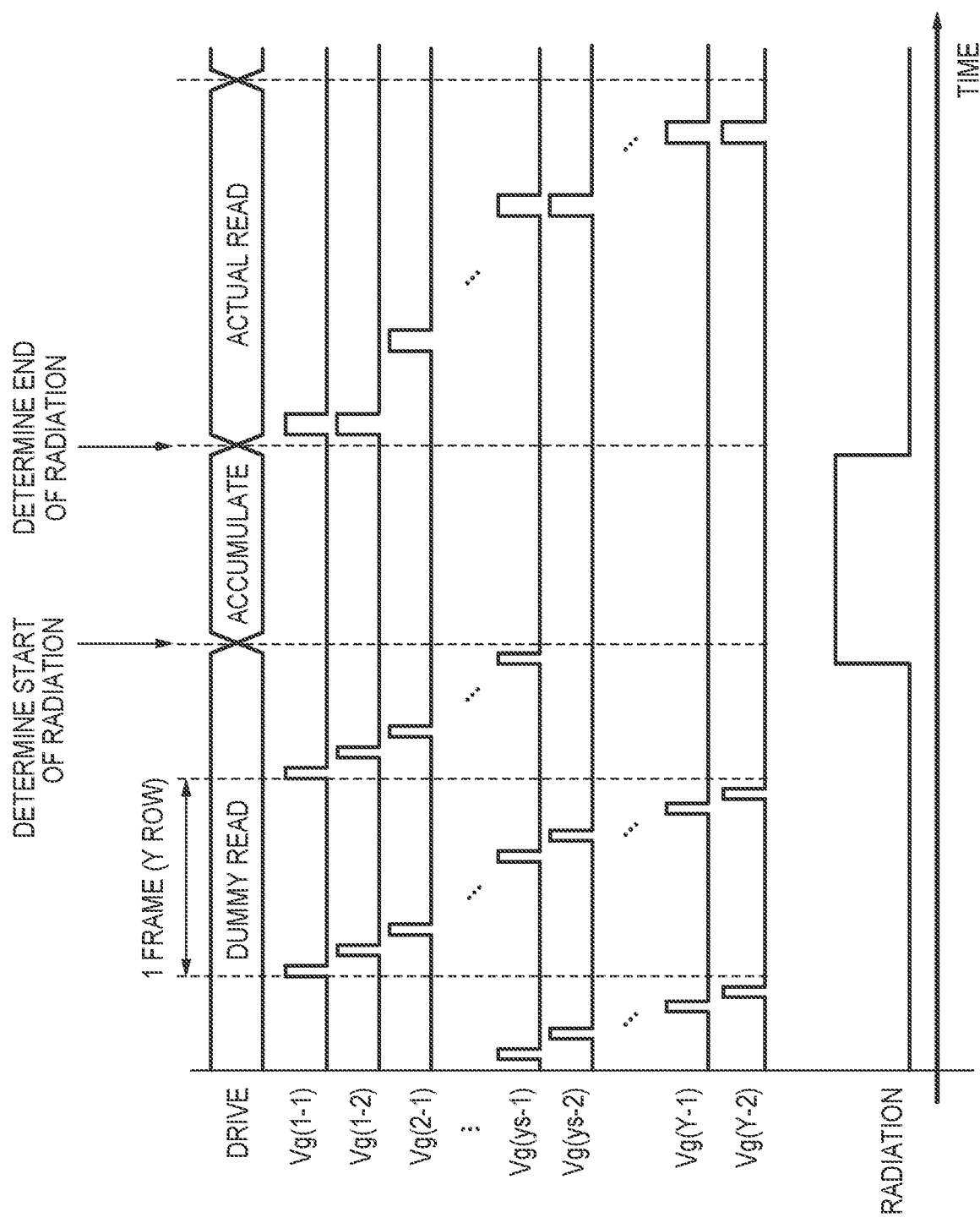
FIG. 17 is a schematic view of the drive timing of the radiation imaging apparatus shown in FIG. 14.

When the detection unit 106 detects the start of radiation irradiation, the control unit 107 sets all the switch elements T in the non-conduction state to accumulate the signals by radiation in the pixels PIX. After that, the control unit 107 performs actual read in accordance with the end of radiation irradiation. In the arrangement shown in FIG. 14, two drive lines configured to divide the pixels PIX arranged in the row direction into the pixel groups are connected to the pixels PIX. In the arrangement shown in FIG. 14, the pixels PIX include the pixel PIXa and the pixel PIXb, which are adjacent to each other in the row direction. Additionally, the pixel PIXa and the pixel PIXb are included in pixel groups different from each other in the plurality of pixel groups and are connected to drive lines different from each other in the plurality of drive lines Vg. Here, in the circuit diagram shown in Japanese Patent Laid-Open No. 2014-168203, Y drive lines Vg exist. In this embodiment, however, 2Y drive lines Vg exist. Hence, when actual read is performed by setting the switch elements T in the conduction state sequentially from the top row (0th row) to the final row ((Y−1)th row), if the time TI of the drive period is the same as in Japanese Patent Laid-Open No. 2014-168203, a time twice longer is needed until the signals of all rows are read out. Hence, as shown in FIG. 17, at the time of actual read, the control unit 107 controls the driving circuit 214 to set two drive lines Vg in the conduction state at once, thereby suppressing an increase in the actual read time caused by the increase in the number of drive lines Vg. More specifically, as shown in FIG. 14, the column signal line Sig is shared by pixels arranged on a column basis in the plurality of pixels PIX. When acquiring radiation image data, the driving circuit 214 simultaneously turns on the switch elements T of the pixel PIXa and the pixel PIXb, thereby suppressing an increase in the actual read time.

In this embodiment, the valid value S and the noise value N are sampled at the same timing by arranging the two bias power supply units 203. It is therefore possible to provide the radiation imaging apparatus 100 and the radiation imaging system SYS, which do not need a synchronization signal with the radiation generation apparatus 130, have a high resistance to noise generated when a pressure or an impact is applied to the housing, and can obtain high-quality image information.

In this embodiment, arranging the two bias power supply units 203 has been described. However, three or more bias power supply units may be arranged. In this case, the valid value S and the noise value N are appropriately sampled from currents flowing to three or more bias lines Bs. In the arrangement shown in FIG. 14, the pixels PIX belonging to the two pixel groups are alternately arranged in the row direction, and the pixels PIX that are adjacent to each other in the column direction are included in the same pixel group of the two pixel groups. However, the aspect of the embodiments is not limited to this. Arranging the pixels PIX belonging to the pixel groups in an appropriate order suffices.

In this embodiment, as shown in FIG. 16, the valid value S and the noise value N are sampled at the same timing. However, the aspect of the embodiments is not limited to this. If one bias power supply unit 203 is arranged, the valid value S and the noise value N can be sampled only at different timings. The detection unit 106 acquires the valid value S and the noise value N such that the sampling timings at least partially overlap, thereby suppressing the influence of external noise as compared to a case in which one bias power supply unit 203 is arranged.

The difference between the numbers of pixels PIX included in the pixel groups in the plurality of pixel groups may be 10% or less in each pixel group. Alternatively, for example, the numbers of pixels PIX included in the pixel groups may equal. When the numbers of pixels PIX included in the pixel groups are equalized, the amounts of external noise, switching noise, system noise, and the like flowing to the bias lines Bs are equalized, and the influence of noise at the time of detection of the presence/absence of radiation irradiation by the detection unit 106 can be suppressed.

Figure 18:
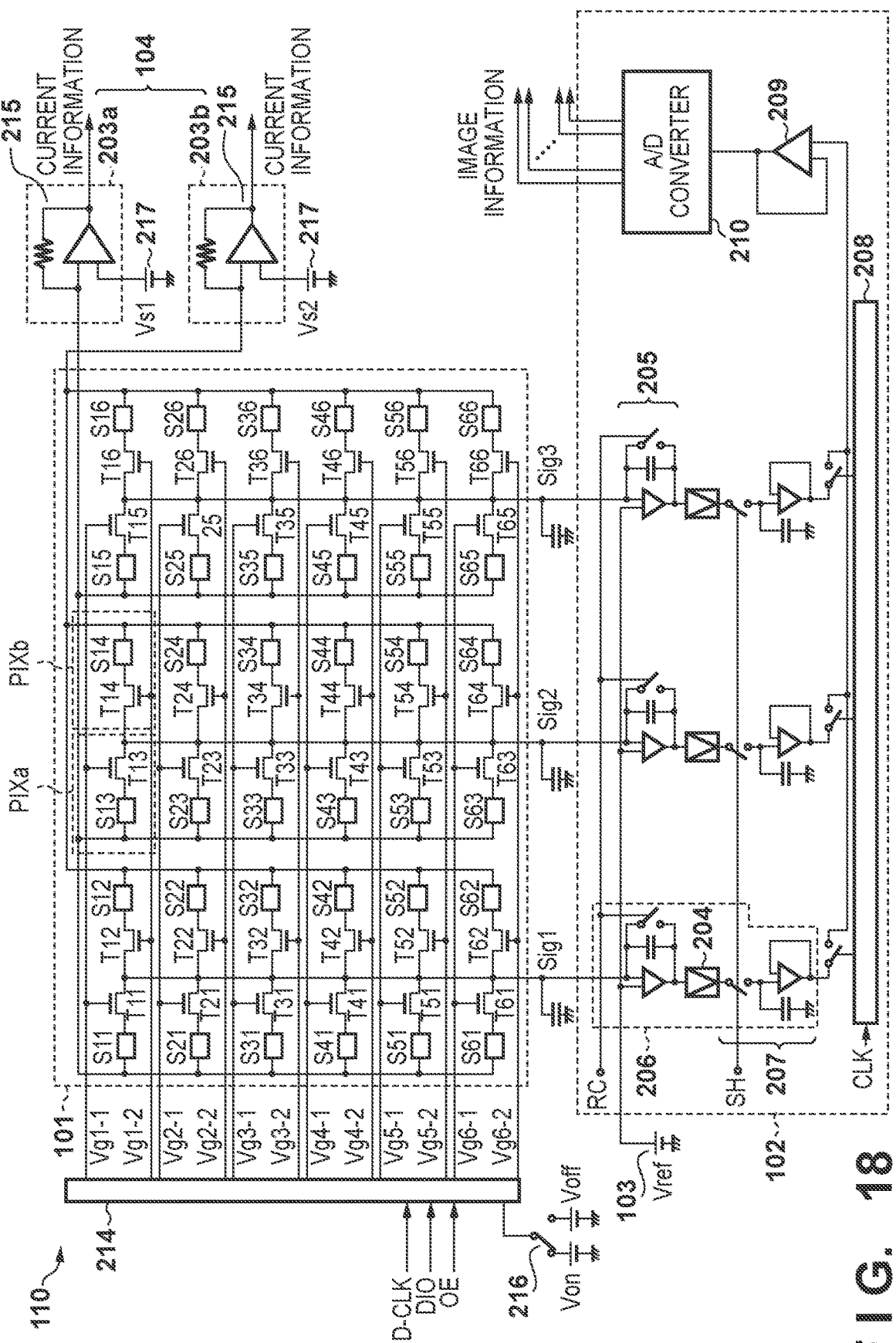
FIG. 18 is a circuit diagram showing a modification of the arrangement of the radiation imaging apparatus shown in FIG. 14.

A modification of the arrangement example of the imaging unit 110 of the radiation imaging apparatus 100 shown in FIG. 14 will be described next with reference to FIG. 18. FIG. 18 is an equivalent circuit diagram showing an example of the arrangement of the imaging unit 110 of the radiation imaging apparatus 100. The arrangement of the imaging unit 110 shown in FIG. 18 is different from the arrangement shown in FIG. 14 in the arrangement of the pixel unit 101 and the arrangement of the amplification circuit 206 of the read circuit 102. More specifically, the pixels PIXa and PIXb adjacent to each other in the row direction, which are included in pixel groups different from each other and connected to drive lines Vg different from each other, share the column signal line Sig. Hence, as compared to the arrangement shown in FIG. 14, the number of column signal lines Sig is halved. According to this, the number of amplification circuits 206 arranged in the read circuit 102 is halved as compared to the arrangement shown in FIG. 14. As a result, to solve the problem that the scale of the driving circuit 214 in the arrangement shown in FIG. 14 becomes larger than in the arrangement of Japanese Patent Laid-Open No. 2014-168203, the number of amplification circuits 206 in the read circuit 102 can be decreased. This can suppress the increase in the cost caused by the increase in the number of ICs in the entire radiation imaging apparatus 100 including the driving circuit 214 and the read circuit 102 and decrease the number of wirings in the pixel unit 101.

For detection of the presence/absence of radiation irradiation, as described above with reference to FIG. 16, since the pixels are connected to the different bias power supply units 203 via the bias lines Bs that are electrically independent of each other, the valid value S and the noise value N can be sampled at the same timing. In addition, as in the arrangement shown in FIG. 14 described above, the pixels PIX to acquire the valid value S and the noise value N are arranged adjacent to each other. For this reason, even if a local impact is applied to the housing of the radiation imaging apparatus 100 as noise, it can be considered that the same noise is applied at the same timing for the pitch to arrange the pixels PIX. Hence, by the operation described with reference to FIG. 16, noise can be removed even in the arrangement shown in FIG. 18, and the start of radiation irradiation can more correctly be detected.

Figure 19:
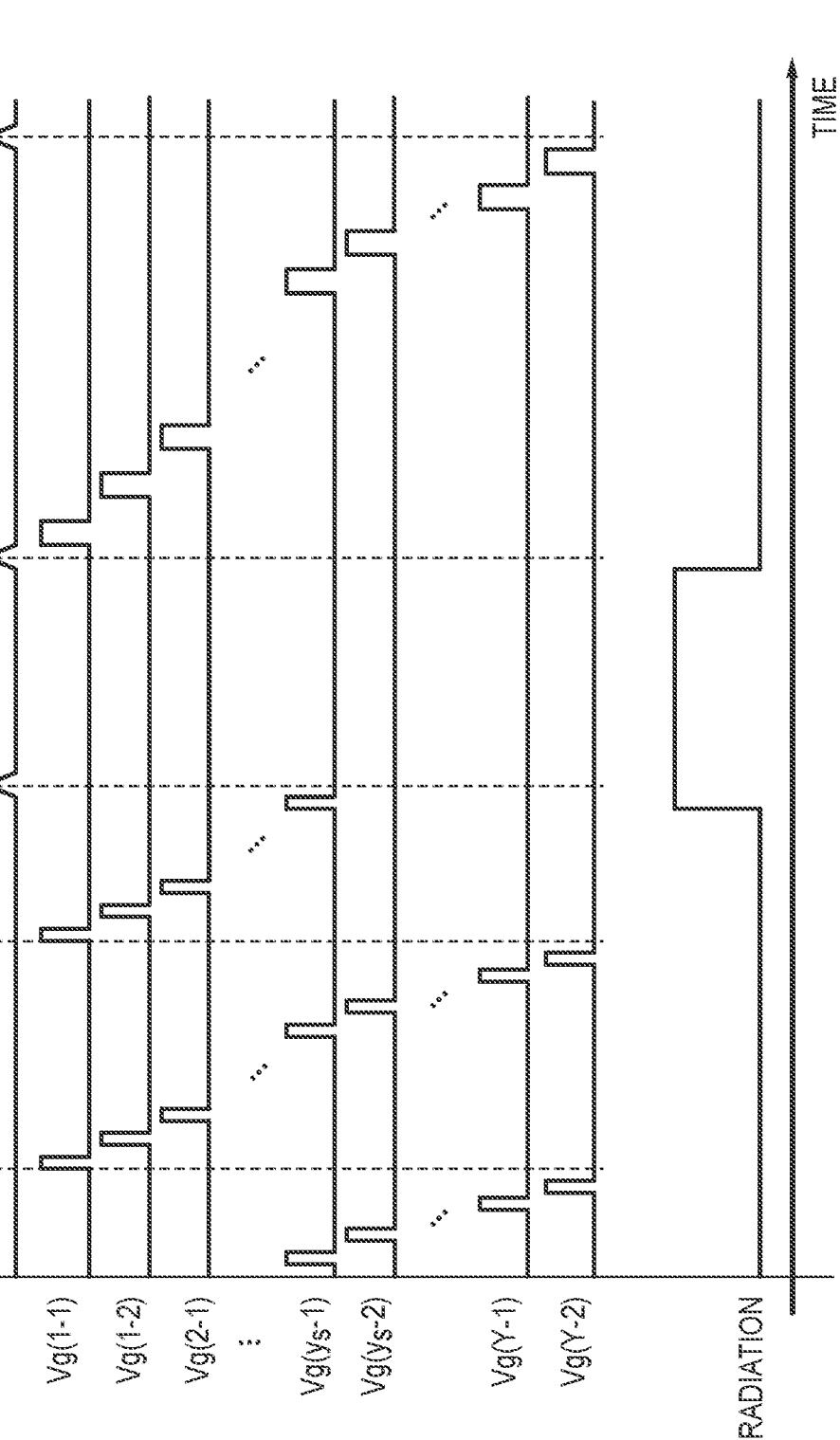
FIG. 19 is a schematic view of the drive timing of the radiation imaging apparatus shown in FIG. 18 in detecting radiation.

FIG. 19 is a schematic view showing the drive timing of the imaging unit 110 shown in FIG. 18. Driving concerning detection of the presence/absence of radiation irradiation during dummy read is the same as the driving described with reference to FIG. 16, and a description thereof will be omitted. In this embodiment, the pixel PIXa and the pixel PIXb, which are adjacent to each other, are connected to the same column signal line Sig. For this reason, turning on the switch elements T on two rows together at the time of actual read, as described above, is impossible because signals read out from the two pixels are added. Hence, as shown in FIG. 19, when acquiring radiation image data, the driving circuit 214 turns on the switch elements T of the pixels PIX connected to the same column signal line Sig at different timings. This makes it possible to read out charges accumulated in the pixels PIX.

In this embodiment as well, the valid value S and the noise value N are sampled at the same timing by arranging the two bias power supply units 203. It is therefore possible to provide the radiation imaging apparatus 100 and the radiation imaging system SYS, which do not need a synchronization signal with the radiation generation apparatus 130, have a high resistance to noise generated when a pressure or an impact is applied to the housing, and can obtain high-quality image information. In addition, since the pixels PIX adjacent to each other in the row direction share the column signal line Sig that outputs a signal, the number of amplification circuits 206 in the read circuit 102 can be decreased. This can cancel the increase in the cost caused by the increase in the circuit scale in the driving circuit 214.

A method of suppressing lowering of the frame rate of dummy read caused by an increase in the number of drive lines Vg will be described next with reference to FIG. 20. As described above with reference to FIG. 16, the drive period TI of the driving circuit 214 includes two periods, that is, the ON time (time TH) and the OFF time (time TL). That is, the plurality of drive lines Vg include a first drive line (for example, the drive line Vg1-1) and a second drive line (for example, a drive line Vg1-2) different from the first drive line. When determining the presence/absence of radiation irradiation, the driving circuit 214 switches the switch elements T connected to the drive line Vg1-1 from ON to OFF, and after the elapse of a predetermined time, turns on the switch elements T connected to the drive line Vg1-2.

On the other hand, since the imaging unit 110 of the radiation imaging apparatus 100 according to this embodiment includes a plurality of (in this embodiment, two) bias power supply units 203, the valid value S and the noise value N can be sampled simultaneously during the time TH. In other words, in the arrangement of this embodiment, the OFF time (time TL) need not always be provided. Hence, when determining the presence/absence of radiation irradiation, the driving circuit 214 controls such that the timing of switching the switch elements T connected to the drive line Vg1-1 from ON to OFF and the timing of switching the switch elements T connected to the drive line Vg1-2 from OFF to ON overlap.

It is generally known that a current flows to the bias line Bs when switching ON/OFF of the switch element T. This current is called switching noise. As shown in FIG. 20, when the fall of the drive signal to the switch elements T on a certain pixel row and the rise of the drive signal to the switch elements T on the next pixel row overlap, the switching noise can be canceled. That is, the driving of the imaging unit 110 shown in FIG. 20 is effective when the switching noise of the switch element T is large.

Figure 20:
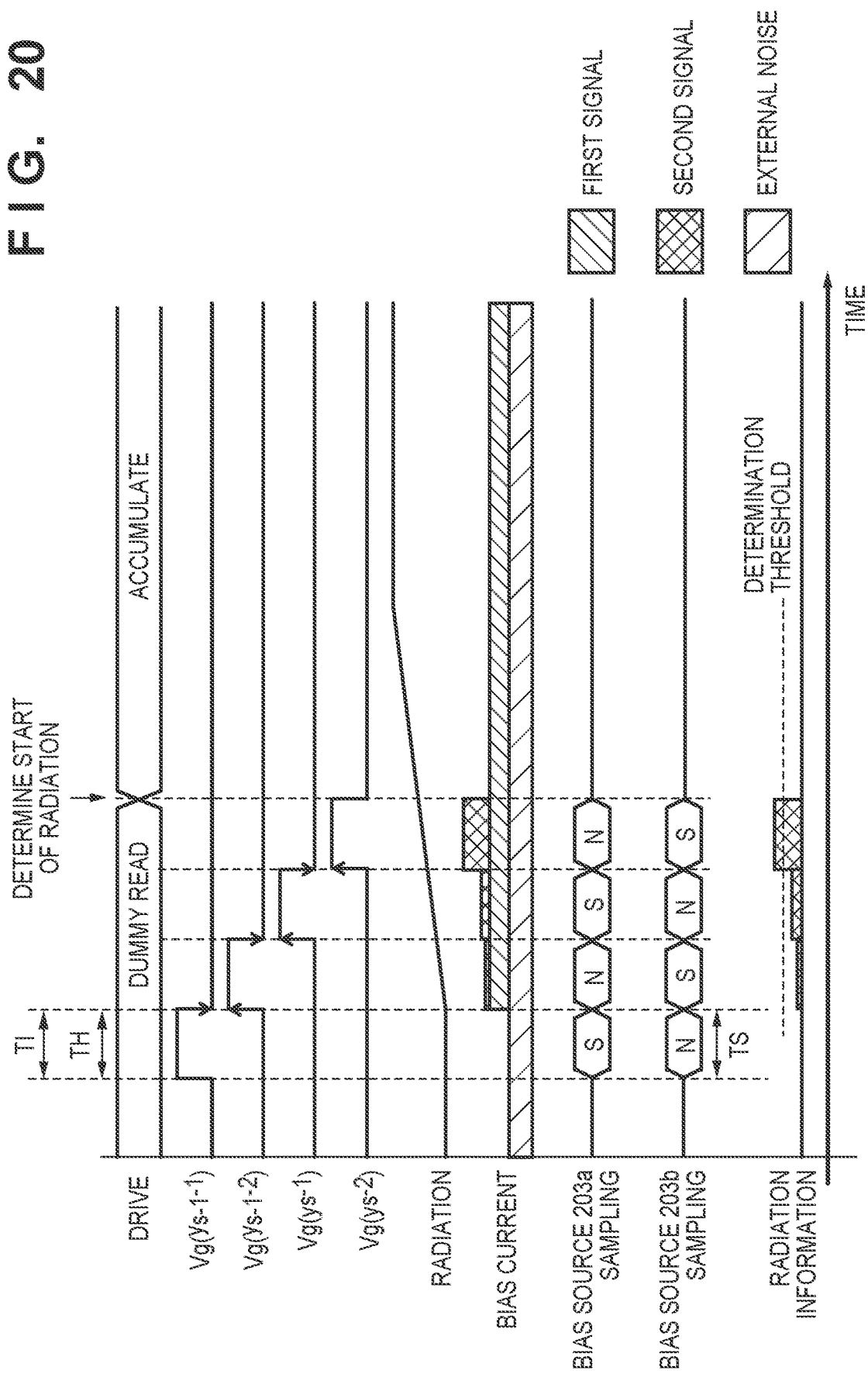
FIG. 20 is a timing chart showing a modification of the detailed timing chart of the drive timing shown in FIG. 16.

Also, in the driving shown in FIG. 20, the OFF time (time TL) during dummy read is unnecessary, and the drive period per row can be shortened by setting time TI=time TH. In the arrangement of the radiation imaging apparatus 100 according to this embodiment, the number of drive lines Vg increases as compared to the arrangement shown in Japanese Patent Laid-Open No. 2014-168203. However, when the plurality of bias power supply units 203 are arranged, the time TI that is the drive period in dummy read can be shortened, and the read period of one frame in each row can be maintained.

Even in the driving shown in FIG. 20, the valid value S and the noise value N are sampled at the same timing by arranging the two bias power supply units 203. It is therefore possible to provide the radiation imaging apparatus 100 and the radiation imaging system SYS, which do not need a synchronization signal with the radiation generation apparatus 130, have a high resistance to noise generated when a pressure or an impact is applied to the housing, and can obtain high-quality image information. In addition, in dummy read, switching noise generated by ON/OFF of the switch element T can be reduced, and the accuracy of determining the start of radiation irradiation can be improved, as described above. Furthermore, in dummy read, when the time TL is omitted, the sampling rate of acquiring the current flowing to the bias line Bs to determine the presence/absence of radiation irradiation can be improved, and the time resolution for the determination of the presence/absence of radiation irradiation is improved.

As described above, during the period of dummy read performed until the radiation imaging apparatus 100 detects the start of radiation irradiation, noise generated when switching ON/OFF of the switch element T shown in FIG.

14 may be superimposed on the current flowing to the bias line Bs. The noise superimposed on the bias line Bs when switching ON/OFF of the switch element T includes a component derived from a parasitic capacitance between the bias line Bs and the drive line Vg configured to control ON or OFF of the switch element T. Since each drive line Vg crosses many bias lines Bs, noise generated when switching ON/OFF of the TFT becomes large with respect to the current flowing to the bias line Bs in radiation irradiation, and it may be impossible to sufficiently suppress the influence of the noise.

Figure 21:
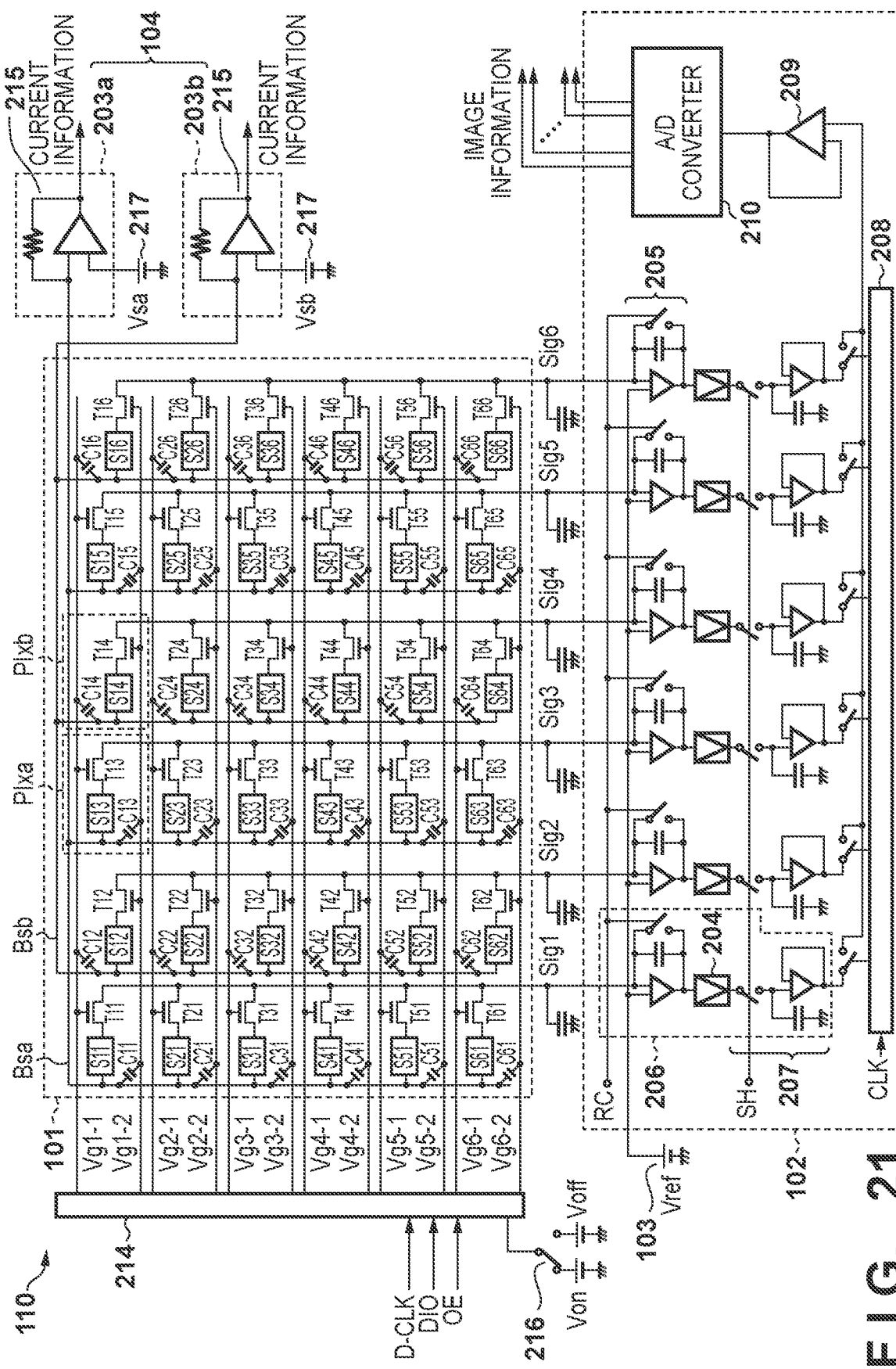
FIG. 21 is a circuit diagram showing an example of the arrangement of the radiation imaging apparatus shown in FIG. 1.

FIG. 21 is an equivalent circuit diagram showing an example of the arrangement of the imaging unit 110 of the radiation imaging apparatus 100 considering a parasitic capacitance C between the scan line Vg and the bias line Bs in FIG. 14. One electrode of the conversion element S is electrically connected to one main terminal of the two main terminals of the switch element T, and the other electrode of the conversion element S is electrically connected to the bias power supply unit 203 of the bias power supply unit 104 via the bias line Bs. In the conversion elements S arranged in the row direction (the lateral direction of the drawing), for example, the conversion elements S11, S13, and S15 have the electrodes on one side connected to the switch elements T11, T13, and T15, respectively, and the other electrodes electrically connected to the bias power supply unit 203a via the common bias line Bsa. Additionally, the conversion elements S12, S14, and S16 have the electrodes on one side commonly connected to the switch elements T12, T14, and T16, and the other electrodes electrically connected to the bias power supply unit 203b via the common bias line Bsb different from the bias line Bsa.

Capacitances C11, C13, and C15 are formed between the bias line Bsa to which the electrodes of the conversion elements S11, S13, and S15 on the opposite side of the switch elements T11, T13, and T15 are connected and the drive line Vg1-2 that controls the operations of the switch elements T12, T14, and T16. Similarly, capacitances C12, C14, and C16 are formed between the bias line Bsb to which the electrodes of the conversion elements S12, S14, and S16 on the opposite side of the switch elements T12, T14, and T16 are connected and the drive line Vg1-1 that controls the operations of the switch elements T11, T13, and T15. The formed capacitances will be described later.

In this embodiment, the pixels PIX arranged in the pixel unit 101 include a pixel group in which a bias potential Vsa is supplied from the bias power supply unit 203a to the conversion elements S and a pixel group in which a bias potential Vsb is supplied from the bias power supply unit 203b to the conversion elements S. That is, two pixel groups formed by the pixels PIX each including the conversion element S that converts radiation into charges, and the switch element T that connects the conversion element S to the column signal line Sig are arranged in the pixel unit 101. The bias power supply unit 203a supplies the bias potential Vsa to the pixel group including the pixels PIX including the conversion elements S11, S13, and S15 via the bias line Bsa. The bias power supply unit 203b supplies the bias potential Vsb to the pixel group including the pixels PIX including the conversion elements S12, S14, and S16 via the bias line Bsb. The switch elements T of the different pixel groups are connected to the different drive lines Vg. For example, the switch elements T11, T13, and T15 are connected to the drive line Vg1-1, and the switch elements T12, T14, and T16 are connected to the drive line Vg1-2. Hence, in this embodiment, the pixel unit 101 has an arrangement capable of driving the pixels PIX in each of the pixel groups connected to the different bias power supply units 203. In this embodiment, the switch elements T of the pixels PIX to which the bias potential is supplied from the bias power supply unit 203a via the bias line Bsa are connected to a drive line Vgn-"1". In addition, the switch elements T of the pixels PIX to which the bias potential is supplied from the bias power supply unit 203b via the bias line Bsb are connected to a drive line Vgn-"2".

In the arrangement shown in FIG. 21, in the row direction crossing the column signal line Sig, the pixels PIX of the pixel group including the pixels PIX including the conversion elements S11, S13, and S15 and the pixels PIX of the pixel group including the pixels PIX including the conversion elements S12, S14, and S16 are alternately arranged. At this time, in the column direction in which the column signal line Sig extends, the pixels PIX included in the pixel group including the pixels PIX including the conversion elements S11, S13, and S15 or the pixel group including the pixels PIX including the conversion elements S12, S14, and S16 may be arranged continuously. In the column direction as well, the pixels PIX arranged in the different pixel groups may alternately be arranged.

FIG. 22 is a schematic view of the drive timing of the radiation imaging apparatus 100. The control unit 107 causes the driving circuit 214 to repetitively execute the driving (dummy read) of setting the switch elements T in the conduction state sequentially from the top row (drive line Vg1-1) to the final row (drive line VgY-2) of the pixel unit 101 until radiation irradiation is started. Concerning the arrangement shown in FIG. 21, an example in which the pixel unit 101 includes six pixel rows has been described. However, a description will be made assuming that Y pixel rows are provided in FIG. 22. Until radiation irradiation is started, if the dummy read reaches the final row, it returns to the top row, and the dummy read is repeated.

If the detection unit 106 detects (determines) the start of radiation irradiation, the control unit 107 shifts, via the driving circuit 214, to driving (accumulation) of turning off the switch elements T on the row to which all the pixels PIX to acquire a radiation image are connected. Here, a description will be made here by defining the pixel row on which the start of radiation irradiation is determined as the row Ys-1 (drive line VgYs-1) in the radiation imaging apparatus 100. Details of the determination of the presence/absence of radiation irradiation will be described later. The accumulation continues until it is determined that the radiation irradiation has ended. If the radiation irradiation has ended, the control unit 107 controls the driving circuit 214 and the read circuit 102 to perform actual read of setting the switch elements T in the conduction state sequentially from the top row to the final row and reading signals from the pixels PIX.

Currents flowing to the bias lines Bsa and Bsb when detecting the presence/absence of radiation irradiation and determining the start of radiation irradiation will be described next. First, when a voltage for turning on the switch elements T (setting the switch elements T in the conduction state) is applied to the drive line Vgn-1 (n is an integer of 1 to Y), a current flows to the bias line Bsa via the parasitic capacitance existing in the pixel PIX (for example, the pixel including the switch element T13) between the drive line Vgn-1 and the bias line Bsa at that timing. For example, as the parasitic capacitance, the capacitance between the control electrode and the main electrode of the switch element T can be enumerated. When the parasitic capacitance is charged, no current flows any more. In FIG. 22, the current derived from the parasitic capacitance between the drive line Vgn-1 and the bias line Bsa is shown as spike noise indicated by a solid line in the positive direction on the bias line Bsa. Next, when a voltage for turning off the switch elements T (setting the switch elements T in the non-conduction state) is applied to the drive line Vgn-1, a current flows to the bias line Bsa via the parasitic capacitance existing in the pixel PIX between the drive line Vgn-1 and the bias line Bsa at that timing. When the parasitic capacitance is charged, no current flows any more. In FIG. 22, the current derived from the parasitic capacitance between the drive line Vgn-1 and the bias line Bsa is shown as spike noise indicated by a solid line in the negative direction on the bias line Bsa. The same applies to the drive line Vgn-2. When a voltage for turning on the switch elements T (setting the switch elements T in the conduction state) is applied to the drive line Vgn-2, a current flows to the bias line Bsb via the parasitic capacitance existing in the pixel PIX (for example, the pixel including the switch element T14) between the drive line Vgn-2 and the bias line Bsb at that timing. In FIG. 22, the current derived from the parasitic capacitance between the drive line Vgn-2 and the bias line Bsb is shown as spike noise indicated by a solid line in the positive direction on the bias line Bsb. Next, when a voltage for turning off the switch elements T (setting the switch elements T in the non-conduction state) is applied to the drive line Vgn-2, a current flows to the bias line Bsb via the parasitic capacitance existing in the pixel PIX between the drive line Vgn-2 and the bias line Bsb at that timing. In FIG. 22, the current derived from the parasitic capacitance between the drive line Vgn-2 and the bias line Bsb is shown as spike noise indicated by a solid line in the negative direction on the bias line Bsb.

The drive line Vgn-1 and the bias line Bsb are not connected via the pixel PIX (for example, the pixel including the switch element T14). However, when the voltage for turning on the switch elements T (setting the switch elements T in the conduction state) is applied to the drive line Vgn-2, a current starts flowing to the bias line Bsa at that timing via the parasitic capacitance C (for example, the parasitic capacitance C13) formed between the bias line Bsa and the drive line Vgn-2, which has been described with reference to FIG. 21. When the parasitic capacitance C is charged, no current flows any more. In FIG. 22, the current derived from the capacitance C formed between the drive line Vgn-2 and the bias line Bsa is shown as spike noise indicated by a broken line in the positive direction on the bias line Bsa. Similarly, when the voltage for turning off the switch elements T (setting the switch elements T in the non-conduction state) is applied to the drive line Vgn-2, a current starts flowing to the bias line Bsa at that timing via the parasitic capacitance C formed between the bias line Bsa and the drive line Vgn-2. When the parasitic capacitance C is charged, no current flows any more. In FIG. 22, the current derived from the capacitance C formed between the drive line Vgn-2 and the bias line Bsa is shown as spike noise indicated by a broken line in the negative direction on the bias line Bsa. This also applies to the current flowing to the bias line Bsb because of the capacitance C (for example, the parasitic capacitance C14) formed between the drive line Vgn-1 and the bias line Bsb.

In this embodiment, the driving circuit 214 turns on the switch elements T of the pixels PIX included in the different pixel groups at different timings, as shown in FIG. 22. Here, turning on the switch elements T is an operation after the driving circuit 214 applies, to the drive line Vg, the voltage to turn on the switch elements T until the driving circuit 214 applies the voltage to turn off. Hence, the influence of the parasitic capacitance between the drive line Vg and the bias line Bs in one dummy read becomes small. That is, the current flowing to the bias line Bs due to the parasitic capacitance becomes small. Hence, noise generated when switching ON/OFF of the switch element T becomes small relative to the current flowing to the bias line Bs in radiation irradiation, and the influence of the noise can be suppressed. As a result, the detection unit 106 can increase the accuracy of detecting the presence/absence of radiation irradiation based on the difference between the signal value representing the current flowing to the bias line Bsa and the signal value representing the current flowing to the bias line Bsb.

Furthermore, the present inventors found the following features concerning the current of noise caused by the parasitic capacitance or the formed capacitance between the drive line Vg and the bias line Bs and the current flowing in radiation irradiation. The current amount of noise is proportional to the parasitic capacitance between the drive line Vg and the bias line Bs which are connected via the switch element T or the capacitance C formed between the drive line Vg and the bias line Bs which are not connected via the switch element T ($I=dQ/dt=C \cdot dV/dt$). For this reason, when the parasitic capacitance and the formed capacitance C are equivalently adjusted, similar currents of noise in the same phase can be supplied to the bias line Bsa and the bias line Bsb when turning on or off the switch element T on the drive line Vg. In addition, when the difference between the currents flowing to the bias line Bsa and the bias line Bsb is calculated, the currents of noise can be canceled and suppressed. At this time, when the switch elements T connected to the different pixel groups are turned on at the different timings, as described above, the currents flowing to the bias lines Bsa and Bsb due to radiation irradiation are not canceled, as shown in FIG. 22. That is, if the parasitic capacitance between the drive line Vgn-1 and the bias line Bsa and the capacitance C formed between the drive line Vgn-1 and the bias line Bsb are made equal, the accuracy of detecting the presence/absence of radiation irradiation can further be raised. For example, each pixel PIX may be designed such that the parasitic capacitance between the drive line Vgn-1 and the bias line Bsa becomes 70% or more and 130% or less of the capacitance C formed between the drive line Vgn-1 and the bias line Bsb. Alternatively, each pixel PIX may be designed such that the parasitic capacitance between the drive line Vgn-1 and the bias line Bsa becomes equal to the capacitance C formed between the drive line Vgn-1 and the bias line Bsb.

Here, the signal value representing the current flowing to the bias line Bsa and the signal value representing the current flowing to the bias line Bsb are analog values, and the detection unit 106 may determine the presence/absence of radiation irradiation based on the difference between the analog values of the signal values. At this time, the detection unit 106 may acquire the difference as an analog value or may acquire a digital value obtained by analog/digital-converting the difference between the analog values. When difference processing is performed for the signal value representing the current flowing to the bias line Bsa and the signal value representing the current flowing to the bias line Bsb, which remain analog values, the current of noise can easily be canceled as compared to a case in which sampling is performed at a predetermined interval.

Figure 23A:
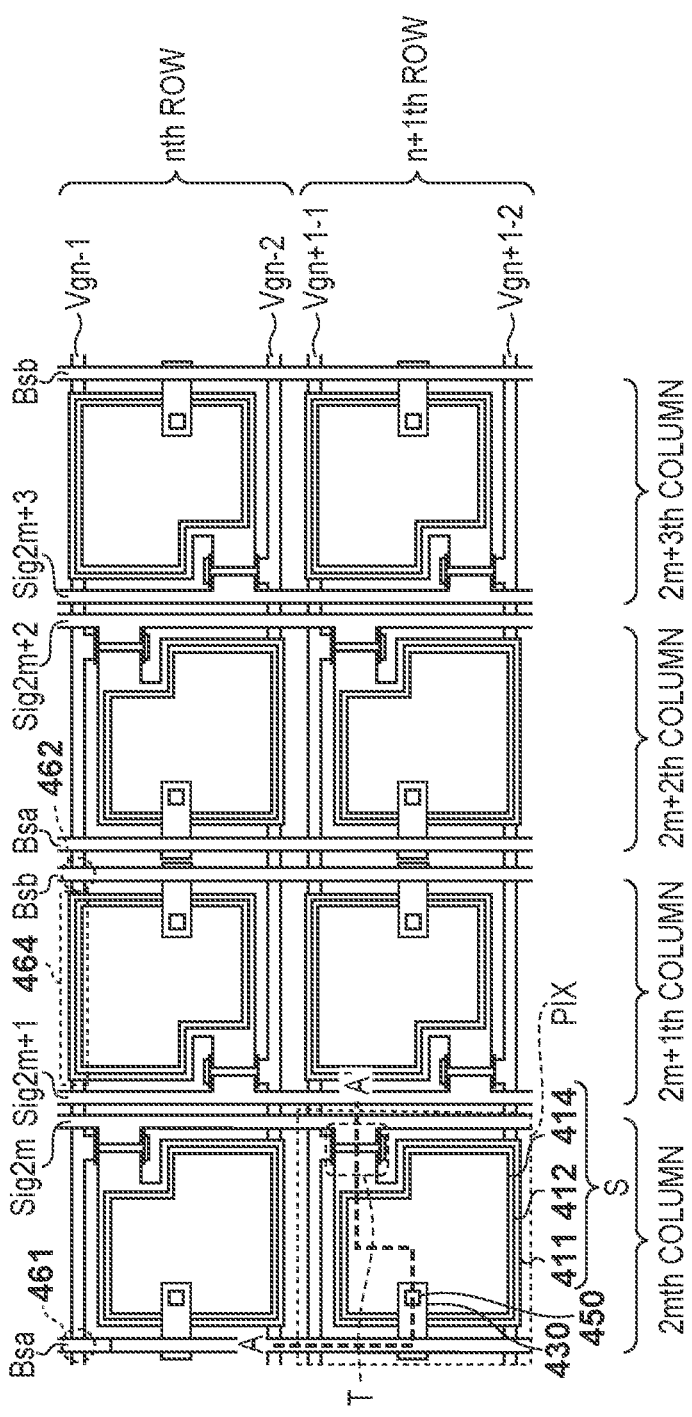
FIG. 23A is a plan view showing an example of the arrangement of pixels of the radiation imaging apparatus shown in FIG. 21.
Figure 23B:
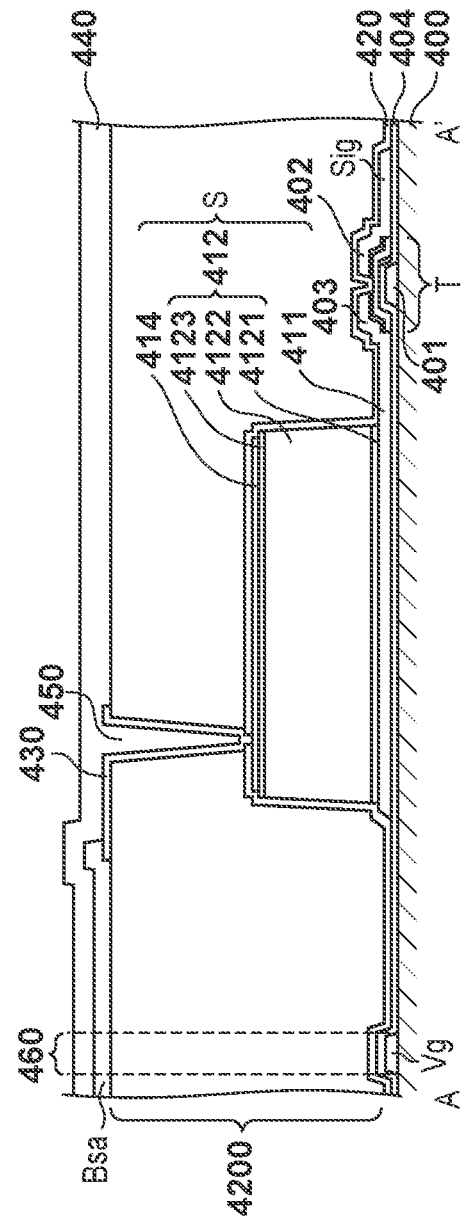
FIG. 23B is a sectional view showing an example of the arrangement of a pixel of the radiation imaging apparatus shown in FIG. 21.

The capacitance C formed between the drive line Vg and the bias line Bs which are not connected via the switch element T will be described in detail with reference to FIGS. 23A and 23B. FIG. 23A is a plan view of eight pixels PIX of 2 rows×4 columns in the pixel unit 101. FIG. 23B is a sectional view taken along a line A-A' in FIG. 6A.

As shown in FIG. 23A, signal lines Sig2*m*, Sig2*m*+1, Sig2*m*+2, Sig2*m*+3, . . . are provided in correspondence with columns 2m, 2m+1, 2m+2, 2m+3, . . . , respectively. The bias lines Bsa and Bsb are also provided in correspondence with the columns 2m, 2m+1, 2m+2, 2m+3, . . . , respectively.

In the arrangement shown in FIG. 23B, the substrate 400 on which the pixel PIX is provided is an insulating substrate of glass, plastic, or the like. The switch element T is formed on the main surface of the substrate 400, and includes the control electrode 401, the main electrode 402, the main electrode 403, and the insulating layer 404. The control electrode 401 and the drive line Vg may integrally be formed by a common conductor such as a metal. Similarly, the main electrode 402 and the signal line Sig may integrally be formed by a common conductor such as a metal. The insulating layer 404 functions as the gate insulating film of the switch element T. The switch element T may include a light-shielding layer (not shown). The conversion element S includes the electrode (lower electrode) 411 arranged on the main surface of the substrate 400, the semiconductor layer 412 arranged on the electrode 411, and the electrode (upper electrode) 414 arranged on the semiconductor layer 412. The semiconductor layer 412 is formed by stacking the impurity semiconductor layer 4121, the intrinsic semiconductor layer 4122, and the impurity semiconductor layer 4123 in this order. In this embodiment, the main electrode 403 of the switch element T and the electrode 411 of the conversion element S are integrally formed by a common conductor such as a metal. However, they may be made of different conductive materials.

The switch element T and the conversion element S are covered with the insulating layer 420. The switch element T and the conversion element S may further be covered with a planarization layer 4200. The bias line Bs is provided on the insulating layer 420 and the planarization layer 4200. The opening portion 450 is provided in a part of the insulating layer 420 and the planarization layer 4200 on the electrode 414 of the conversion element S, and the conductive layer 430 electrically connects the bias line Bs and the electrode 414 via the opening portion 450. The bias line Bs may be made of a conductive material such as a metal, and the conductive layer 430 may be made of a transparent conductive material such as ITO. The protection layer 440 covers the whole components described above. The insulating layer 404, the insulating layer 420, and the protection layer 440 can be formed by an inorganic insulating film of silicon nitride or the like. The planarization layer 4200 can be made of a material of a low specific dielectric constant (for example, $\varepsilon/\varepsilon_0=2$ to 5), such as photosensitive acryl or polyimide. Furthermore, a scintillator (not shown) that converts radiation into light with a wavelength detectable by a PIN photodiode functioning as the conversion element S is provided on the protection layer 440.

In FIG. 23A, place focus on the drive line Vgn−1 that passes through the nth row and the 2mth column and the nth row and (2m+1)th column. The drive line Vgn−1 connected to the pixel PIX including the conversion element S to which the bias potential is supplied by the bias line Bsa includes, with respect to the bias lines Bsa and Bsb and the electrode 411 of the conversion element S, (1) an intersection portion 461 with respect to the bias line Bsa, (2) an intersection portion 462 with respect to the bias line Bsb, and (3) an overlapping area 464 on the electrode 411 of the conversion element S of the pixel PIX to which the bias potential is supplied by the bias line Bsb.

Additionally, in the arrangement shown in FIG. 23A, in an orthographic projection to the main surface of the substrate 400, a portion of the drive line Vgn−1, which extends in the row direction, does not overlap the electrode 411 of the pixel included in the pixel group formed by the pixels PIX to which the bias potential is supplied by the bias line Bsa. However, the drive line Vgn−1 may include (4) an overlapping area 463 on the electrode 411 of the conversion element S of the pixel PIX to which the bias potential is supplied by the bias line Bsa.

Similarly, the drive line Vgn−2 connected to the pixel PIX including the conversion element S to which the bias potential is supplied by the bias line Bsb includes, (5) an intersection portion with respect to the bias line Bsb, (6) an intersection portion with respect to the bias line Bsa, and (7) an overlapping area on the electrode 411 of the conversion element S of the pixel PIX to which the bias potential is supplied by the bias line Bsa.

Additionally, the drive line Vgn−2 may include (8) an overlapping area on the electrode 411 of the conversion element S of the pixel PIX to which the bias potential is supplied by the bias line Bsb.

The drive line Vg is a layer on the side of the substrate 400 with respect to the electrode 411 of the conversion element S. If the drive line Vg and the electrode 411 overlap, the drive line Vg is arranged to be adjacent to the electrode 411 while sandwiching the insulating layer 404 between them. Hence, in (1) to (4) described above, (1) and (4) contribute to the capacitive coupling component between the drive line Vgn−1 and the bias line Bsa. That is, (1) and (4) contribute to the parasitic capacitance between the drive line Vgn−1 and the bias line Bsa. In addition, (2) and (3) contribute to the capacitive coupling component between the drive line Vgn−1 and the bias line Bsb, that is, the above-described capacitance C formed between the drive line Vgn−1 and the bias line Bsb. The areas, shapes, and the film thicknesses of the constituent materials of the intersection portions 461 and 462 and the overlapping areas 463 and 464 are adjusted. This makes it possible to adjust the capacitance values of the parasitic capacitance and the capacitance formed between the drive line Vgn−1 and the bias line Bsb which are not connected via the switch element T.

In this embodiment, (1) and (2), and (3) and (4) are assumed to have the same layer structure. As for (1) and (2), when the design is done such that the areas of (1) and (2) become almost equal, capacitance values generated in (1) and (2) also become almost equal to each other. On the other hand, as for (3) and (4), the design is done such that the area of (3) becomes larger than the area of (4). That is, the design is done such that in the orthographic projection to the main surface, the area of the portion (overlapping area 464) of the drive line Vgn−1, which overlaps the electrode 411 of the pixel PIX included in the pixel group to which the bias potential is supplied by the bias line Bsb, becomes larger than the area of the portion (overlapping area 463) of the drive line Vgn−1, which overlaps the electrode 411 of the pixel PIX included in the pixel group to which the bias potential is supplied by the bias line Bsa. At this time, the capacitance value generated in (3) becomes larger than the capacitance value generated in (4). Hence, the value of the capacitance C formed between the drive line Vgn−1 and the bias line Bsb can be made close to the parasitic capacitance between the drive line Vgn−1 and the bias line Bsa.

This also applies to (5) to (8). When the design is done such that the areas of (5) and (6) become almost equal, capacitance values generated in (5) and (6) also become almost equal to each other. On the other hand, as for (7) and (8), the design is done such that the area of (7) becomes larger than the area of (8). That is, the design is done such that in the orthographic projection to the main surface, the area of the portion of the drive line Vgn−2, which overlaps the electrode 411 of the pixel PIX included in the pixel group to which the bias potential is supplied by the bias line Bsa, becomes larger than the area of the portion of the drive line Vgn−2, which overlaps the electrode 411 of the pixel PIX included in the pixel group to which the bias potential is supplied by the bias line Bsb. At this time, the capacitance value generated in (7) becomes larger than the capacitance value generated in (8). Hence, the value of the capacitance C formed between the drive line Vgn−2 and the bias line Bsa can be made close to the parasitic capacitance between the drive line Vgn−2 and the bias line Bsb. The values of the above-described capacitances C11 to C66 can be adjusted in this way.

The aspect of the embodiments is not limited to the above description. In general, if the design is done such that "the sum of the capacitance generated in (1) and the capacitance generated in (4)" becomes smaller than "the capacitance generated in (2) and the capacitance generated in (3)", and "the sum of the capacitance generated in (5) and the capacitance generated in (8)" becomes smaller than "the capacitance generated in (6) and the capacitance generated in (7)", the effect of this disclosure can be obtained. For example, this may be achieved by making the area of (3) and the area of (4) almost equal to each other and making the area of (1) smaller than the area of (2).

When the difference between the currents flowing the bias line Bsa and the bias line Bsb is calculated, the noise generated when turning on or off the switch element T can effectively be suppressed. As a result, the accuracy of detecting the presence/absence of radiation irradiation by the detection unit 106 can be raised.

When the detection unit 106 detects the start of radiation irradiation, the control unit 107 sets all the switch elements T in the non-conduction state to accumulate signals by radiation in the pixels PIX. After that, the control unit 107 performs actual read in accordance with the end of radiation irradiation. In the arrangement shown in FIG. 21, the two drive lines Vgn−1 and Vgn−2 for the two pixel groups are connected to the pixels PIX arranged in the row direction. Here, as described above, Y drive lines Vg are arranged in the circuit diagram shown in Japanese Patent Laid-Open No. 2014-168203, and 2Y drive lines Vg exist in this embodiment. For this reason, when actual read is performed by setting the switch elements T in the conduction state sequentially from the top row to the final row, if the time of the drive period is the same as in Japanese Patent Laid-Open No. 2014-168203, a twice longer time is needed until the signals of all rows are read out. Hence, as shown in FIG. 23, at the time of actual read, the control unit 107 may control the driving circuit 214 to set the drive lines Vg of two rows in the conduction state together, thereby suppressing the increase in the actual read time caused by the increased in the number of drive lines Vg. More specifically, as shown in FIG. 21, the signal line Sig is shared by pixels arranged on a column basis in the plurality of pixels PIX. When acquiring radiation image data, the driving circuit 214, for example, simultaneously turns on the switch elements T connected to the drive line Vg1-1 and the drive line Vg1-2, thereby suppressing the increase in the actual read time.

In this embodiment, the two bias lines Bsa and Bsb are used, thereby suppressing the current flowing to the bias line Bs when turning on or off the switch element T due to the parasitic capacitance existing between the drive line Vg and the bias line Bs. Also, the capacitance formed between the drive line Vg and the bias line Bs which are not connected via the switch element T, is made close to the parasitic capacitance between the drive line Vg and the bias line Bs which are connected via the switch element T. This can reduce a detection error or detection delay of radiation by the current of noise generated at the time of "dummy read driving".

Here, for example, the difference between the numbers of pixels PIX included in the pixel groups may be 10% or less in each pixel group. That is, the number of pixels PIX connected to the bias line Bsa may be 90% or more and 110% or less of the number of pixels PIX connected to the bias line Bsb. Alternatively, for example, the numbers of pixels PIX included in the pixel groups may equal. When the numbers of pixels PIX included in the pixel groups are equalized, the amounts of currents of noise flowing to the bias lines Bs are equalized, and the influence of noise at the time of detection of the presence/absence of radiation irradiation by the detection unit 106 can be suppressed.

Figure 24:
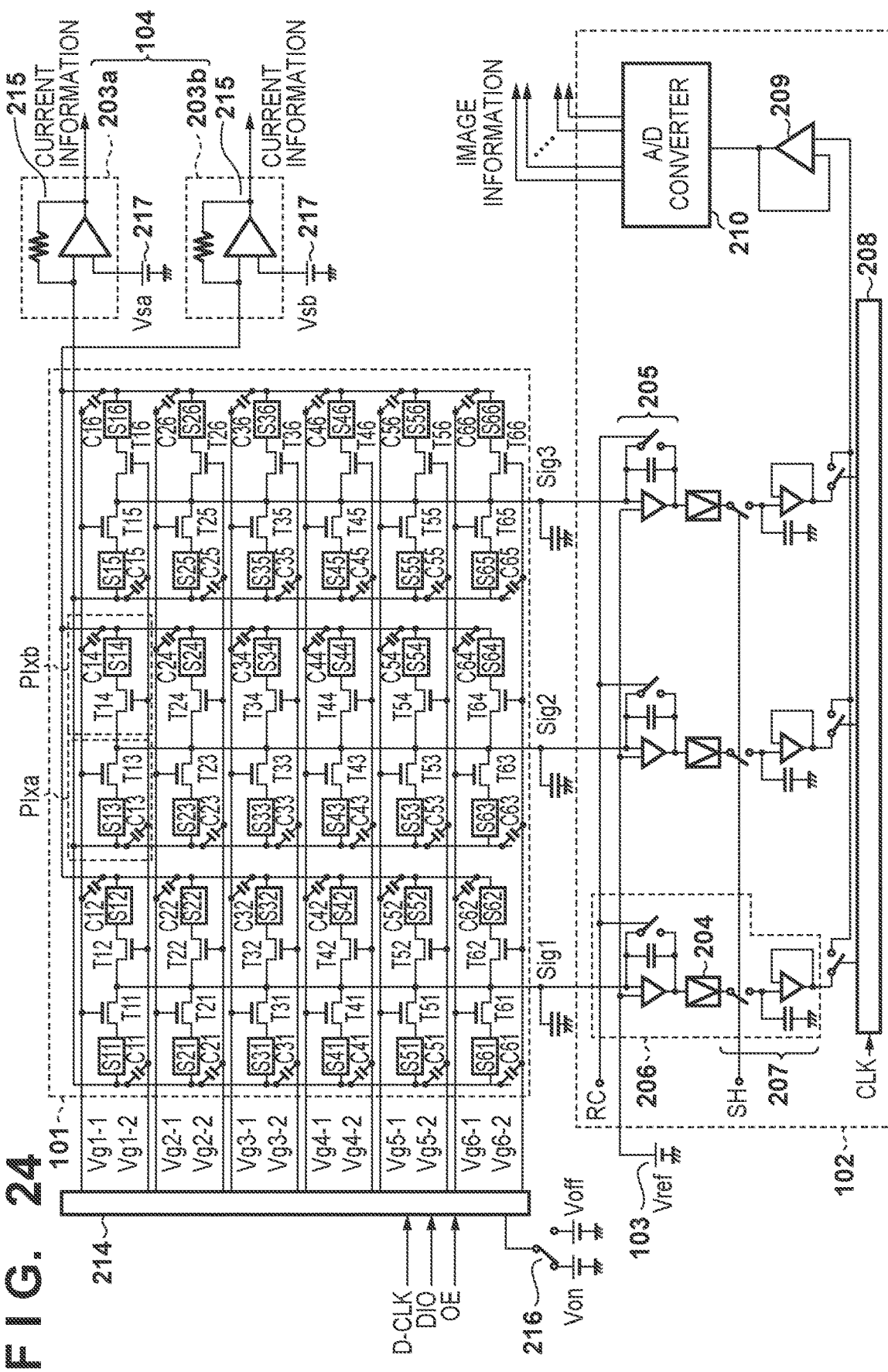
FIG. 24 is a circuit diagram showing an example of the arrangement of the radiation imaging apparatus shown in FIG. 1.

FIG. 24 is an equivalent circuit diagram showing an example of the arrangement of the imaging unit 110 of the radiation imaging apparatus 100 according to this embodiment, which is a modification of FIG. 21. The arrangement of the imaging unit 110 according to this embodiment is different from the arrangement shown in FIG. 21 in the arrangement of the pixel unit 101 and the arrangement of the amplification circuit 206 of the read circuit 102. More specifically, in the pixels PIX, two pixels PIX which are adjacent to each other in the row direction crossing the column signal line Sig and whose switch elements T are controlled by different drive lines in the plurality of drive lines Vg share the signal line Sig. At this time, as shown in FIG. 24, one of the two pixels PIX adjacent to each other may be included in the pixel group to which the bias potential is supplied via the bias line Bsa, and the other may be included in the pixel group to which the bias potential is supplied via the bias line Bsb. Since the two pixels PIX adjacent to each other in the row direction share the column signal line Sig, the number of signal lines Sig is halved as compared to the arrangement shown in FIG. 21. Accordingly, the number of amplification circuits 206 arranged in the read circuit 102 is halved as compared to the arrangement shown in FIG. 21. As a result, to solve the problem that the scale of the driving circuit 214 in the arrangement shown in FIG. 21 becomes larger, the number of amplification circuits 206 in the read circuit 102 can be decreased. This can suppress the increase in the cost caused by the increase in the number of ICs in the entire radiation imaging apparatus 100 including the driving circuit 214 and the read circuit 102 and decrease the number of wirings in the pixel unit 101. The rest of the arrangement of the radiation imaging apparatus 100 may be the same as in the above-described first embodiment, and a description thereof will be omitted here.

Figure 25:
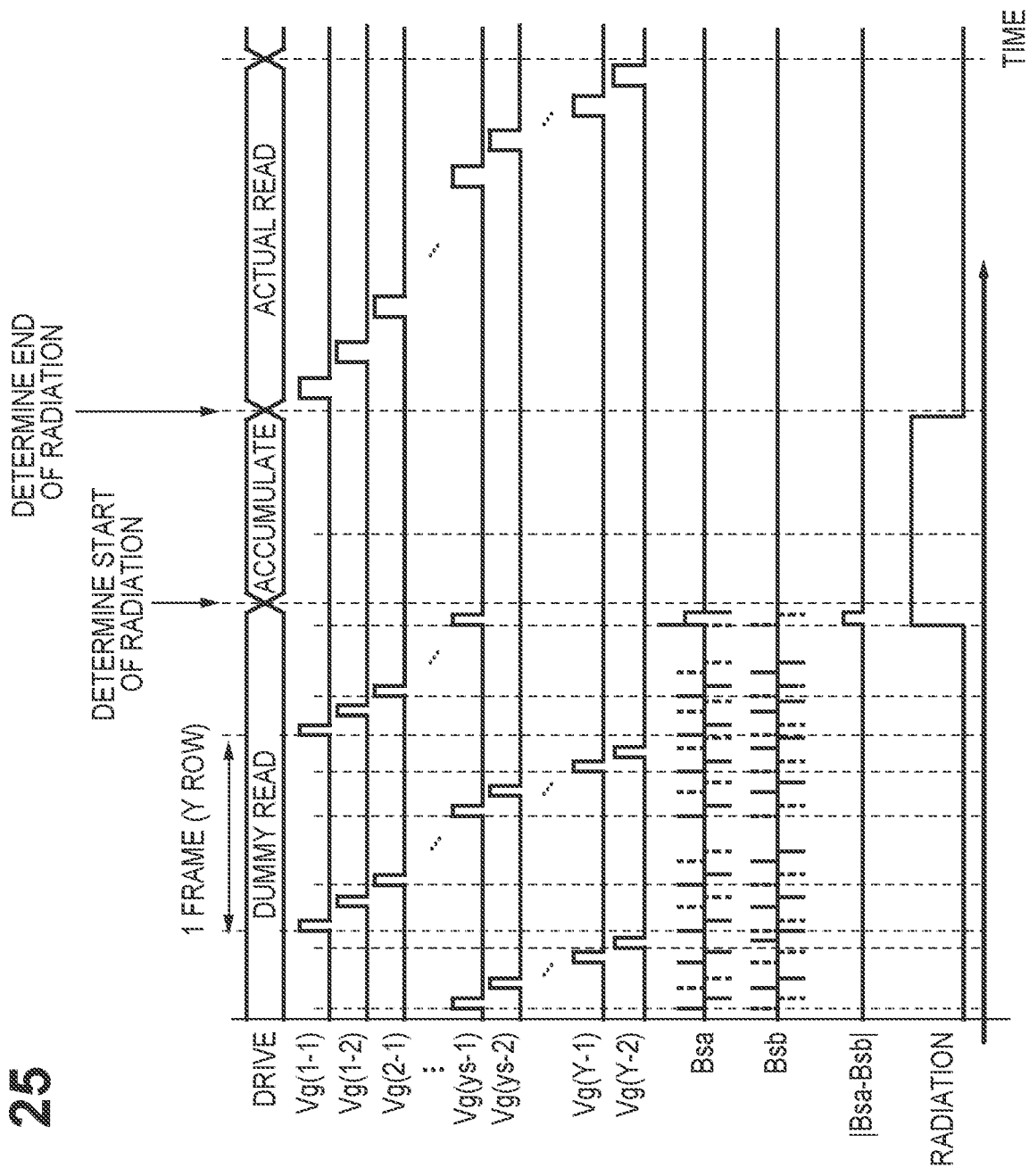
FIG. 25 is a timing chart for explaining the operation of the radiation imaging apparatus shown in FIG. 24.

FIG. 25 is a schematic view of the drive timing of the radiation imaging apparatus 100 according to this embodiment. Driving concerning detection of the presence/absence of radiation irradiation during dummy read may be the same as the driving described with reference to FIG. 22. It is therefore possible to suppress the influence of the parasitic capacitance and raise the accuracy of detecting the presence/absence of radiation irradiation. In this embodiment, the pixels PIX which are adjacent to each other are connected to the same column signal line Sig. For this reason, turning on the switch elements T on two rows together at the time of actual read, as described above, is impossible because signals read out from the two pixels are added. Hence, as shown in FIG. 25, when acquiring radiation image data, the driving circuit 214 turns on the switch elements T of the pixels PIX connected to the same column signal line Sig at different timings. This makes it possible to read out charges accumulated in the pixels PIX.

Figure 26:
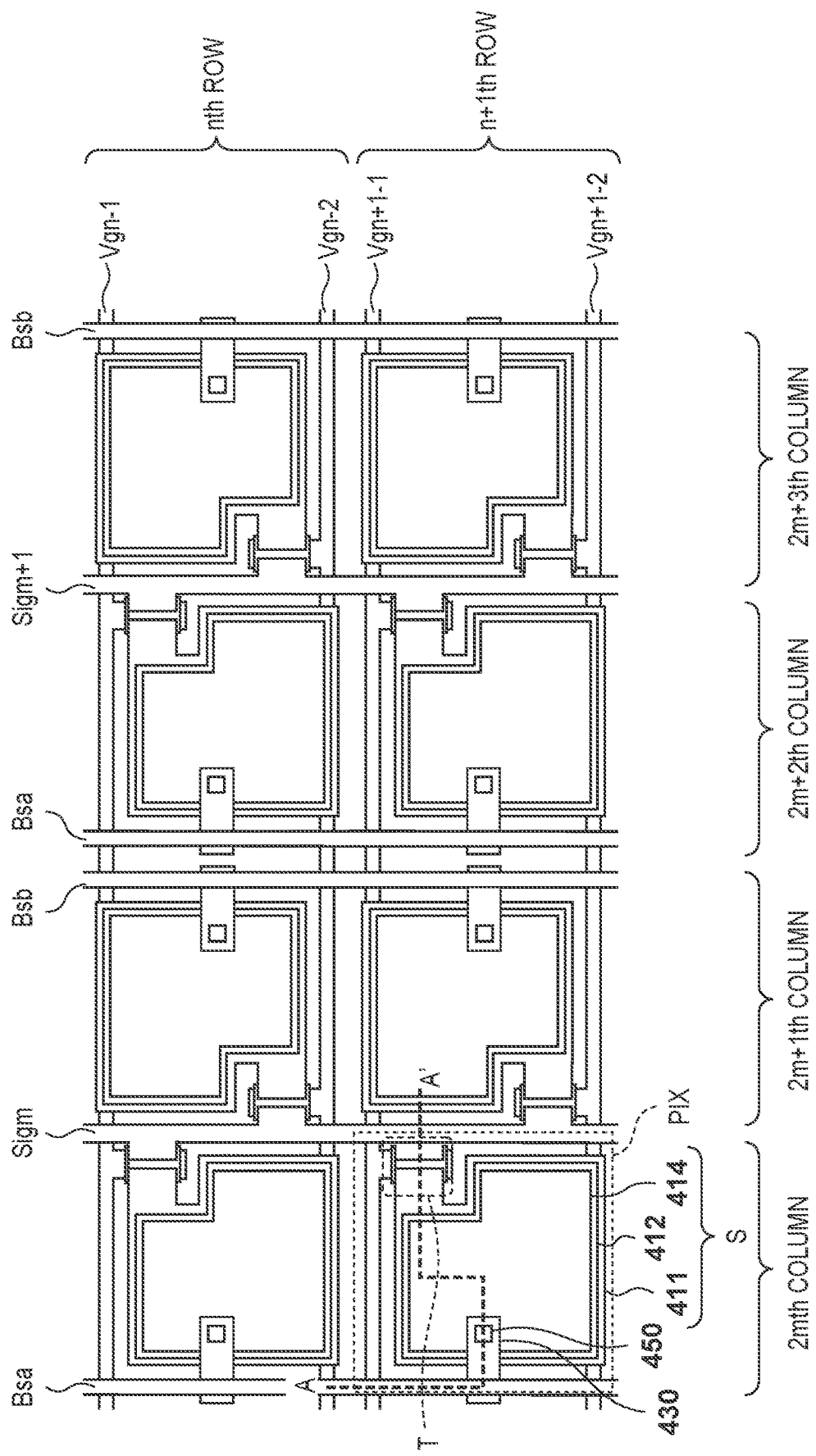
FIG. 26 is a plan view showing an example of the arrangement of pixels of the radiation imaging apparatus shown in FIG. 24.

FIG. 26 is a plan view of the pixels PIX according to this embodiment. A sectional view taken along a line A-A' in FIG. 26 may be the same as FIG. 23B. In this embodiment, the pixels PIX adjacent to each other share the column signal line Sig. For example, a column signal line Sig2m and a column signal line Sig2m+1 in FIG. 23A described above are replaced with a common column signal line Sigm. This makes it possible to suppress the number of amplification circuits 206 as compared to the arrangement shown in FIGS. 21 and 23, decrease the number of column signal lines Sig arranged in the pixel unit 101, and suppress an increase in the cost. The method of adjusting the capacitance C formed between the drive line Vg and the bias line Bs which are not connected via the switch element T, and the parasitic capacitance between the drive line Vg and the bias line Bs which are connected via the switch element T may be the same as in the above-described case described with reference to FIGS. 23A and 23B.

Figures 27A, 27B:
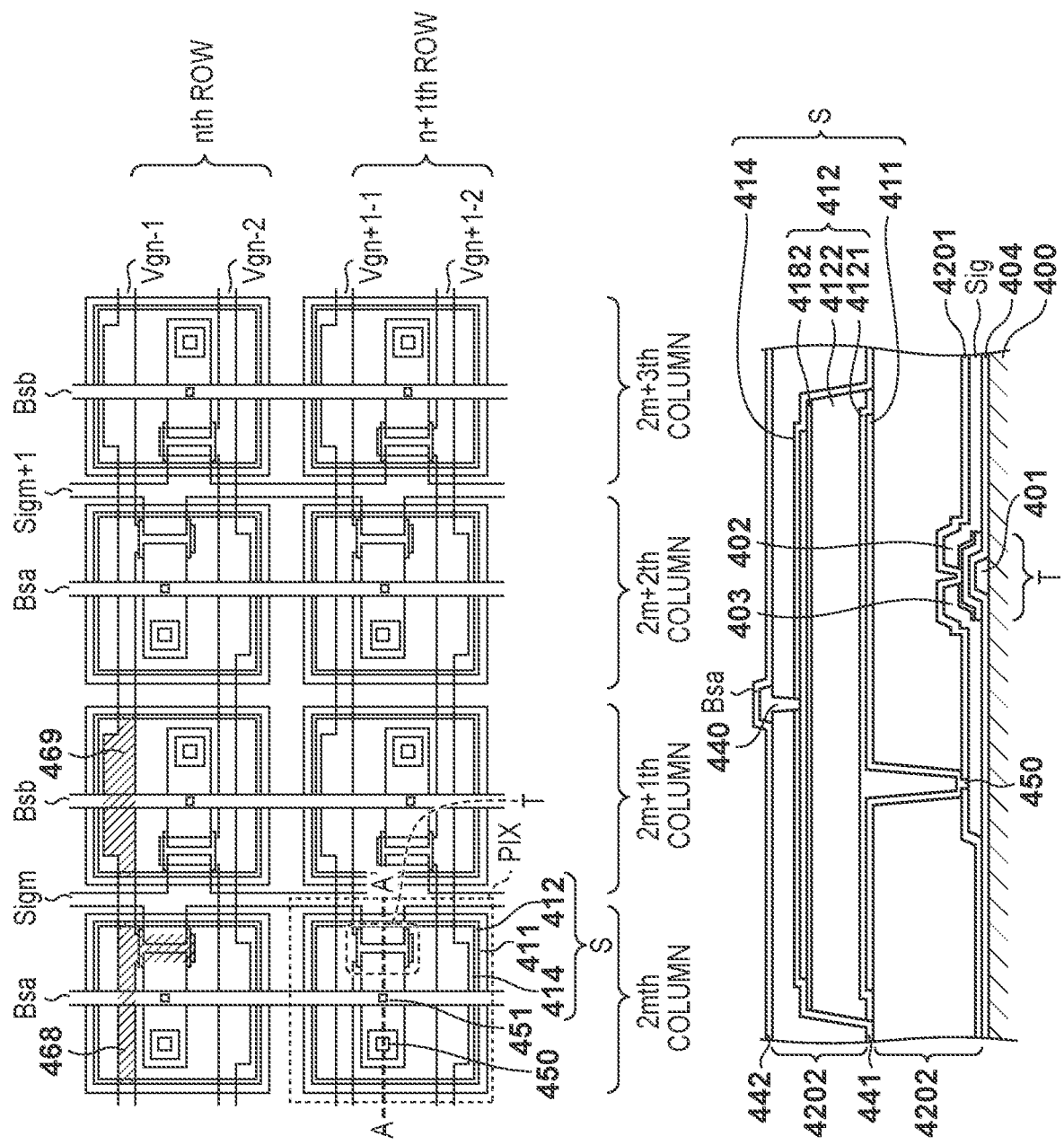
FIG. 27A is a plan view showing an example of the arrangement of pixels of the radiation imaging apparatus shown in FIG. 24.
FIG. 27B is a sectional view showing an example of the arrangement of a pixel of the radiation imaging apparatus shown in FIG. 24.

Another example of the method of adjusting the capacitance C formed between the drive line Vg and the bias line Bs which are not connected via the switch element T, and the parasitic capacitance between the drive line Vg and the bias line Bs which are connected via the switch element T will be described next with reference to FIGS. 27A and 27B. FIG. 27A is a plan view of the pixels PIX, and FIG. 27B is a sectional view taken along a line A-A' in FIG. 27A. In the arrangement shown in FIG. 27B, the structure of the switch element T is almost the same as the switch element T shown in FIG. 23B except that the switch element T is covered with an insulating layer 4201 and a planarization layer 4202 except the opening portion 450 provided in a part on the main electrode 403. The insulating layer 4201 may be formed by an inorganic insulating film of silicon nitride or the like. The planarization layer 4202 may be made of photosensitive acryl, polyimide, or the like. The electrode (lower electrode) 411 of the conversion element S is formed on the planarization layer 4202. The electrode 411 is formed by a conductor different from the main electrode 403 of the switch element T. The electrode 411 and the main electrode 403 are electrically connected via the opening portion 450. The bias line Bs is provided on the electrode (upper electrode) 414 along the column direction in which the column signal line Sig extends. A planarization layer 4204 is provided between the bias line Bs and the electrode 414 except the portion of the opening portion 451. The bias line Bs and the electrode 414 are electrically connected via the opening portion 451 provided in a part of the planarization layer 4204. The protection layer 440 covers the whole components described above.

In FIG. 27A, place focus on the drive line Vgn−1 that passes through the nth row and the 2mth column and the nth row and (2m+1)th column. The drive line Vgn−1 connected to the pixel PIX including the conversion element S to which the bias potential is supplied by the bias line Bsa includes, with respect to the electrode 411 of the conversion element S, (9) an overlapping area 468 on the electrode 411 of the conversion element S of the pixel PIX to which the bias potential is supplied by the bias line Bsa, and

(10) an overlapping area 469 on the electrode 411 of the conversion element S of the pixel PIX to which the bias potential is supplied by the bias line Bsb.

Similarly, the drive line Vgn−2 connected to the pixel PIX including the conversion element S to which the bias potential is supplied by the bias line Bsb includes,

(11) an overlapping area on the electrode 411 of the conversion element S of the pixel PIX to which the bias potential is supplied by the bias line Bsb, and

(12) an overlapping area on the electrode 411 of the conversion element S of the pixel PIX to which the bias potential is supplied by the bias line Bsa.

In (9) to (12) described above, (9) and (12) contribute to the capacitive coupling component between the drive line Vgn−1 and the bias line Bsa. That is, (9) and (12) contribute to the parasitic capacitance between the drive line Vgn−1 and the bias line Bsa. In addition, (10) and (11) contribute to the capacitive coupling component between the drive line Vgn−1 and the bias line Bsb, that is, the above-described capacitance C formed between the drive line Vgn−1 and the bias line Bsb. The areas, shapes, and the film thicknesses of the constituent materials of the overlapping areas 468 and 469 are adjusted. This makes it possible to adjust the capacitance values of the parasitic capacitance and the capacitance formed between the drive line Vgn−1 and the bias line Bsb which are not connected via the switch element T.

In this embodiment, (9) to (12) are assumed to have the same layer structure. In this case, the design is done such that in the orthographic projection to the main surface, the area of the portion (overlapping area 469) of the drive line Vgn−1, which overlaps the electrode 411 of the pixel PIX included in the pixel group to which the bias potential is supplied by the bias line Bsb, becomes larger than the area of the portion (overlapping area 468) of the drive line Vgn−1, which overlaps the electrode 411 of the pixel PIX included in the pixel group to which the bias potential is supplied by the bias line Bsa. Hence, the value of the capacitance C formed between the drive line Vgn−1 and the bias line Bsb can be made close to the parasitic capacitance between the drive line Vgn−1 and the bias line Bsa. For example, as shown in FIG. 27A, in the orthographic projection to the main surface of the substrate 400, a portion of the drive line Vgn−1, which extends in the row direction and overlaps the electrode 411 of the pixel PIX included in the pixel group to which the bias potential is supplied by the bias line Bsb, may include a portion wider than a portion of the drive line Vgn−1, which extends in the row direction and overlaps the electrode 411 of the pixel PIX included in the pixel group to which the bias potential is supplied by the bias line Bsa. Similarly, for the drive line Vgn−2 as well, the design is done such that in the orthographic projection to the main surface, the area of the portion of the drive line Vgn−2, which overlaps the electrode 411 of the pixel PIX included in the pixel group to which the bias potential is supplied by the bias line Bsa, becomes larger than the area of the portion of the drive line Vgn−2, which overlaps the electrode 411 of the pixel PIX included in the pixel group to which the bias potential is supplied by the bias line Bsb. For example, as shown in FIG. 27A, in the orthographic projection to the main surface of the substrate 400, a portion of the drive line Vgn−2, which extends in the row direction and overlaps the electrode 411 of the pixel PIX included in the pixel group to which the bias potential is supplied by the bias line Bsa, may include a portion wider than a portion of the drive line Vgn−2, which extends in the row direction and overlaps the electrode 411 of the pixel PIX included in the pixel group to which the bias potential is supplied by the bias line Bsb. The values of the above-described capacitances C11 to C66 can be adjusted in this way.

When the difference between the currents flowing the bias line Bsa and the bias line Bsb is calculated, the noise generated when turning on or off the switch element T can effectively be suppressed. As a result, the accuracy of detecting the presence/absence of radiation irradiation by the detection unit 106 can be raised. Additionally, in this embodiment, the number of amplification circuits 206 arranged in the read circuit 102 can be suppressed as compared to the above-described first embodiment. This can suppress an increase in the cost of the radiation imaging apparatus 100, decrease the wiring patterns of the pixel unit 101, and increase the pixel opening ratio.

Figure 28:
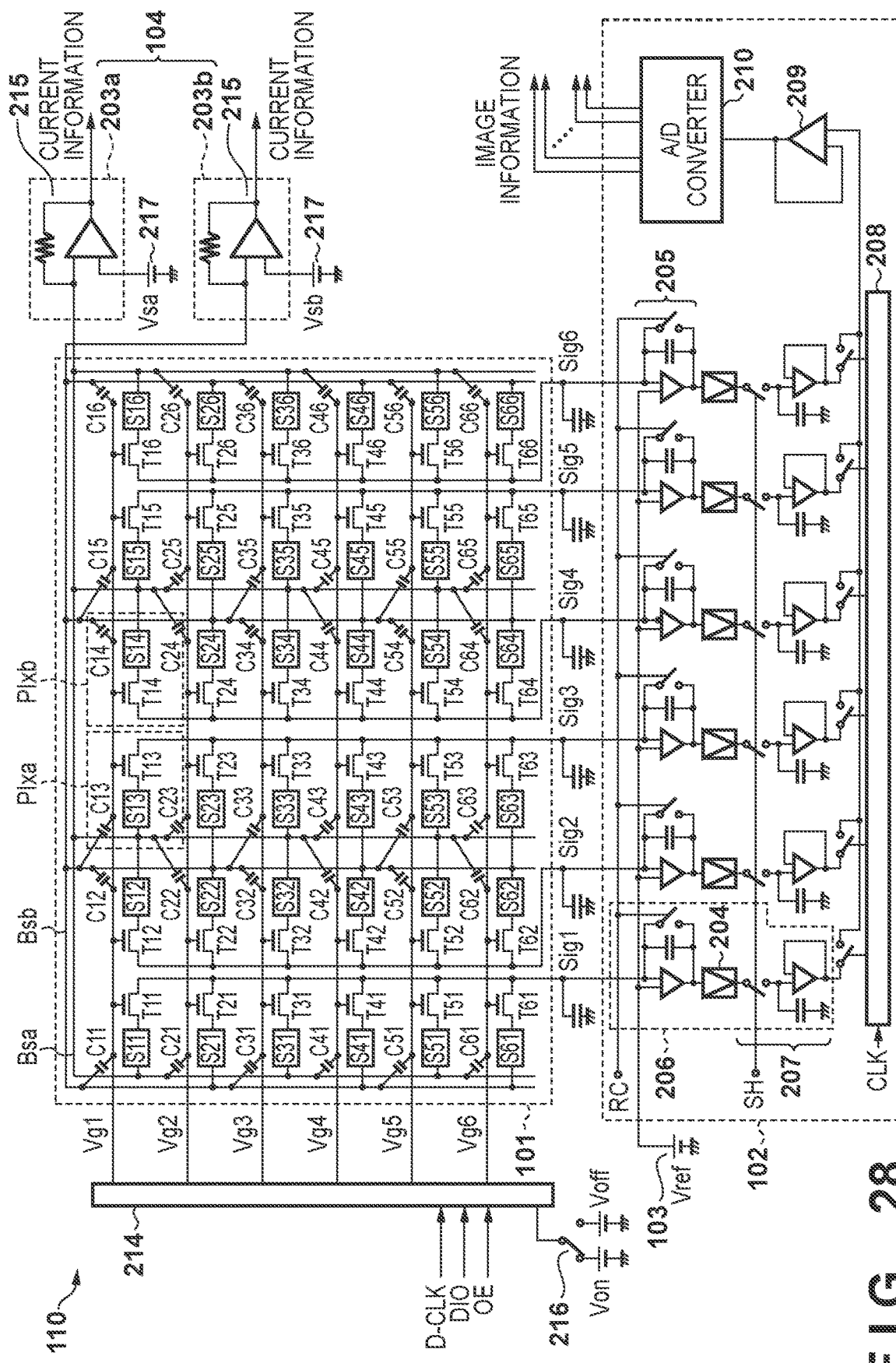
FIG. 28 is a circuit diagram showing an example of the arrangement of the radiation imaging apparatus shown in FIG. 1.

FIG. 28 is an equivalent circuit diagram showing an example of the arrangement of the imaging unit 110 of the radiation imaging apparatus 100 according to this embodiment, which is a modification of FIG. 21. The arrangement of the imaging unit 110 according to this embodiment is different from the arrangement shown in FIG. 21 in the arrangement of the pixel unit 101. In the arrangement shown in FIG. 21, in the row direction, the pixels PIX included in the pixel group to which the bias potential is supplied by the bias line Bsa and the pixels PIX included in the pixel group to which the bias potential is supplied by the bias line Bsb are alternately arranged. On the other hand, in the arrangement shown in FIG. 28, in the row direction crossing the column signal line Sig, the pixels included in the pixel group to which the bias potential is supplied by the bias line Bsa or the pixel group to which the bias potential is supplied by the bias line Bsb are continuously arranged. Also, the switch elements T of the pixels PIX arranged in the row direction are driven by the same drive line Vg. In addition, in the column direction in which the column signal line Sig extends, the pixels PIX included in the pixel group to which the bias potential is supplied by the bias line Bsa and the pixels PIX included in the pixel group to which the bias potential is supplied by the bias line Bsb are alternately arranged. By this wiring, the number of column signal lines Sig is equal, and the number of drive lines Vg is halved, as compared to the first embodiment. In addition, as compared to the arrangement shown in FIG. 24, the number of column signal lines Sig is doubled, but the number of drive lines Vg is halved, and the total number of wirings is almost equal.

FIG. 29 is a schematic view of the drive timing of the radiation imaging apparatus 100 according to this embodiment. Driving concerning detection of the presence/absence of radiation irradiation during dummy read may be the same as the driving described with reference to FIG. 22. It is therefore possible to suppress the influence of the parasitic capacitance and raise the accuracy of detecting the presence/absence of radiation irradiation. Furthermore, in this embodiment, since the number of drive lines is halved, the time needed for actual read is equal to that in the above-described driving of simultaneously turning on the switch elements T on the two drive lines Vg shown in FIG. 22. In addition, the time needed for actual read is halved as compared to the above-described driving shown in FIG. 25.

Figure 30A:
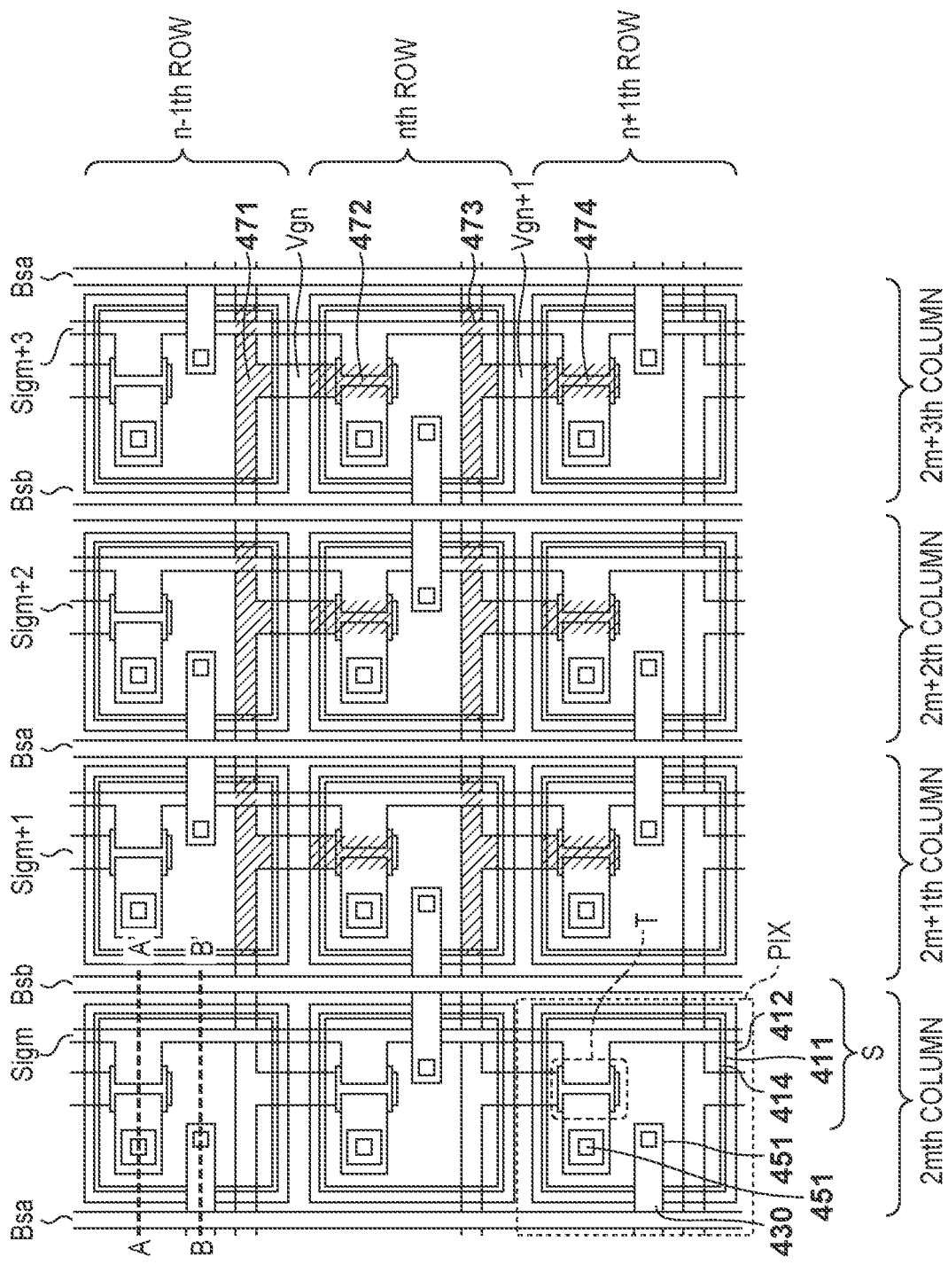
FIG. 30A is a plan view showing an example of the arrangement of pixels of the radiation imaging apparatus shown in FIG. 28.

A method of adjusting the capacitance C formed between the drive line Vg and the bias line Bs which are not connected via the switch element T, and the parasitic capacitance between the drive line Vg and the bias line Bs which are connected via the switch element T will be described next with reference to FIGS. 30A to 30C. FIG. 30A is a plan view of the pixels PIX, FIG. 30B is a sectional view taken along a line A-A' in FIG. 30A, and FIG. 30C is a sectional view taken along a line B-B' in FIG. 30A.

As shown in FIG. 30A, in an orthographic projection to the main surface of the substrate 400, the bias line Bsa and the bias line Bsb are provided, between the conversion elements S of the pixels PIX adjacent to each other, along the column direction in which the column signal line Sig extends. The layer structure and the sectional structure are almost the same as in the structure shown in FIG. 27B described above. The conductive layer 430 that connects the (n−1)th bias line Bsa and the electrode (upper electrode) 414 of the conversion element S is arranged to spread from the bias line Bsa to both sides in the row direction, and connected to the electrode 414 via the opening portion 451. Similarly, the conductive layer 430 of the nth row is arranged to spread from the bias line Bsb to both sides in the row direction, and connected to the electrode 414 of the conversion element S via the opening portion 451. Hence, the electrodes 414 of the photodiodes are alternately connected to the bias lines Bsa and Bsb in the odd-numbered rows/even-numbered rows.

In addition, the drive line Vgn that controls the switch elements T of the pixels PIX on the nth row extends in the row direction under the electrodes (lower electrodes) 411 of the pixels PIX not on the nth row but mainly on the (n−1)th row, and extends up to the switch elements T of the nth row so as to project in the column direction from the portion extending in the row direction. In FIG. 30A, place focus on the drive line Vgn connected to the pixels PIX including the conversion elements S to which the bias potential is supplied by the bias line Bsb. The drive line Vgn includes

(13) an overlapping area 471 on the electrode 411 of the conversion element S of the pixel PIX (the pixel on the (n−1)th row) to which the bias potential is supplied by the bias line Bsa, and

(14) an overlapping area 472 on the electrode 411 of the conversion element S of the pixel PIX (the pixel on the nth row) to which the bias potential is supplied by the bias line Bsb.

Similarly, the drive line Vgn+1 includes,

(15) an overlapping area 473 on the electrode 411 of the conversion element S of the pixel PIX (the pixel on the nth row) to which the bias potential is supplied by the bias line Bsb, and

(16) an overlapping area 474 on the electrode 411 of the conversion element S of the pixel PIX (the pixel on the (n+1)th row) to which the bias potential is supplied by the bias line Bsa.

In (13) and (14) described above, (13) contributes to the capacitive coupling component between the drive line Vgn and the bias line Bsa. That is, (13) contributes to the above-described capacitance C formed between the drive line Vgn and the bias line Bsa. In addition, (14) contributes to the capacitive coupling component between the drive line Vgn and the bias line Bsb, that is, the parasitic capacitance formed between the drive line Vgn and the bias line Bsb. The areas, shapes, and the film thicknesses of the constituent materials of the overlapping areas 471 to 474 are adjusted. This makes it possible to adjust the capacitance values of the parasitic capacitance and the capacitance C formed between the drive line Vgn and the bias line Bsa which are not connected via the switch element T. This also applies to (15) and (16).

In this embodiment, (13) to (16) are assumed to have the same layer structure. In this case, the design is done such that in the orthographic projection to the main surface, the area of the portion (overlapping area 471) of the drive line Vgn, which overlaps the electrode 411 of the pixel PIX included in the pixel group to which the bias potential is supplied by the bias line Bsa, becomes larger than the area of the portion (overlapping area 472) of the drive line Vgn, which overlaps the electrode 411 of the pixel PIX included in the pixel group to which the bias potential is supplied by the bias line Bsb. Hence, the value of the capacitance C formed between the drive line Vgn and the bias line Bsa can be made close to the parasitic capacitance between the drive line Vgn and the bias line Bsb. Similarly, for the drive line Vgn+1 connected to the conversion element S to which the bias potential is supplied from the bias line Bsa, the design is done such that in the orthographic projection to the main surface, the area of the portion of the drive line Vgn+1, which overlaps the electrode 411 of the pixel PIX included in the pixel group to which the bias potential is supplied by the bias line Bsb, becomes larger than the area of the portion of the drive line Vgn+1, which overlaps the electrode 411 of the pixel PIX included in the pixel group to which the bias potential is supplied by the bias line Bsa. The values of the above-described capacitances C11 to C66 can be adjusted in this way.

In this embodiment as well, when the difference between the currents flowing the bias line Bsa and the bias line Bsb is calculated, the noise generated when turning on or off the switch element T can effectively be suppressed. As a result, the accuracy of detecting the presence/absence of radiation irradiation by the detection unit 106 can be raised. Additionally, since the scale of the driving circuit 214 can be made small by halving the number of drive lines Vg as compared to the arrangement shown in FIG. 21, it is possible to suppress an increase in the cost concerning the driving circuit 214, decrease the wiring patterns of the pixel unit 101, and increase the pixel opening ratio. In addition, as compared to the arrangement shown in FIG. 24, the read speed in actual read driving can be improved to twice.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-204878, filed Nov. 12, 2019, No. 2019-204880, filed Nov. 12, 2019, and No. 2019-204879, filed Nov. 12, 2019, which are hereby incorporated by reference herein in their entirety.

What is claimed is:

1. An apparatus comprising: a pixel unit in which a plurality of pixels each including a conversion element configured to convert radiation into charges, and a switch element are arranged in a matrix; a driving circuit configured to control the switch elements via a plurality of drive lines extending in a row direction; a bias power supply unit configured to supply a bias potential to the conversion element via a bias line; a plurality of column signal lines to which signals are output from the plurality of pixels via the switch elements; and a detection unit,
wherein the plurality of pixels includes a first pixel and a second pixel, which are adjacent to each other in the row direction and are connected to a common column signal line in the plurality of column signal lines,
the switch element of the first pixel and the switch element of the second pixel are connected to drive lines different from each other in the plurality of drive lines,
the detection unit determines presence/absence of radiation irradiation based on a current flowing to the bias line,
the bias power supply unit includes a first bias power supply unit and a second bias power supply unit,
the bias line includes a first bias line connected to the first bias power supply unit, and a second bias line connected to the second bias power supply unit and electrically independent of the first bias line,
the conversion element of the first pixel is connected to the first bias power supply unit via the first bias line, and
the conversion element of the second pixel is connected to the second bias power supply unit via the second bias line.

2. The apparatus according to claim 1, wherein in an orthographic projection to the pixel unit, the conversion element of the first pixel and the conversion element of the second pixel are arranged at line-symmetrical or point-symmetrical positions across the common column signal line.

3. The apparatus according to claim 1, wherein in an orthographic projection to the pixel unit, the switch element of the first pixel and the switch element of the second pixel are arranged at line-symmetrical or point-symmetrical positions across the common column signal line.

4. The apparatus according to claim 1, wherein in an orthographic projection to the pixel unit, at a portion where the plurality of drive lines crosses the bias line, at least one of a width of the plurality of drive lines and a width of the bias line is thinner than remaining portions.

5. The apparatus according to claim 1, wherein the detection unit determines the presence/absence of radiation irradiation based on a first signal value representing a current flowing to the bias line when the driving circuit sets the switch element of a pixel of the plurality of pixels in a conduction state.

6. The apparatus according to claim 5, wherein the detection unit determines the presence/absence of radiation irradiation based on the first signal value and a second signal value representing a current flowing to the bias line when the driving circuit sets the switch elements of the plurality of pixels in a non-conduction state.

7. The apparatus according to claim 6, wherein the detection unit determines the presence/absence of radiation irradiation based on a difference between the first signal value and the second signal value.

8. The apparatus according to claim 1, wherein a bias potential supplied by the first bias power supply unit and a bias potential supplied by the second bias power supply unit are potentials different from each other.

9. The apparatus according to claim 1, wherein the detection unit acquires a first signal value representing a current flowing to the first bias line when the switch element of a pixel in pixels whose conversion elements are connected to the first bias power supply unit in the plurality of pixels is in a conduction state, and a second signal value representing a current flowing to the second bias line when the switch element of a pixel whose conversion element is connected to the second bias power supply unit in the plurality of pixels is in a non-conduction state such that sampling timings at least partially overlap, and determines the presence/absence of radiation irradiation based on the first signal value and the second signal value.

10. A system comprising:
the apparatus according to claim 1; and
a radiation generation apparatus configured to irradiate the radiation imaging apparatus with radiation.

11. An apparatus comprising: a pixel unit in which a plurality of pixels each including a conversion element configured to convert radiation into charges, and a switch element are arranged in a matrix; a driving circuit configured to control the switch elements via a plurality of drive lines extending in a row direction; a bias power supply unit configured to supply a bias potential to the conversion element via a bias line; a plurality of column signal lines to which signals are output from the plurality of pixels via the switch elements; and a detection unit,
wherein the plurality of pixels includes a first pixel and a second pixel, which are adjacent to each other in the row direction and are connected to a common column signal line in the plurality of column signal lines,
the switch element of the first pixel and the switch element of the second pixel are connected to drive lines different from each other in the plurality of drive lines,
the detection unit determines presence/absence of radiation irradiation based on a current flowing to the bias line,
a planarization layer configured to suppress a step difference formed by the conversion element and the switch element arranged on a substrate is arranged to cover the conversion element and the switch element,
the plurality of drive lines is arranged on a side of the substrate with respect to the planarization layer, and
the bias line is arranged on a side apart from the substrate with respect to the planarization layer.

12. The apparatus according to claim 1, wherein a planarization layer configured to suppress a step difference formed by the switch element arranged on a substrate is arranged to cover the switch element,
the plurality of drive lines is arranged on a side of the substrate with respect to the planarization layer, and
the conversion element and the bias line are arranged on a side apart from the substrate with respect to the planarization layer.

13. The apparatus according to claim 12, wherein in an orthographic projection to the pixel unit, the conversion element and the switch element are arranged such that at least parts thereof overlap each other in each pixel of the plurality of pixels.

14. The apparatus according to claim 12, wherein in an orthographic projection to the pixel unit, the bias line is arranged to overlap the conversion element of each pixel of the plurality of pixels.

15. An apparatus comprising:
a plurality of pixels arranged in a matrix, each pixel including a conversion element and a switch element for electrically connecting the conversion element to a column signal line, wherein the plurality of pixels includes a first pixel and a second pixel adjacent to each other;
a driving circuit for controlling the switch element on/off in the plurality of pixels via a plurality of drive lines, the driving circuit connecting to the first pixel via a first drive line among the plurality of drive lines and connecting to the second pixel via a second drive line among the plurality of drive lines;
a plurality of bias sources for applying a bias potential to the conversion element of the plurality of pixels via a plurality of bias lines, including a first bias source for connecting to the first pixel via a first bias line among the plurality of bias lines and a second bias source for connecting to the second pixel via a second bias line among the plurality of bias lines; and
a detection unit for sampling a current flowing via the first bias line in a first sampling period including a predetermined timing to obtain a first signal value, and for sampling a current flowing via the second bias line in a second sampling period including the predetermined timing to obtain a second signal value,
wherein the detection unit determines the presence or absence of irradiation on the basis of the first signal value and the second signal value,
wherein the predetermined timing is a timing of a part of a period during which the plurality of pixels is controlled by the driving circuit, and at the predetermined timing, the switch element of the first pixel is in an on state and the switch element of the second pixel is in an off state.

16. The apparatus according to claim 15, wherein the first sampling period and the second sampling period are sampling period at a same timing.

17. The apparatus according to claim 15, wherein
the plurality of drive lines is arranged along a row direction,
the plurality of bias lines is arranged along a column direction,
the first pixel and the second pixel are adjacent to each other in the row direction.

18. The apparatus according to claim 17, wherein in a process of acquiring radiation image data, the driving circuit controls on the switch elements of the first pixel and the second pixel via the first drive line and the second drive line, respectively, so that the switch elements of the first pixel and the second pixel are simultaneously in the on state.

19. The apparatus according to claim 18, wherein
the plurality of pixels includes a third pixel,
the first pixel and the third pixel are adjacent to each other in the column direction, and
in the process of acquiring the radiation image data, the driving circuit controls that the switch element of the first pixel and the switch element of the third pixel are turn on at different timings.

20. The apparatus according to claim 19, wherein the third pixel is connected to the first bias source via the first bias line.

21. The apparatus according to claim 17, wherein the first pixel and the second pixel are connected to a common column signal line.

22. The apparatus according to claim 17, wherein in a process of detecting radiation irradiation, the driving circuit controls such that a timing of switching the switch element connected to the first drive line from the on state to the off state and a timing of switching the switch element connected to the second drive line from the off state to the on state overlap.

23. The apparatus according to claim 17, wherein in a process of detecting radiation irradiation, the driving circuit switches the switch element connected to the first drive line from the on state to the off state, and after a predetermined time has elapsed, switches on the switch element connected to the second drive line to the on state.

24. The apparatus according to claim 15, wherein the plurality of bias sources is composed of only the first bias source and the second bias source.

25. The apparatus according to claim 15, wherein the means for determining the presence or absence of radiation irradiation determines the presence/absence of radiation irradiation based on a difference between the first signal value and the second signal value.

26. The apparatus according to claim 25, wherein each of the first signal value and the second signal value is an analog value, and
the means for determining the presence or absence of radiation irradiation determines the presence/absence of radiation irradiation based on a digital value obtained by analog/digital-converting the difference between the analog values of the first signal value and the second signal value.

27. The apparatus according to claim 15, wherein a difference between the numbers of pixels connected to each of the plurality of bias sources is not more than 10%.

28. A system comprising:
the apparatus according to claim 15; and
a radiation generation apparatus configured to irradiate the radiation imaging apparatus with radiation.

29. An apparatus comprising:
a circuit for detecting radiation has a multilayer structure including: a plurality of pixels arranged in a matrix of pixels each including a conversion element which is capable of storing electric charge and includes a first electrode and a second electrode; a switch element for connecting the conversion element to a column signal line; a plurality of drive lines for controlling each switch element of the plurality of pixels and extending along the row direction of the matrix; and a plate-like base material;
wherein the plurality of pixels includes at least a first pixel and a second pixel as pixels arranged in a predetermined row of the matrix,
wherein the plurality of drive lines includes at least a first drive line connecting to the switch element of the first pixel and a second drive line connecting to the switch element of the second pixel, and
wherein in an orthographic projection to a main surface of the base material, an area of a portion of the first drive line which overlaps the second electrode of the second pixel is larger than an area of a portion of the first drive line which overlaps the second electrode of the first pixel.

30. The apparatus according to claim 29, wherein the apparatus further includes:
a first bias power supply unit configured to supply a bias potential to the conversion element of the first pixel via a first bias line;
a second bias power supply unit configured to supply a bias potential to the conversion element of the second pixel via a second bias line different from the first bias line; and
a detection unit configured to detect presence/absence of radiation irradiation based on a first signal value representing a current flowing to the first bias line and a second signal value representing a current flowing to the second bias line.

31. The apparatus according to claim 30, wherein each of the first signal value and the second signal value is an analog value.

32. The apparatus according to claim 30, wherein the plurality of pixels includes pixels included in a first group including the first pixel, which are supplied with the bias potential via the first bias line, and pixels included in a second group including the second pixel, which are supplied with the bias potential via the second bias line.

33. The apparatus according to claim 32, wherein in the predetermined row, pixels included in the first group and pixels included in the second group are alternately arranged.

34. The apparatus according to claim 32, wherein in a column of the matrix in which the first pixel is arranged, a plurality of pixels included in the first group are arranged consecutively, and
in a column of the matrix in which the second pixel is arranged, a plurality of pixels included in the second group are arranged consecutively.

35. The apparatus according to claim 32, wherein in a predetermined column of the matrix, pixels included in the first group and pixels included in the second group are alternately arranged.

36. The apparatus according to claim 32, wherein in the predetermined row, another pixel included in the first group is arranged adjacent to the first pixel, and another pixel included in the second group is arranged adjacent to the second pixel.

37. The apparatus according to claim 29, wherein the conversion element includes the first electrode, the second electrode, and a semiconductor layer arranged between the first electrode and the second electrode,
the portion of the first drive line which overlaps the second electrode of the second pixel is arranged in a layer on a side of the base material with respect to the second electrode of the second pixel, and
an insulating layer is arranged between the second electrode of the second pixel and the first drive line.

38. The apparatus according to claim 29, wherein
in the orthographic projection to the main surface of the base material, a portion of the first drive line which overlaps the second pixel includes a portion wider than a portion of the first drive line which overlaps the first pixel.

39. The apparatus according to claim 29, wherein the first pixel is connected to a first column wiring among column wirings extending along a column direction of the matrix,
the second pixel is connected to a second column wiring among the column wirings, and
a parasitic capacitance between the first drive line and the first column wiring is not less than 70% and not more than 130% of a capacitance formed between the first drive line and the second column wiring.

40. The apparatus according to claim 39, wherein a parasitic capacitance between the first drive line and the first column wiring equals a capacitance formed between the first drive line and the second column wiring.

41. The apparatus according to claim 29, wherein the first pixel and the second pixel are adjacent to each other and the first pixel and the second pixel is connected to a common column signal line.

42. The apparatus according to claim 29, wherein the detection unit determines the presence/absence of radiation irradiation based on a difference between the first signal value and the second signal value.

43. The apparatus according to claim 29, wherein the number of pixels connected to the first bias line is not less than 90% and not more than 110% of the number of pixels connected to the second bias line.

44. The apparatus according to claim 29, wherein the conversion element comprises one of PIN and MIS type elements.

45. A system comprising:
the apparatus according to claim 29; and
a radiation generation apparatus configured to irradiate the radiation imaging apparatus with radiation.

* * * * *